(12) United States Patent
Jeong et al.

(10) Patent No.: US 11,792,227 B2
(45) Date of Patent: *Oct. 17, 2023

(54) I2NSF NETWORK SECURITY FUNCTION FACING INTERFACE YANG DATA MODEL

(71) Applicant: Research & Business Foundation Sungkyunkwan University, Suwon-si (KR)

(72) Inventors: Jaehoon Jeong, Busan (KR); Jinyong Kim, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 633 days.

This patent is subject to a terminal disclaimer.

(21) Appl. No.: 16/899,840

(22) Filed: Jun. 12, 2020

(65) Prior Publication Data
US 2020/0396256 A1 Dec. 17, 2020

(30) Foreign Application Priority Data

Jun. 12, 2019 (KR) .......................... 10-2019-0069642
Jul. 25, 2019 (KR) .......................... 10-2019-0090540
Nov. 4, 2019 (KR) .......................... 10-2019-0139817

(51) Int. Cl.
*H04L 9/40* (2022.01)
*G06F 16/955* (2019.01)
*H04L 47/32* (2022.01)

(52) U.S. Cl.
CPC ............ *H04L 63/20* (2013.01); *G06F 16/955* (2019.01); *H04L 47/32* (2013.01); *H04L 63/1458* (2013.01)

(58) Field of Classification Search
CPC ..... H04L 63/20; H04L 63/1458; H04L 47/32; G06F 16/955

(Continued)

(56) References Cited

U.S. PATENT DOCUMENTS 10,084,777 B2 * 9/2018 Zhang ..................... H04L 63/10
11,012,299 B2 * 5/2021 Janakiraman ....... H04L 41/0893
(Continued)

FOREIGN PATENT DOCUMENTS

| KR | 10-2018-0046894 A | 5/2018 |
| KR | 10-1863236 B1 | 6/2018 |
| KR | 10-2019-0055009 A | 5/2019 |

OTHER PUBLICATIONS

Yang et al., 2018 IEEE, ICTC 2018, "An Automata-based Security Policy Translation for Network Security Functions", pp. 268-272 (Year: 2018).*

(Continued)

*Primary Examiner* — Khalil Naghdali
(74) *Attorney, Agent, or Firm* — NSIP Law

(57) ABSTRACT

The present disclosure provides a system and method of providing a security service by means of a network operator management system in a security management system, the method including receiving a high-level first security policy from an I2NSF (interface to Network Security Functions) user; receiving an available security service from a developer's management system; creating a low-level second security policy corresponding to the first security policy on the basis of the security service; and transmitting a packet including the second security policy for setting the created second security policy to each of a plurality of NSFs (Network Security Function) to an NSF instance, wherein the network operator management system and the NSFs are respectively connect to an I2NSF NSF-laving interface, and the second security policy includes at least one or more of 1) blocking SNS access during business hours, 2) blocking a malicious VoIP (Voice over Internet Protocol) or a malicious VoCN (Voice over Cellular Network) packet, or 3) mitigating flood of http and https for a company web server.

20 Claims, 89 Drawing Sheets

(58) Field of Classification Search
USPC .............................................................. 726/1
See application file for complete search history.

(56) References Cited

U.S. PATENT DOCUMENTS

2006/0101520 A1* 5/2006 Schumaker ......... H04L 63/1433
            726/25
2017/0012953 A1* 1/2017 Ylonen ............... H04L 63/0428

OTHER PUBLICATIONS

Hares et al., Sungkyunkwan University, Network Working Group Internet-Draft, "I2NSF Capability YANG Data Model draft—hares—i2nsf—capability-data-model-07", pp. 1-62 (Year: 2018).*
Durante et al., 2017 IEEE conference on network softwarization (NetSoft), "A Model for the Analysis of Security Policies in Service Function Chains", pp. 1-6 (Year: 2017).*
Korean Office Action dated Jun. 11, 2021 in counterpart Korean Patent Application No. 10-2020-0059409 (6 pages in Korean).

* cited by examiner

[FIG. 1]
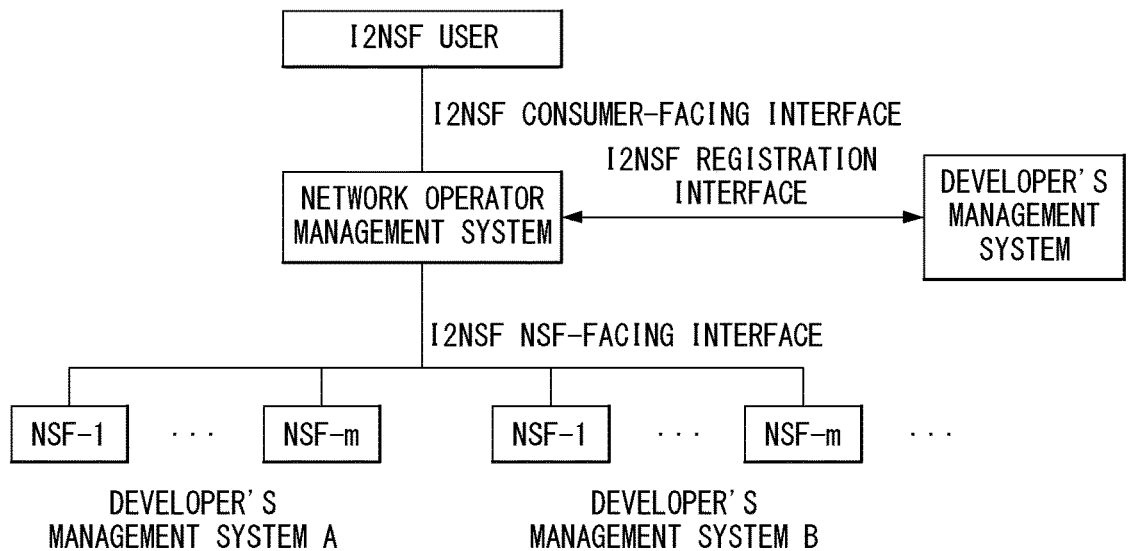
[FIG. 2]
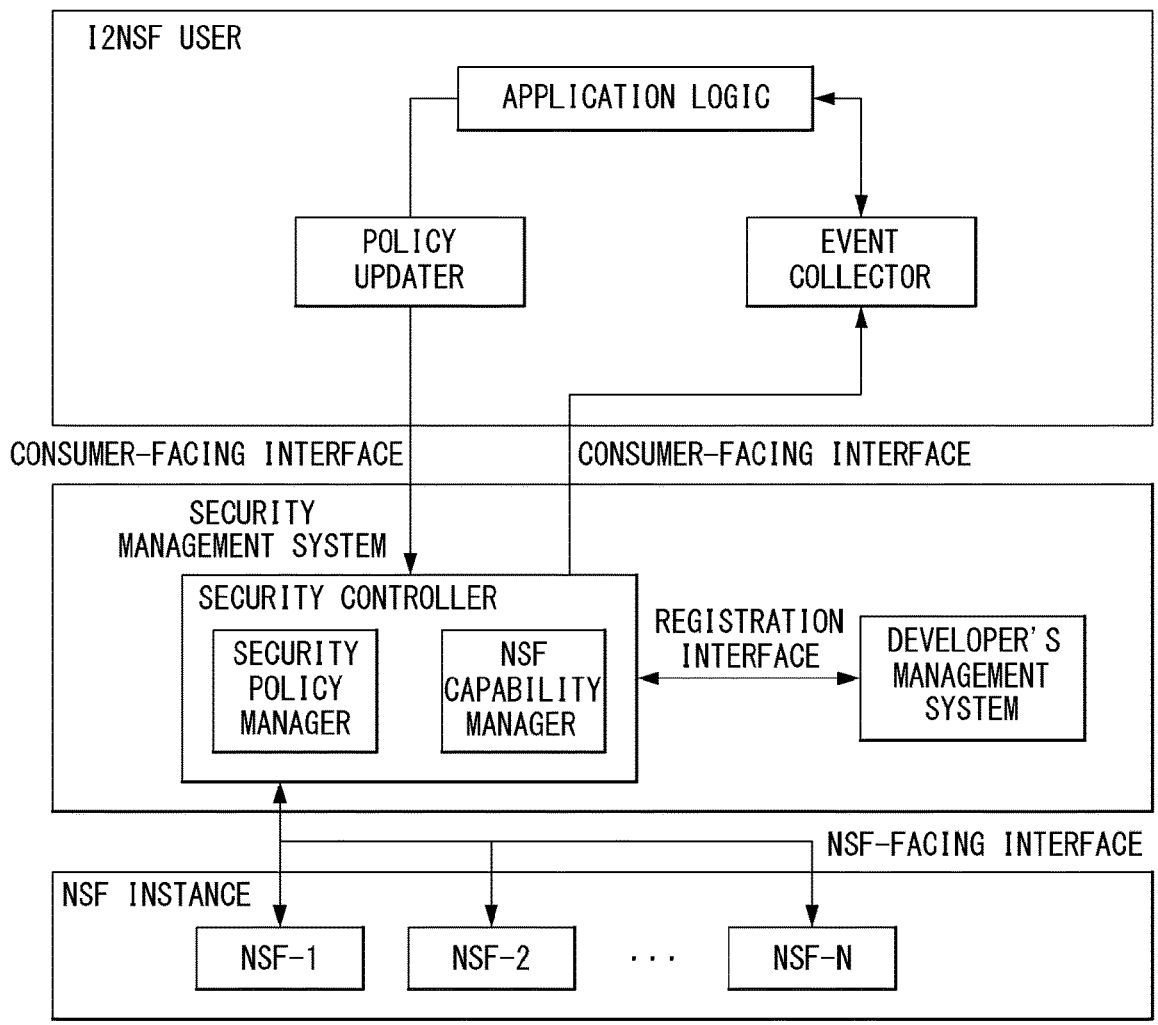

[FIG. 3]
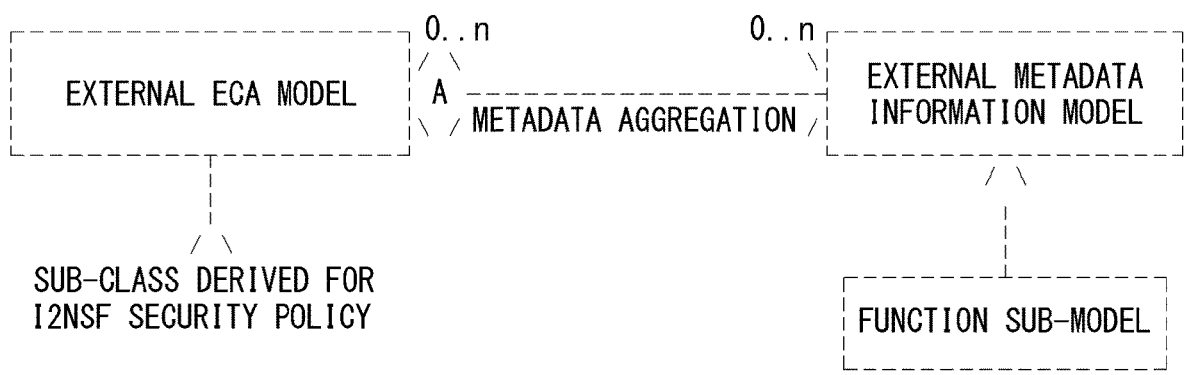
[FIG. 4]
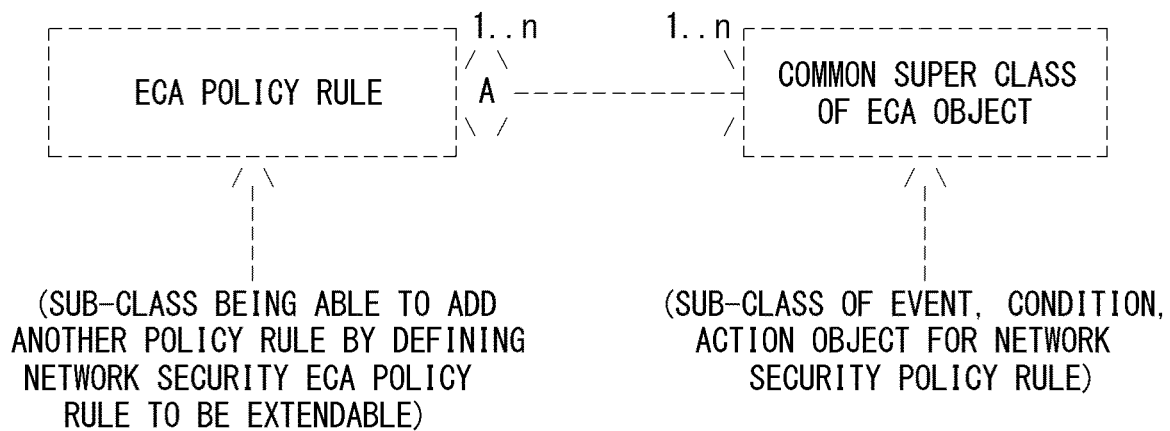

[FIG. 5]
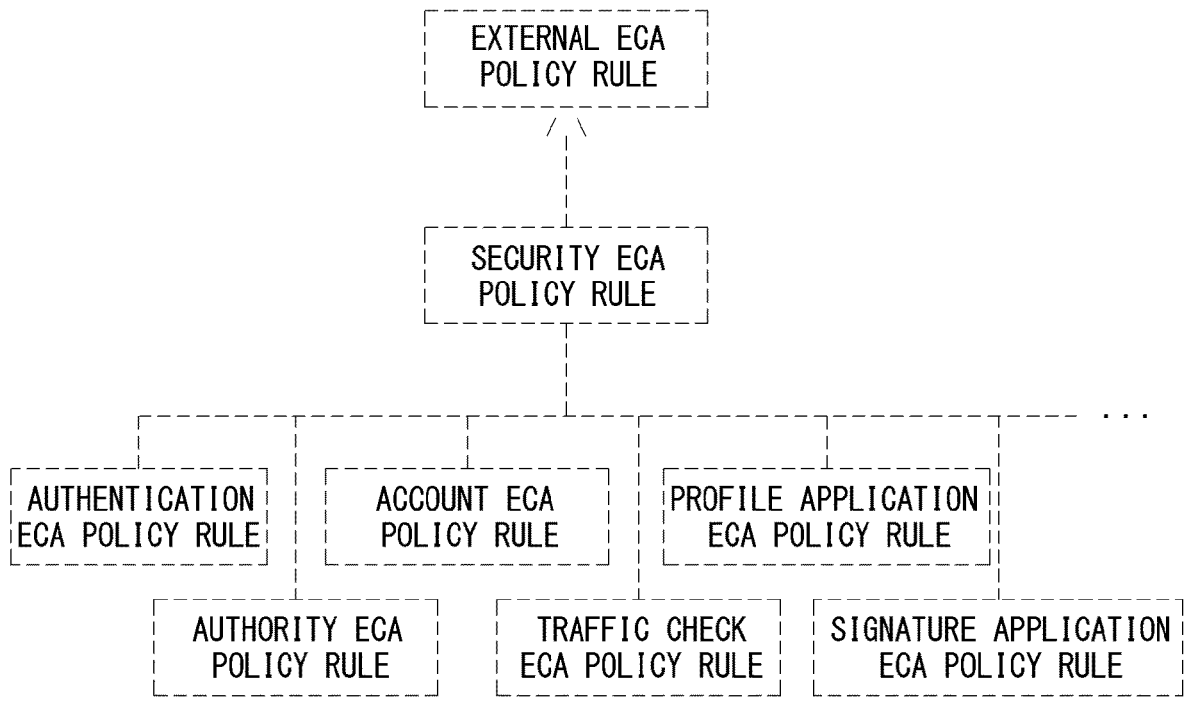
[FIG. 6]
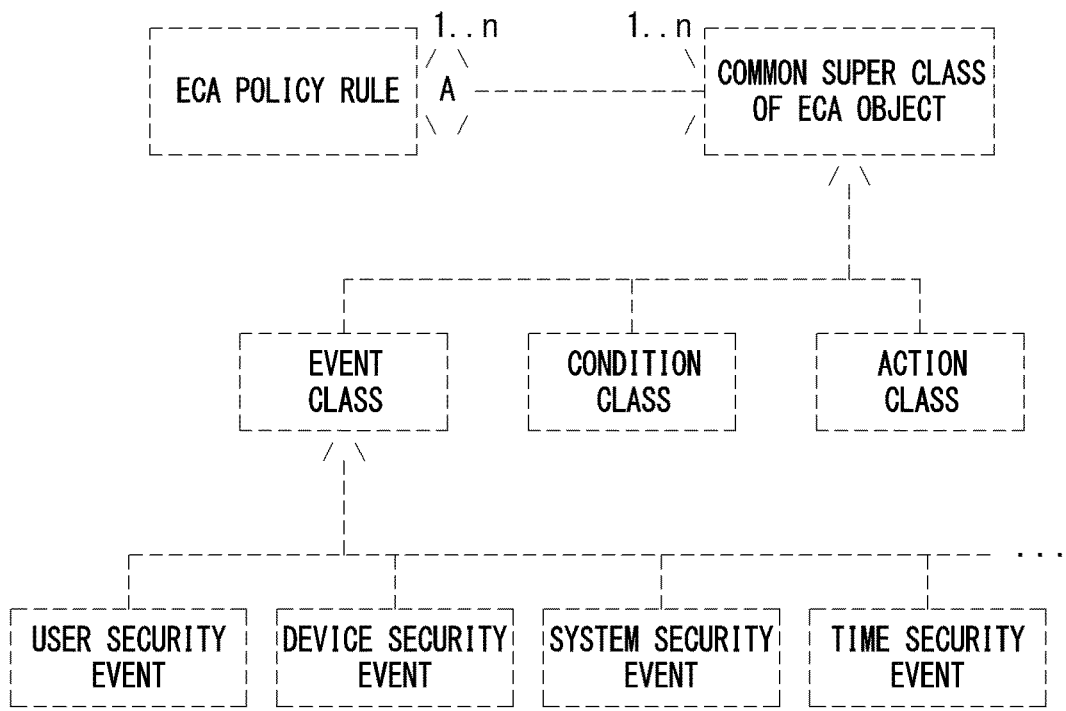

[FIG. 7]
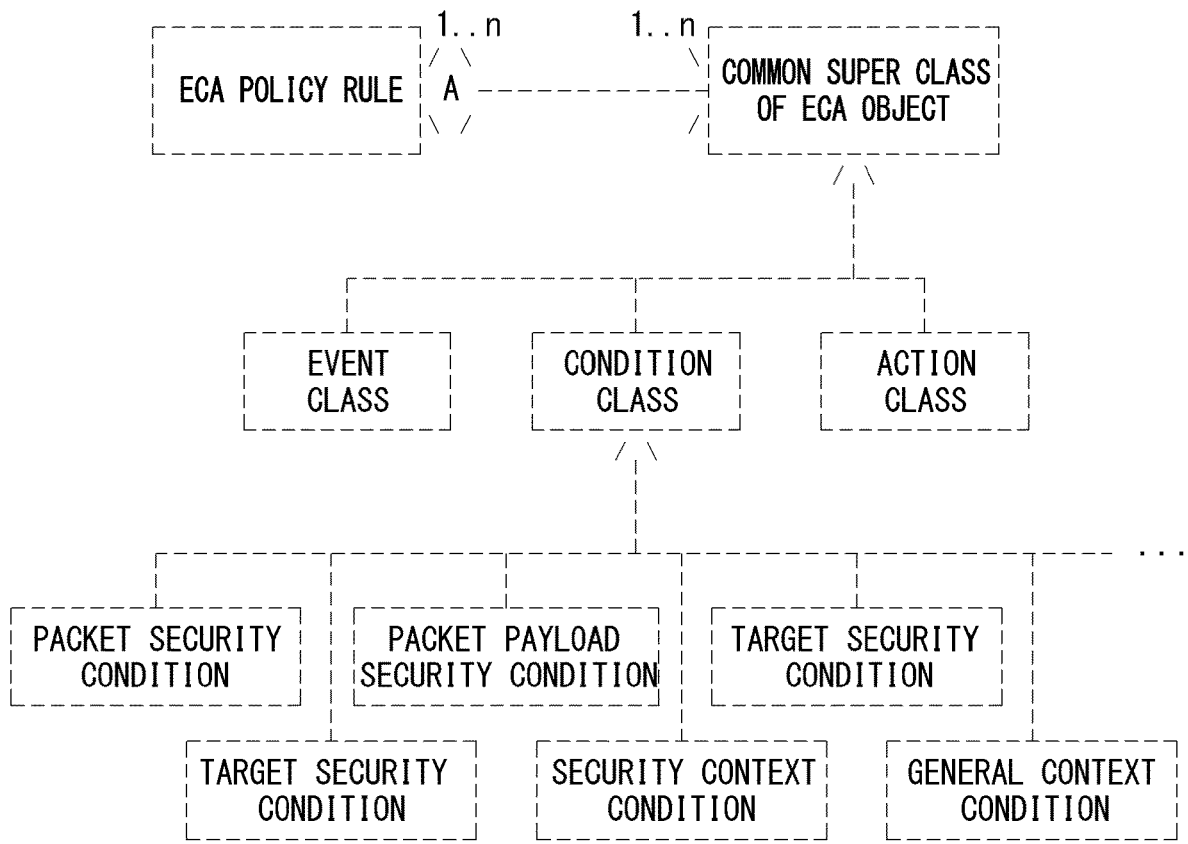
[FIG. 8]
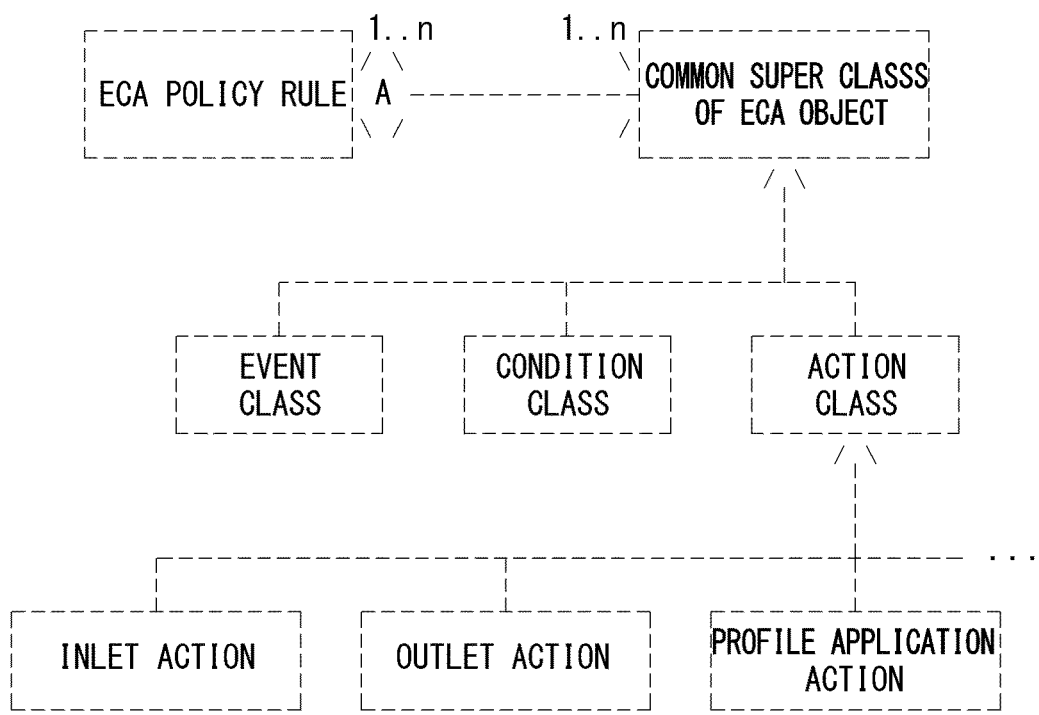

[FIG. 9]
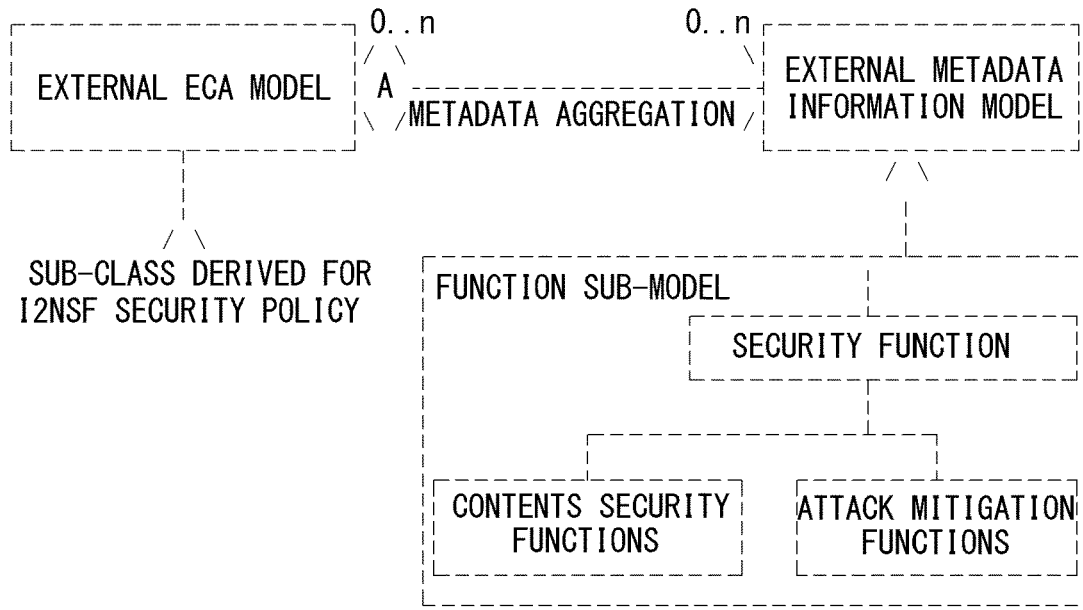
[FIG. 10]
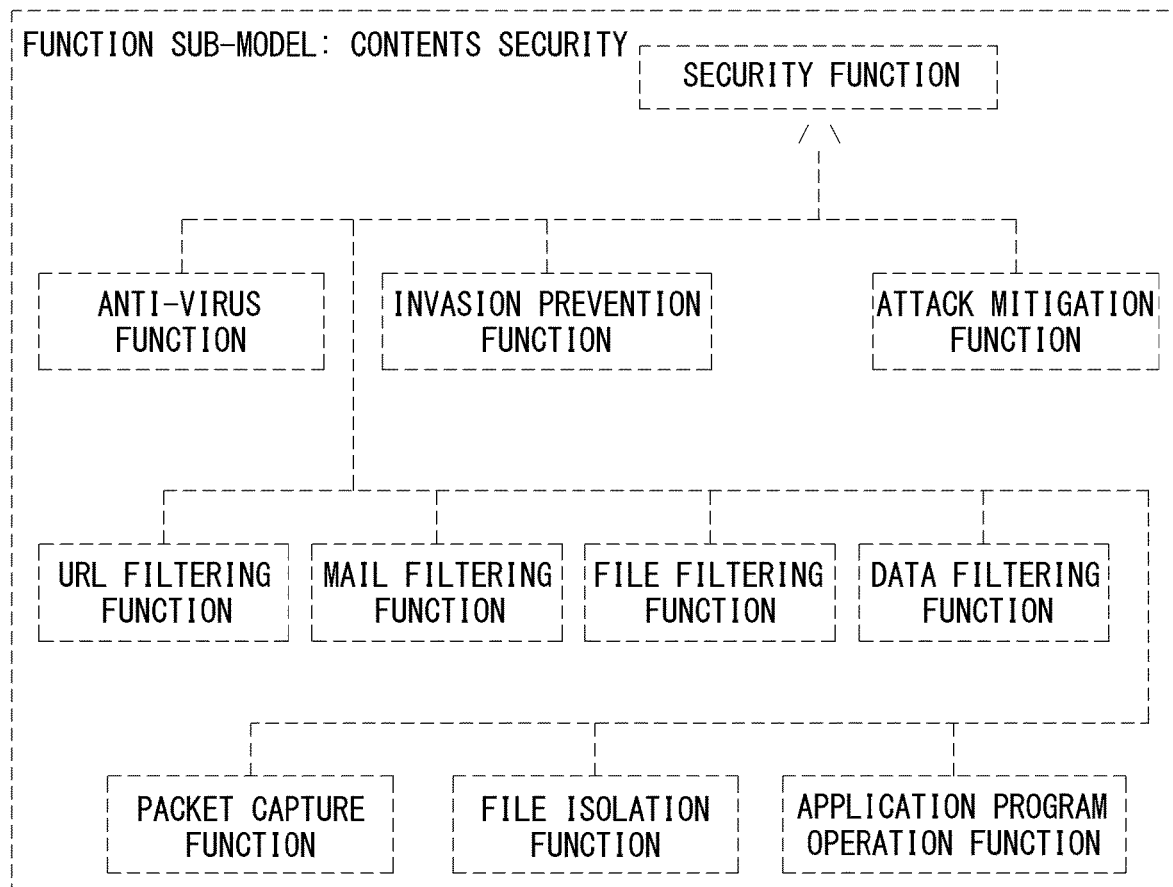

[FIG. 11]
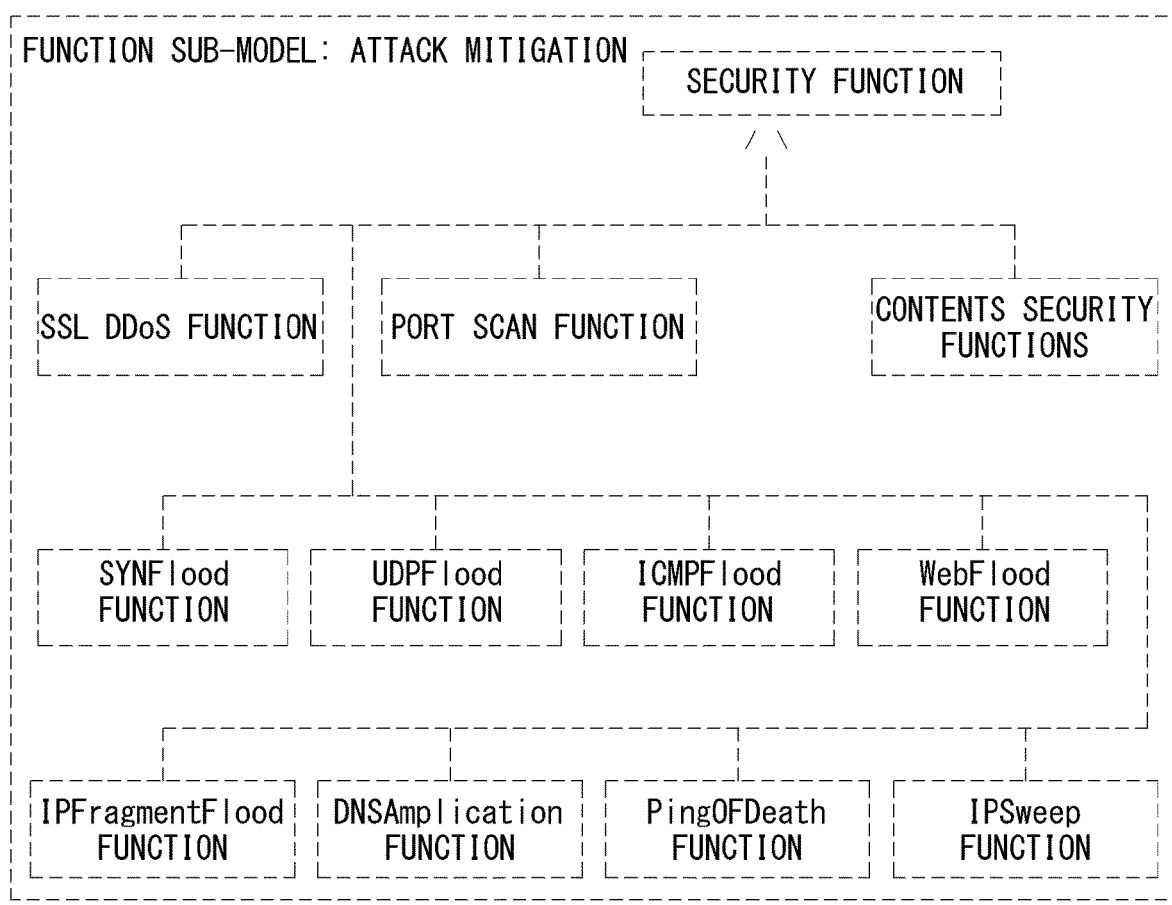

[FIG. 12]

```
module: ietf-i2nsf-policy-rule-for-nsf
  +--rw i2nsf-security-policy
     +--rw system-policy* [system-policy-name]
        +--rw system-policy-name      string
        +--rw priority-usage?         identityref
        +--rw resolution-strategy?    identityref
        +--rw default-action?         identityref
        +--rw rules* [rule-name]
        |  +--rw rule-name                  string
        |  +--rw rule-description?          string
        |  +--rw rule-priority?             uint8
        |  +--rw rule-enable?               boolean
        |  +--rw rule-session-aging-time?         uint16
        |  +--rw rule-long-connection
        |  |  +--rw enable?     boolean
        |  |  +--rw duration?   uint16
        |  +--rw time-intervals
        |  |  +--rw absolute-time-interval
        |  |  |  +--rw start-time?   start-time-type
        |  |  |  +--rw end-time?     end-time-type
        |  |  +--rw periodic-time-interval
        |  |     +--rw day
        |  |     |  +--rw every-day?        boolean
        |  |     |  +--rw specific-day*     day-type
        |  |     +--rw month
        |  |        +--rw every-month?       boolean
        |  |        +--rw specific-month*    month-type
        |  +--rw event-clause-container
        |  |  ...
        |  +--rw condition-clause-container
        |  |  ...
        |  +--rw action-clause-container
        |     ...
        +--rw rule-group
           +--rw groups* [group-name]
              +--rw group-name    string
              +--rw rule-range
              |  +--rw start-rule?   string
              |  +--rw end-rule?     string
              +--rw enable?       boolean
              +--rw description?  string
     +--rw i2nsf-ipsec?   identityref
```

[FIG. 13]

```
module: ietf-i2nsf-policy-rule-for-nsf
  +--rw i2nsf-security-policy
    +--rw system-policy* [system-policy-name]
    |   ...
    |   +--rw rules* [rule-name]
    |   |   ...
    |   |   +--rw event-clause-container
    |   |   |   +--rw event-clause-description?   string
    |   |   |   +--rw event-clauses
    |   |   |       +--rw system-event*    identityref
    |   |   |       +--rw system-alarm*    identityref
    |   |   +--rw condition-clause-container
    |   |   |   ...
    |   |   +--rw action-clause-container
    |   |       ...
    |   +--rw rule-group
    |       ...
    +--rw i2nsf-ipsec?   identityref
```

[FIG. 14A]

This section shows the YANG tree diagram for a condition clause of I2NSF security policy rules.

```
module: ietf-i2nsf-policy-rule-for-nsf
  +--rw i2nsf-security-policy
    |   ...
    |   +--rw rules* [rule-name]
    |   |   ...
    |   |   +--rw event-clause-container
    |   |   |   ...
    |   |   +--rw condition-clause-container
    |   |   |   +--rw condition-clause-description?           string
    |   |   |   +--rw packet-security-ipv4-condition
    |   |   |   |   +--rw ipv4-description?                   string
```

[FIG. 14B]

```
   |    |    |    |      +--rw pkt-sec-ipv4-header-length
   |    |    |    |      |  +--rw (match-type)?
   |    |    |    |      |     +--:(exact-match)
   |    |    |    |      |     |  +--rw ipv4-header-length*         uint8
   |    |    |    |      |     +--:(range-match)
   |    |    |    |      |        +--rw range-ipv4-header-length*
[start-ipv4-header-length end-ipv4-header-length]
   |    |    |    |      |           +--rw start-ipv4-header-length  uint8
   |    |    |    |      |           +--rw end-ipv4-header-length    uint8
   |    |    |    |      +--rw pkt-sec-ipv4-tos*                     identityref
   |    |    |    |      +--rw pkt-sec-ipv4-total-length
   |    |    |    |      |  +--rw (match-type)?
   |    |    |    |      |     +--:(exact-match)
   |    |    |    |      |     |  +--rw ipv4-total-length*           uint16
   |    |    |    |      |     +--:(range-match)
   |    |    |    |      |        +--rw range-ipv4-total-length*
[start-ipv4-total-length end-ipv4-total-length]
   |    |    |    |      |           +--rw start-ipv4-total-length   uint16
   |    |    |    |      |           +--rw end-ipv4-total-length     uint16
   |    |    |    |      +--rw pkt-sec-ipv4-id*                      uint16
   |    |    |    |      +--rw pkt-sec-ipv4-fragment-flags*          identityref
   |    |    |    |      +--rw pkt-sec-ipv4-fragment-offset
   |    |    |    |      |  +--rw (match-type)?
   |    |    |    |      |     +--:(exact-match)
   |    |    |    |      |     |  +--rw ipv4-fragment-offset*        uint16
   |    |    |    |      |     +--:(range-match)
   |    |    |    |      |        +--rw range-ipv4-fragment-offset*
[start-ipv4-fragment-offset end-ipv4-fragment-offset]
   |    |    |    |      |           +--rw start-ipv4-fragment-offset  uint16
   |    |    |    |      |           +--rw end-ipv4-fragment-offset    uint16
   |    |    |    |      +--rw pkt-sec-ipv4-ttl
   |    |    |    |      |  +--rw (match-type)?
   |    |    |    |      |     +--:(exact-match)
   |    |    |    |      |     |  +--rw ipv4-ttl*           uint8
   |    |    |    |      |     +--:(range-match)
   |    |    |    |      |        +--rw range-ipv4-ttl*
[start-ipv4-ttl end-ipv4-ttl]
   |    |    |    |      |           +--rw start-ipv4-ttl   uint8
   |    |    |    |      |           +--rw end-ipv4-ttl     uint8
   |    |    |    |      +--rw pkt-sec-ipv4-protocol*                identityref
   |    |    |    |      +--rw pkt-sec-ipv4-src
   |    |    |    |         +--rw (match-type)?
   |    |    |    |            +--:(exact-match)
   |    |    |    |            |  +--rw ipv4-address* [ipv4]
   |    |    |    |            |     +--rw ipv4                      inet:ipv4-address
   |    |    |    |            |     +--rw (subnet)?
   |    |    |    |            |        +--:(prefix-length)
   |    |    |    |            |        |  +--rw prefix-length?      uint8
```

[FIG. 14C]

```
|   |   |   |   |            |         +---:(netmask)
|   |   |   |   |            |            +--rw netmask?         yang:dotted-quad
|   |   |   |   |            +---:(range-match)
|   |   |   |   |               +--rw range-ipv4-address*
[start-ipv4-address end-ipv4-address]
|   |   |   |   |                  +--rw start-ipv4-address   inet:ipv4-address
|   |   |   |   |                  +--rw end-ipv4-address     inet:ipv4-address
|   |   |   |   +--rw pkt-sec-ipv4-dest
|   |   |   |   |   +--rw (match-type)?
|   |   |   |   |      +---:(exact-match)
|   |   |   |   |      |  +--rw ipv4-address* [ipv4]
|   |   |   |   |      |     +--rw ipv4                 inet:ipv4-address
|   |   |   |   |      |     +--rw (subnet)?
|   |   |   |   |      |        +---:(prefix-length)
|   |   |   |   |      |        |  +--rw prefix-length?   uint8
|   |   |   |   |      |        +---:(netmask)
|   |   |   |   |      |           +--rw netmask?         yang:dotted-quad
|   |   |   |   |      +---:(range-match)
|   |   |   |   |         +--rw range-ipv4-address*
[start-ipv4-address end-ipv4-address]
|   |   |   |   |            +--rw start-ipv4-address   inet:ipv4-address
|   |   |   |   |            +--rw end-ipv4-address     inet:ipv4-address
|   |   |   |   +--rw pkt-sec-ipv4-ipopts*              identityref
|   |   |   |   +--rw pkt-sec-ipv4-sameip?              boolean
|   |   |   |   +--rw pkt-sec-ipv4-geoip*               string
|   |   |   +--rw packet-security-ipv6-condition
|   |   |   |   +--rw ipv6-description?                 string
|   |   |   |   +--rw pkt-sec-ipv6-traffic-class*       identityref
|   |   |   |   +--rw pkt-sec-ipv6-flow-label
|   |   |   |   |   +--rw (match-type)?
|   |   |   |   |      +---:(exact-match)
|   |   |   |   |      |  +--rw ipv6-flow-label*           uint32
|   |   |   |   |      +---:(range-match)
|   |   |   |   |         +--rw range-ipv6-flow-label*
[start-ipv6-flow-label end-ipv6-flow-label]
|   |   |   |   |            +--rw start-ipv6-flow-label   uint32
|   |   |   |   |            +--rw end-ipv6-flow-label     uint32
|   |   |   |   +--rw pkt-sec-ipv6-payload-length
|   |   |   |   |   +--rw (match-type)?
|   |   |   |   |      +---:(exact-match)
|   |   |   |   |      |  +--rw ipv6-payload-length*           uint16
|   |   |   |   |      +---:(range-match)
|   |   |   |   |         +--rw range-ipv6-payload-length*
[start-ipv6-payload-length end-ipv6-payload-length]
|   |   |   |   |            +--rw start-ipv6-payload-length   uint16
|   |   |   |   |            +--rw end-ipv6-payload-length     uint16
|   |   |   |   +--rw pkt-sec-ipv6-next-header*         identityref
|   |   |   |   +--rw pkt-sec-ipv6-hop-limit
```

[FIG. 14D]

```
|   |   |   |   |   +--rw (match-type)?
|   |   |   |   |      +--:(exact-match)
|   |   |   |   |      |  +--rw ipv6-hop-limit*           uint8
|   |   |   |   |      +--:(range-match)
|   |   |   |   |         +--rw range-ipv6-hop-limit*
[start-ipv6-hop-limit end-ipv6-hop-limit]
|   |   |   |   |            +--rw start-ipv6-hop-limit   uint8
|   |   |   |   |            +--rw end-ipv6-hop-limit     uint8
|   |   |   |   +--rw pkt-sec-ipv6-src
|   |   |   |   |  +--rw (match-type)?
|   |   |   |   |     +--:(exact-match)
|   |   |   |   |     |  +--rw ipv6-address* [ipv6]
|   |   |   |   |     |     +--rw ipv6             inet:ipv6-address
|   |   |   |   |     |     +--rw prefix-length?   uint8
|   |   |   |   |     +--:(range-match)
|   |   |   |   |        +--rw range-ipv6-address*
[start-ipv6-address end-ipv6-address]
|   |   |   |   |            +--rw start-ipv6-address   inet:ipv6-address
|   |   |   |   |            +--rw end-ipv6-address     inet:ipv6-address
|   |   |   |   +--rw pkt-sec-ipv6-dest
|   |   |   |      +--rw (match-type)?
|   |   |   |         +--:(exact-match)
|   |   |   |         |  +--rw ipv6-address* [ipv6]
|   |   |   |         |     +--rw ipv6             inet:ipv6-address
|   |   |   |         |     +--rw prefix-length?   uint8
|   |   |   |         +--:(range-match)
|   |   |   |            +--rw range-ipv6-address*
[start-ipv6-address end-ipv6-address]
|   |   |   |                +--rw start-ipv6-address   inet:ipv6-address
|   |   |   |                +--rw end-ipv6-address     inet:ipv6-address
|   |   |   +--rw packet-security-tcp-condition
|   |   |   |  +--rw tcp-description?             string
|   |   |   +--rw pkt-sec-tcp-src-port-num
|   |   |   |  +--rw (match-type)?
|   |   |   |     +--:(exact-match)
|   |   |   |     |  +--rw port-num*           inet:port-number
|   |   |   |     +--:(range-match)
|   |   |   |        +--rw range-port-num*
[start-port-num end-port-num]
|   |   |   |            +--rw start-port-num   inet:port-number
|   |   |   |            +--rw end-port-num     inet:port-number
|   |   |   +--rw pkt-sec-tcp-dest-port-num
|   |   |      +--rw (match-type)?
|   |   |         +--:(exact-match)
|   |   |         |  +--rw port-num*           inet:port-number
|   |   |         +--:(range-match)
|   |   |            +--rw range-port-num*
[start-port-num end-port-num]
```

FIG. 14E]

```
|   |   |   |   |              +--rw start-port-num     inet:port-number
|   |   |   |   |              +--rw end-port-num       inet:port-number
|   |   |   |   +--rw pkt-sec-tcp-seq-num
|   |   |   |   |  +--rw (match-type)?
|   |   |   |   |     +--:(exact-match)
|   |   |   |   |     |  +--rw tcp-seq-num*             uint32
|   |   |   |   |     +--:(range-match)
|   |   |   |   |        +--rw range-tcp-seq-num*
[start-tcp-seq-num end-tcp-seq-num]
|   |   |   |   |              +--rw start-tcp-seq-num  uint32
|   |   |   |   |              +--rw end-tcp-seq-num    uint32
|   |   |   |   +--rw pkt-sec-tcp-ack-num
|   |   |   |   |  +--rw (match-type)?
|   |   |   |   |     +--:(exact-match)
|   |   |   |   |     |  +--rw tcp-ack-num*             uint32
|   |   |   |   |     +--:(range-match)
|   |   |   |   |        +--rw range-tcp-ack-num*
[start-tcp-ack-num end-tcp-ack-num]
|   |   |   |   |              +--rw start-tcp-ack-num  uint32
|   |   |   |   |              +--rw end-tcp-ack-num    uint32
|   |   |   |   +--rw pkt-sec-tcp-window-size
|   |   |   |   |  +--rw (match-type)?
|   |   |   |   |     +--:(exact-match)
|   |   |   |   |     |  +--rw tcp-window-size*         uint16
|   |   |   |   |     +--:(range-match)
|   |   |   |   |        +--rw range-tcp-window-size*
[start-tcp-window-size end-tcp-window-size]
|   |   |   |   |              +--rw start-tcp-window-size  uint16
|   |   |   |   |              +--rw end-tcp-window-size    uint16
|   |   |   |   +--rw pkt-sec-tcp-flags*                identityref
|   |   |   +--rw packet-security-udp-condition
|   |   |   |   +--rw udp-description?                  string
|   |   |   |   +--rw pkt-sec-udp-src-port-num
|   |   |   |   |  +--rw (match-type)?
|   |   |   |   |     +--:(exact-match)
|   |   |   |   |     |  +--rw port-num*                inet:port-number
|   |   |   |   |     +--:(range-match)
|   |   |   |   |        +--rw range-port-num*
[start-port-num end-port-num]
|   |   |   |   |              +--rw start-port-num     inet:port-number
|   |   |   |   |              +--rw end-port-num       inet:port-number
|   |   |   |   +--rw pkt-sec-udp-dest-port-num
|   |   |   |   |  +--rw (match-type)?
|   |   |   |   |     +--:(exact-match)
|   |   |   |   |     |  +--rw port-num*                inet:port-number
|   |   |   |   |     +--:(range-match)
|   |   |   |   |        +--rw range-port-num*
[start-port-num end-port-num]
```

[FIG. 14F]

```
|    |    |    |              +--rw start-port-num    inet:port-number
|    |    |    |              +--rw end-port-num      inet:port-number
|    |    |    +--rw pkt-sec-udp-total-length
|    |    |    |  +--rw (match-type)?
|    |    |    |     +--:(exact-match)
|    |    |    |     |  +--rw udp-total-length*        uint32
|    |    |    |     +--:(range-match)
|    |    |    |        +--rw range-udp-total-length*
[start-udp-total-length end-udp-total-length]
|    |    |    |           +--rw start-udp-total-length    uint32
|    |    |    |           +--rw end-udp-total-length      uint32
|    |    |    +--rw packet-security-icmp-condition
|    |    |    |  +--rw icmp-description?              string
|    |    |    |  +--rw pkt-sec-icmp-type-and-code*    identityref
|    |    |    +--rw packet-security-url-category-condition
|    |    |    |  +--rw url-category-description?    string
|    |    |    |  +--rw pre-defined-category*        string
|    |    |    |  +--rw user-defined-category*       string
|    |    |    +--rw packet-security-voice-condition
|    |    |    |  +--rw voice-description?           string
|    |    |    |  +--rw pkt-sec-src-voice-id*        string
|    |    |    |  +--rw pkt-sec-dest-voice-id*       string
|    |    |    |  +--rw pkt-sec-user-agent*          string
|    |    |    +--rw packet-security-ddos-condition
|    |    |    |  +--rw ddos-description?     string
|    |    |    |  +--rw pkt-sec-alert-rate?   uint32
|    |    |    +--rw packet-security-payload-condition
|    |    |       +--rw packet-payload-description?    string
|    |    |       +--rw pkt-payload-content*           string
|    |    +--rw context-condition
|    |       +--rw context-description?    string
|    |       +--rw application-condition
|    |       |  +--rw application-description?    string
|    |       |  +--rw application-object*         string
|    |       |  +--rw application-group*          string
|    |       |  +--rw application-label*          string
|    |       |  +--rw category
|    |       |     +--rw application-category*
[name application-subcategory]
|    |       |        +--rw name                        string
|    |       |        +--rw application-subcategory     string
|    |       +--rw target-condition
|    |       |  +--rw target-description?       string
|    |       |  +--rw device-sec-context-cond
|    |       |     +--rw target-device*    identityref
|    |       +--rw users-condition
|    |          +--rw users-description?    string
|    |          +--rw user
```

[FIG. 14G]

```
|      |     |   |   +--rw (user-name)?
|      |     |   |      +--:(tenant)
|      |     |   |      |  +--rw tenant      uint8
|      |     |   |      +--:(vn-id)
|      |     |   |         +--rw vn-id       uint8
|      |     |   +--rw group
|      |     |   |  +--rw (group-name)?
|      |     |   |     +--:(tenant)
|      |     |   |     |  +--rw tenant      uint8
|      |     |   |     +--:(vn-id)
|      |     |   |        +--rw vn-id       uint8
|      |     |   +--rw security-group           string
|      |     +--rw gen-context-condition
|      |        +--rw gen-context-description?  string
|      |        +--rw geographic-location
|      |           +--rw src-geographic-location*   uint32
|      |           +--rw dest-geographic-location*  uint32
|      +--rw action-clause-container
|         ...
+--rw rule-group
   ...
+--rw i2nsf-ipsec?   identityref
```

[FIG. 15A]

4.4. Action Clause

This section shows the YANG tree diagram for an action clause of an I2NSF security policy rule.

```
module: ietf-i2nsf-policy-rule-for-nsf
  +--rw i2nsf-security-policy
     ...
        +--rw rules* [rule-name]
           ...
           +--rw event-clause-container
           |  ...
           +--rw condition-clause-container
           |  ...
           +--rw action-clause-container
              +--rw action-clause-description?   string
              +--rw packet-action
              |  +--rw ingress-action?   identityref
              |  +--rw egress-action?    identityref
              |  +--rw log-action?       identityref
              +--rw advanced-action
                 +--rw content-security-control*    identityref
                 +--rw attack-mitigation-control*   identityref
        +--rw rule-group
           ...
     +--rw i2nsf-ipsec?   identityref
```

[FIG. 15B]

4.5. I2NSF Internet Key Exchange

This section shows the YANG tree diagram for an I2NSF IPsec.

```
module: ietf-i2nsf-policy-rule-for-nsf
  +--rw i2nsf-security-policy
  |   ...
  |      +--rw rules* [rule-name]
  |      |  ...
  |      |  +--rw event-clause-container
  |      |  |  ...
  |      |  +--rw condition-clause-container
  |      |  |  ...
  |      |  +--rw action-clause-container
  |      |     ...
  |      +--rw rule-group
  |         ...
  +--rw i2nsf-ipsec?   identityref
```

[FIG. 16A]

5. YANG Data Module 5.1. I2NSF NSF-Facing Interface YANG Data Module

This section contains a YANG data module for configuration of security policy rules on network security functions.

<CODE BEGINS> file "ietf-i2nsf-policy-rule-for-nsf@2019-11-04.yang"

```
module ietf-i2nsf-policy-rule-for-nsf {
  yang-version 1.1;
  namespace
    "urn:ietf:params:xml:ns:yang:ietf-i2nsf-policy-rule-for-nsf";
  prefix
```

[FIG. 16B]

```
  nsfintf;

import ietf-inet-types{
  prefix inet;
  reference "RFC 6991";
}
import ietf-yang-types{
  prefix yang;
  reference "RFC 6991";
}
import ietf-key-chain{
  prefix key-chain;
  reference "RFC 8177";
} organization
  "IETF I2NSF (Interface to Network Security Functions)
   Working Group";

contact
  "WG Web: <http://tools.ietf.org/wg/i2nsf>
   WG List: <mailto:i2nsf@ietf.org>

WG Chair: Linda Dunbar
   <mailto:ldunbar@futurewei.com>

WG Chair: Yoav Nir
   <mailto:ynir.ietf@gmail.com>

Editor: Jingyong Tim Kim
   <mailto:timkim@skku.edu>

Editor: Jaehoon Paul Jeong
   <mailto:pauljeong@skku.edu>

Editor: Susan Hares
   <mailto:shares@ndzh.com>";

description
  "This module defines a YANG data module for the Network Security
   Functions (NSF) facing interface.

Copyright (c) 2019 IETF Trust and the persons
   identified as authors of the code. All rights reserved.

Redistribution and use in source and binary forms, with or
   without modification, is permitted pursuant to, and subject
   to the license terms contained in, the Simplified BSD License
```

[FIG. 16C]

```
   set forth in Section 4.c of the IETF Trust's Legal Provisions
   Relating to IETF Documents
   (http://trustee.ietf.org/license-info).

This version of this YANG module is part of RFC XXXX; see
   the RFC itself for full legal notices.";

revision "2019-11-04"{
  description "The latest revision.";
  reference
    "RFC XXXX: I2NSF Network Security Function-Facing Interface
     YANG Data Model";
}

/*
 * Identities
 */ identity priority-usage-type {
  description
    "Base identity for priority usage type.";
} identity priority-by-order {
  base priority-usage-type;
  description
    "Identity for priority by order";
} identity priority-by-number {
  base priority-usage-type;
  description
    "Identity for priority by number";
} identity event {
  description
    "Base identity for policy events";
  reference
    "draft-ietf-i2nsf-nsf-monitoring-data-model-02
     - Event";
} identity system-event {
  base event;
  description
    "Identity for system events";
```

[FIG. 16D]

```
    reference
      "draft-ietf-i2nsf-nsf-monitoring-data-model-02
      - System event";
  } identity system-alarm {
    base event;
    description
      "Identity for system alarms";
    reference
      "draft-ietf-i2nsf-nsf-monitoring-data-model-02
      - System alarm";
  } identity access-violation {
    base system-event;
    description
      "Identity for access violation
      system events";
    reference
      "draft-ietf-i2nsf-nsf-monitoring-data-model-02
      - System event";
  } identity configuration-change {
    base system-event;
    description
      "Identity for configuration change
      system events";
    reference
      "draft-ietf-i2nsf-nsf-monitoring-data-model-02
      - System event";
  } identity memory-alarm {
    base system-alarm;
    description
      "Identity for memory alarm
      system alarms";
    reference
      "draft-ietf-i2nsf-nsf-monitoring-data-model-02
      - System alarm";
  } identity cpu-alarm {
    base system-alarm;
    description
      "Identity for CPU alarm
```

[FIG. 16E]

```
    system alarms";
  reference
    "draft-ietf-i2nsf-nsf-monitoring-data-model-02
    - System alarm";
} identity disk-alarm {
  base system-alarm;
  description
    "Identity for disk alarm
    system alarms";
  reference
    "draft-ietf-i2nsf-nsf-monitoring-data-model-02
    - System alarm";
} identity hardware-alarm {
  base system-alarm;
  description
    "Identity for hardware alarm
    system alarms";
  reference
    "draft-ietf-i2nsf-nsf-monitoring-data-model-02
    - System alarm";
} identity interface-alarm {
  base system-alarm;
  description
    "Identity for interface alarm
    system alarms";
  reference
    "draft-ietf-i2nsf-nsf-monitoring-data-model-02
    - System alarm";
} identity type-of-service {
  description
    "Base identity for type of service of IPv4";
  reference
    "RFC 791: Internet Protocol - Type of Service";
} identity traffic-class {
  description
    "Base identity for traffic-class of IPv6";
  reference
    "RFC 8200: Internet Protocol, Version 6 (IPv6)
```

[FIG. 16F]

```
    Specification - Traffic Class";
} identity normal {
  base type-of-service;
  base traffic-class;
  description
    "Identity for normal IPv4 TOS and IPv6 Traffic Class";
  reference
    "RFC 791: Internet Protocol - Type of Service
     RFC 8200: Internet Protocol, Version 6 (IPv6)
     Specification - Traffic Class";
} identity minimize-cost {
  base type-of-service;
  base traffic-class;
  description
    "Identity for 'minimize monetary cost' IPv4 TOS and
    IPv6 Traffic Class";
  reference
    "RFC 791: Internet Protocol - Type of Service
     RFC 8200: Internet Protocol, Version 6 (IPv6)
     Specification - Traffic Class";
} identity maximize-reliability {
  base type-of-service;
  base traffic-class;
  description
    "Identity for 'maximize reliability' IPv4 TOS and
    IPv6 Traffic Class";
  reference
    "RFC 791: Internet Protocol - Type of Service
     RFC 8200: Internet Protocol, Version 6 (IPv6)
     Specification - Traffic Class";
} identity maximize-throughput {
  base type-of-service;
  base traffic-class;
  description
    "Identity for 'maximize throughput' IPv4 TOS and
    IPv6 Traffic Class";
  reference
    "RFC 791: Internet Protocol - Type of Service
     RFC 8200: Internet Protocol, Version 6 (IPv6)
     Specification - Traffic Class";
```

[FIG. 16G]

```
} identity minimize-delay {
  base type-of-service;
  base traffic-class;
  description
    "Identity for 'minimize delay' IPv4 TOS and
    IPv6 Traffic Class";
  reference
    "RFC 791: Internet Protocol - Type of Service
     RFC 8200: Internet Protocol, Version 6 (IPv6)
     Specification - Traffic Class";
} identity maximize-security {
  base type-of-service;
  base traffic-class;
  description
    "Identity for 'maximize security' IPv4 TOS and
    IPv6 Traffic Class";
  reference
    "RFC 791: Internet Protocol - Type of Service
     RFC 8200: Internet Protocol, Version 6 (IPv6)
     Specification - Traffic Class";
} identity fragmentation-flags-type {
  description
    "Base identity for fragmentation flags type";
  reference
    "RFC 791: Internet Protocol - Fragmentation Flags";
} identity fragment {
  base fragmentation-flags-type;
  description
    "Identity for 'More fragment' flag";
  reference
    "RFC 791: Internet Protocol - Fragmentation Flags";
} identity no-fragment {
  base fragmentation-flags-type;
  description
    "Identity for 'Do not fragment' flag";
  reference
    "RFC 791: Internet Protocol - Fragmentation Flags";
}
```

[FIG. 16H]

```
identity reserved {
  base fragmentation-flags-type;
  description
    "Identity for reserved flags";
  reference
    "RFC 791: Internet Protocol - Fragmentation Flags";
} identity protocol {
  description
    "Base identity for protocol of IPv4";
  reference
    "RFC 3232: Assigned Numbers: RFC 1700 is Replaced by an
        On-line Database
     RFC 791: Internet Protocol - Protocol";
} identity next-header {
  description
    "Base identity for IPv6 next header";
  reference
    "RFC 8200: Internet Protocol, Version 6 (IPv6)
     Specification - Next Header";
} identity icmp {
  base protocol;
  base next-header;
  description
    "Identity for ICMP IPv4 protocol and
     IPv6 nett header";
  reference
    "RFC 3232: Assigned Numbers: RFC 1700 is Replaced by an
        On-line Database
     RFC  791: Internet Protocol - Protocol
     RFC 8200: Internet Protocol, Version 6 (IPv6)
     Specification - Next Header";
} identity igmp {
  base protocol;
  base next-header;
  description
    "Identity for IGMP IPv4 protocol and
     IPv6 next header";
  reference
    "RFC 3232: Assigned Numbers: RFC 1700 is Replaced by an
        On-line Database
```

[FIG. 16I]

```
    RFC  791: Internet Protocol - Protocol
    RFC 8200: Internet Protocol, Version 6 (IPv6)
    Specification - Next Header";
} identity tcp {
  base protocol;
  base next-header;
  description
    "Identity for TCP protocol";
  reference
    "RFC 3232: Assigned Numbers: RFC 1700 is Replaced by an
         On-line Database
    RFC  791: Internet Protocol - Protocol
    RFC 8200: Internet Protocol, Version 6 (IPv6)
    Specification - Next Header";
} identity igrp {
  base protocol;
  base next-header;
  description
    "Identity for IGRP IPv4 protocol
    and IPv6 next header";
  reference
    "RFC 3232: Assigned Numbers: RFC 1700 is Replaced by an
         On-line Database
    RFC  791: Internet Protocol - Protocol
    RFC 8200: Internet Protocol, Version 6 (IPv6)
    Specification - Next Header";
} identity udp {
  base protocol;
  base next-header;
  description
    "Identity for UDP IPv4 protocol
    and IPv6 next header";
  reference
    "RFC 3232: Assigned Numbers: RFC 1700 is Replaced by an
         On-line Database
    RFC  791: Internet Protocol - Protocol
    RFC 8200: Internet Protocol, Version 6 (IPv6)
    Specification - Next Header";
} identity gre {
  base protocol;
```

[FIG. 16J]

```
    base next-header;
    description
      "Identity for GRE IPv4 protocol
      and IPv6 next header";
    reference
      "RFC 3232: Assigned Numbers: RFC 1700 is Replaced by an
          On-line Database
       RFC  791: Internet Protocol - Protocol
       RFC 8200: Internet Protocol, Version 6 (IPv6)
       Specification - Next Header";
  } identity esp {
    base protocol;
    base next-header;
    description
      "Identity for ESP IPv4 protocol
      and IPv6 next header";
    reference
      "RFC 3232: Assigned Numbers: RFC 1700 is Replaced by an
          On-line Database
       RFC  791: Internet Protocol - Protocol
       RFC 8200: Internet Protocol, Version 6 (IPv6)
       Specification - Next Header";
  } identity ah {
    base protocol;
    base next-header;
    description
      "Identity for AH IPv4 protocol
      and IPv6 next header";
    reference
      "RFC 3232: Assigned Numbers: RFC 1700 is Replaced by an
          On-line Database
       RFC  791: Internet Protocol - Protocol
       RFC 8200: Internet Protocol, Version 6 (IPv6)
       Specification - Next Header";
  } identity mobile {
    base protocol;
    base next-header;
    description
      "Identity for mobile IPv4 protocol
      and IPv6 next header";
    reference
      "RFC 3232: Assigned Numbers: RFC 1700 is Replaced by an
```

[FIG. 16K]

```
        On-line Database
    RFC  791: Internet Protocol - Protocol
    RFC 8200: Internet Protocol, Version 6 (IPv6)
    Specification - Next Header";
} identity tlsp {
  base protocol;
  base next-header;
  description
    "Identity for TLSP IPv4 protocol
    and IPv6 next header";
  reference
    "RFC 3232: Assigned Numbers: RFC 1700 is Replaced by an
        On-line Database
    RFC  791: Internet Protocol - Protocol
    RFC 8200: Internet Protocol, Version 6 (IPv6)
    Specification - Next Header";
} identity skip {
  base protocol;
  base next-header;
  description
    "Identity for skip IPv4 protocol
    and IPv6 next header";
  reference
    "RFC 3232: Assigned Numbers: RFC 1700 is Replaced by an
        On-line Database
    RFC  791: Internet Protocol - Protocol
    RFC 8200: Internet Protocol, Version 6 (IPv6)
    Specification - Next Header";
} identity ipv6-icmp {
  base protocol;
  base next-header;
  description
    "Identity for IPv6 ICMP next header";
  reference
    "RFC 3232: Assigned Numbers: RFC 1700 is Replaced by an
        On-line Database
    RFC 4443: Internet Control Message Protocol (ICMPv6)
    for the Internet Protocol Version 6 (IPv6) Specification
        RFC 8200: Internet Protocol, Version 6 (IPv6)
    Specification - Next Header";
}
```

[FIG. 16L]

```
identity eigrp {
  base protocol;
  base next-header;
  description
    "Identity for EIGRP IPv4 protocol
    and IPv6 next header";
  reference
    "RFC 3232: Assigned Numbers: RFC 1700 is Replaced by an
        On-line Database
    RFC  791: Internet Protocol - Protocol
    RFC 8200: Internet Protocol, Version 6 (IPv6)
    Specification - Next Header";
} identity ospf {
  base protocol;
  base next-header;
  description
    "Identity for OSPF IPv4 protocol
    and IPv6 next header";
  reference
    "RFC 3232: Assigned Numbers: RFC 1700 is Replaced by an
        On-line Database
    RFC  791: Internet Protocol - Protocol
    RFC 8200: Internet Protocol, Version 6 (IPv6)
    Specification - Next Header";
} identity l2tp {
  base protocol;
  base next-header;
  description
    "Identity for L2TP IPv4 protocol
    and IPv6 next header";
  reference
    "RFC 3232: Assigned Numbers: RFC 1700 is Replaced by an
        On-line Database
    RFC  791: Internet Protocol - Protocol
    RFC 8200: Internet Protocol, Version 6 (IPv6)
    Specification - Next Header";
} identity ipopts {
  description
    "Base identity for IP options";
  reference
    "RFC 791: Internet Protocol - Options";
```

[FIG. 16M]

```
} identity rr {
  base ipopts;
  description
    "Identity for 'Record Route' IP Option";
  reference
    "RFC 791: Internet Protocol - Options";
} identity eol {
  base ipopts;
  description
    "Identity for 'End of List' IP Option";
  reference
    "RFC 791: Internet Protocol - Options";
} identity nop {
  base ipopts;
  description
    "Identity for 'No Operation' IP Option";
  reference
    "RFC 791: Internet Protocol - Options";
} identity ts {
  base ipopts;
  description
    "Identity for 'Timestamp' IP Option";
  reference
    "RFC 791: Internet Protocol - Options";
} identity sec {
  base ipopts;
  description
    "Identity for 'IP security' IP Option";
  reference
    "RFC 791: Internet Protocol - Options";
} identity esec {
  base ipopts;
  description
    "Identity for 'IP extended security' IP Option";
  reference
    "RFC 791: Internet Protocol - Options";
```

[FIG. 16N]

```
} identity lsrr {
  base ipopts;
  description
    "Identity for 'Loose Source Routing' IP Option";
  reference
    "RFC 791: Internet Protocol - Options";
} identity ssrr {
  base ipopts;
  description
    "Identity for 'Strict Source Routing' IP Option";
  reference
    "RFC 791: Internet Protocol - Options";
} identity satid {
  base ipopts;
  description
    "Identity for 'Stream Identifier' IP Option";
  reference
    "RFC 791: Internet Protocol - Options";
} identity any {
  base ipopts;
  description
    "Identity for 'any IP options
    included in IPv4 packet";
  reference
    "RFC 791: Internet Protocol - Options";
} identity tcp-flags {
  description
    "Base identity for TCP flags";
  reference
    "RFC 793: Transmission Control Protocol - Flags";
} identity cwr {
  base tcp-flags;
  description
    "Identity for 'Congestion Window Reduced' TCP flag";
  reference
    "RFC 793: Transmission Control Protocol - Flags";
```

[FIG. 16O]

```
} identity ecn {
  base tcp-flags;
  description
    "Identity for 'Explicit Congestion Notification'
    TCP flag";
  reference
    "RFC 793: Transmission Control Protocol - Flags";
} identity urg {
  base tcp-flags;
  description
    "Identity for 'Urgent' TCP flag";
  reference
    "RFC 793: Transmission Control Protocol - Flags";
} identity ack {
  base tcp-flags;
  description
    "Identity for 'acknowledgement' TCP flag";
  reference
    "RFC 793: Transmission Control Protocol - Flags";
} identity psh {
  base tcp-flags;
  description
    "Identity for 'Push' TCP flag";
  reference
    "RFC 793: Transmission Control Protocol - Flags";
} identity rst {
  base tcp-flags;
  description
    "Identity for 'Reset' TCP flag";
  reference
    "RFC 793: Transmission Control Protocol - Flags";
} identity syn {
  base tcp-flags;
  description
    "Identity for 'Synchronize' TCP flag";
  reference
```

[FIG. 16P]

```
    "RFC 793: Transmission Control Protocol - Flags";
} identity fin {
  base tcp-flags;
  description
    "Identity for 'Finish' TCP flag";
  reference
    "RFC 793: Transmission Control Protocol - Flags";
} identity icmp-type {
  description
    "Base identity for ICMP Message types";
  reference
    "RFC 792: Internet Control Message Protocol";
} identity echo-reply {
  base icmp-type;
  description
    "Identity for 'Echo Reply' ICMP message type";
  reference
    "RFC 792: Internet Control Message Protocol";
} identity destination-unreachable {
  base icmp-type;
  description
    "Identity for 'Destination Unreachable'
    ICMP message type";
  reference
    "RFC 792: Internet Control Message Protocol";
} identity redirect {
  base icmp-type;
  description
    "Identity for 'Redirect' ICMP message type";
  reference
    "RFC 792: Internet Control Message Protocol";
} identity echo {
  base icmp-type;
  description
    "Identity for 'Echo' ICMP message type";
```

[FIG. 16Q]

```
    reference
      "RFC 792: Internet Control Message Protocol";
  } identity router-advertisement {
    base icmp-type;
    description
      "Identity for 'Router Advertisement'
      ICMP message type";
    reference
      "RFC 792: Internet Control Message Protocol";
  } identity router-solicitation {
    base icmp-type;
    description
      "Identity for 'Router Solicitation'
      ICMP message type";
    reference
      "RFC 792: Internet Control Message Protocol";
  } identity time-exceeded {
    base icmp-type;
    description
      "Identity for 'Time exceeded' ICMP message type";
    reference
      "RFC 792: Internet Control Message Protocol";
  } identity parameter-problem {
    base icmp-type;
    description
      "Identity for 'Parameter Problem'
      ICMP message type";
    reference
      "RFC 792: Internet Control Message Protocol";
  } identity timestamp {
    base icmp-type;
    description
      "Identity for 'Timestamp' ICMP message type";
    reference
      "RFC 792: Internet Control Message Protocol";
  } identity timestamp-reply {
```

[FIG. 16R]

```
  base icmp-type;
  description
    "Identity for 'Timestamp Reply'
    ICMP message type";
  reference
    "RFC 792: Internet Control Message Protocol";
} identity datagram-conversion-error {
  base icmp-type;
  description
    "Identity for 'Datagram Conversion Error'
    ICMP message type";
  reference
    "RFC 792: Internet Control Message Protocol";
} identity experimental-mobility-protocols {
  base icmp-type;
  description
    "Identity for 'Experimental Mobility Protocols'
    ICMP message type";
  reference
    "RFC 792: Internet Control Message Protocol";
} identity extended-echo-request {
  base icmp-type;
  description
    "Identity for 'Extended Echo Request'
    ICMP message type";
  reference
    "RFC  792: Internet Control Message Protocol
    RFC 8335: PROBE: A Utility for Probing Interfaces";
} identity extended-echo-reply {
  base icmp-type;
  description
    "Identity for 'Extended Echo Reply'
    ICMP message type";
  reference
    "RFC  792: Internet Control Message Protocol
    RFC 8335: PROBE: A Utility for Probing Interfaces";
} identity net-unreachable {
  base icmp-type;
```

[FIG. 16S]

```
  reference
    "RFC 792: Internet Control Message Protocol";
} identity destination-network-unknown {
  base icmp-type;
  description
    "Identity for destination network unknown
    in destination unreachable types";
  reference
    "RFC 792: Internet Control Message Protocol";
} identity destination-host-unknown {
  base icmp-type;
  description
    "Identity for destination host unknown
    in destination unreachable types";
  reference
    "RFC 792: Internet Control Message Protocol";
} identity source-host-isolated {
  base icmp-type;
  description
    "Identity for source host isolated
    in destination unreachable types";
  reference
    "RFC 792: Internet Control Message Protocol";
} identity communication-prohibited-with-destination-network {
  base icmp-type;
  description
    "Identity for which communication with destination network
    is administratively prohibited in destination unreachable
    types";
  reference
    "RFC 792: Internet Control Message Protocol";
} identity communication-prohibited-with-destination-host {
  base icmp-type;
  description
    "Identity for which communication with destination host
    is administratively prohibited in destination unreachable
    types";
  reference
```

[FIG. 16T]

```
    "RFC 792: Internet Control Message Protocol";
} identity destination-network-unreachable-for-tos {
  base icmp-type;
  description
    "Identity for destination network unreachable
    for type of service in destination unreachable types";
  reference
    "RFC 792: Internet Control Message Protocol";
} identity destination-host-unreachable-for-tos {
  base icmp-type;
  description
    "Identity for destination host unreachable
    for type of service in destination unreachable types";
  reference
    "RFC 792: Internet Control Message Protocol";
} identity communication-prohibited {
  base icmp-type;
  description
    "Identity for communication administratively prohibited
    in destination unreachable types";
  reference
    "RFC 792: Internet Control Message Protocol";
} identity host-precedence-violation {
  base icmp-type;
  description
    "Identity for host precedence violation
    in destination unreachable types";
  reference
    "RFC 792: Internet Control Message Protocol";
} identity precedence-cutoff-in-effect {
  base icmp-type;
  description
    "Identity for precedence cutoff in effect
    in destination unreachable types";
  reference
    "RFC 792: Internet Control Message Protocol";
}
```

[FIG. 16U]

```
identity redirect-datagram-for-the-network {
  base icmp-type;
  description
    "Identity for redirect datagram for the network
    (or subnet) in redirect types";
  reference
    "RFC 792: Internet Control Message Protocol";
} identity redirect-datagram-for-the-host {
  base icmp-type;
  description
    "Identity for redirect datagram for the host
    in redirect types";
  reference
    "RFC 792: Internet Control Message Protocol";
} identity redirect-datagram-for-the-tos-and-network {
  base icmp-type;
  description
    "Identity for redirect datagram for the type of
    service and network in redirect types";
  reference
    "RFC 792: Internet Control Message Protocol";
} identity redirect-datagram-for-the-tos-and-host {
  base icmp-type;
  description
    "Identity for redirect datagram for the type of
    service and host in redirect types";
  reference
    "RFC 792: Internet Control Message Protocol";
} identity normal-router-advertisement {
  base icmp-type;
  description
    "Identity for normal router advertisement
    in router advertisement types";
  reference
    "RFC 792: Internet Control Message Protocol";
} identity does-not-route-common-traffic {
  base icmp-type;
  description
```

[FIG. 16V]

```
    "Identity for does not route common traffic
    in router advertisement types";
  reference
    "RFC 792: Internet Control Message Protocol";
} identity time-to-live-exceeded-in-transit {
  base icmp-type;
  description
    "Identity for time to live exceeded in transit
    in time exceeded types";
  reference
    "RFC 792: Internet Control Message Protocol";
} identity fragment-reassembly-time-exceeded {
  base icmp-type;
  description
    "Identity for fragment reassembly time exceeded
    in time exceeded types";
  reference
    "RFC 792: Internet Control Message Protocol";
} identity pointer-indicates-the-error {
  base icmp-type;
  description
    "Identity for pointer indicates the error
    in parameter problem types";
  reference
    "RFC 792: Internet Control Message Protocol";
} identity missing-a-required-option {
  base icmp-type;
  description
    "Identity for missing a required option
    in parameter problem types";
  reference
    "RFC 792: Internet Control Message Protocol";
} identity bad-length {
  base icmp-type;
  description
    "Identity for bad length
    in parameter problem types";
  reference
```

[FIG. 16W]

```
    description
      "Identity for net unreachable
      in destination unreachable types";
    reference
      "RFC 792: Internet Control Message Protocol";
  } identity host-unreachable {
    base icmp-type;
    description
      "Identity for host unreachable
      in destination unreachable types";
    reference
      "RFC 792: Internet Control Message Protocol";
  } identity protocol-unreachable {
    base icmp-type;
    description
      "Identity for protocol unreachable
      in destination unreachable types";
    reference
      "RFC 792: Internet Control Message Protocol";
  } identity port-unreachable {
    base icmp-type;
    description
      "Identity for port unreachable
      in destination unreachable types";
    reference
      "RFC 792: Internet Control Message Protocol";
  } identity fragment-set {
    base icmp-type;
    description
      "Identity for fragmentation set
      in destination unreachable types";
    reference
      "RFC 792: Internet Control Message Protocol";
  } identity source-route-failed {
    base icmp-type;
    description
      "Identity for source route failed
      in destination unreachable types";
```

[FIG. 16X]

```
    "RFC 792: Internet Control Message Protocol";
} identity bad-spi {
  base icmp-type;
  description
    "Identity for bad spi";
  reference
    "RFC 792: Internet Control Message Protocol";
} identity authentication-failed {
  base icmp-type;
  description
    "Identity for authentication failed";
  reference
    "RFC 792: Internet Control Message Protocol";
} identity decompression-failed {
  base icmp-type;
  description
    "Identity for decompression failed";
  reference
    "RFC 792: Internet Control Message Protocol";
} identity decryption-failed {
  base icmp-type;
  description
    "Identity for decryption failed";
  reference
    "RFC 792: Internet Control Message Protocol";
} identity need-authentication {
  base icmp-type;
  description
    "Identity for need authentication";
  reference
    "RFC 792: Internet Control Message Protocol";
} identity need-authorization {
  base icmp-type;
  description
    "Identity for need authorization";
  reference
```

[FIG. 16Y]

```
    "RFC 792: Internet Control Message Protocol";
} identity req-no-error {
  base icmp-type;
  description
    "Identity for request with no error
    in extended echo request types";
  reference
    "RFC  792: Internet Control Message Protocol
     RFC 8335: PROBE: A Utility for Probing Interfaces";
} identity rep-no-error {
  base icmp-type;
  description
    "Identity for reply with no error
    in extended echo reply types";
  reference
    "RFC  792: Internet Control Message Protocol
     RFC 8335: PROBE: A Utility for Probing Interfaces";
} identity malformed-query {
  base icmp-type;
  description
    "Identity for malformed query
    in extended echo reply types";
  reference
    "RFC  792: Internet Control Message Protocol
     RFC 8335: PROBE: A Utility for Probing Interfaces";
} identity no-such-interface {
  base icmp-type;
  description
    "Identity for no such interface
    in extended echo reply types";
  reference
    "RFC  792: Internet Control Message Protocol
     RFC 8335: PROBE: A Utility for Probing Interfaces";
} identity no-such-table-entry {
  base icmp-type;
  description
    "Identity for no such table entry
    in extended echo reply types";
```

[FIG. 16Z]

```
  reference
    "RFC  792: Internet Control Message Protocol
     RFC 8335: PROBE: A Utility for Probing Interfaces";
} identity multiple-interfaces-satisfy-query {
  base icmp-type;
  description
    "Identity for multiple interfaces satisfy query
    in extended echo reply types";
  reference
    "RFC  792: Internet Control Message Protocol
     RFC 8335: PROBE: A Utility for Probing Interfaces";
} identity target-device {
  description
    "Base identity for target devices";
  reference
    "draft-ietf-i2nsf-capability-05: Information Model
     of NSFs Capabilities";
} identity pc {
  base target-device;
  description
    "Identity for pc";
} identity mobile-phone {
  base target-device;
  description
    "Identity for mobile-phone";
} identity voip-volte-phone {
  base target-device;
  description
    "Identity for voip-volte-phone";
} identity tablet {
  base target-device;
  description
    "Identity for tablet";
} identity iot {
```

[FIG. 17A]

```
  base target-device;
  description
    "Identity for IoT";
} identity vehicle {
  base target-device;
  description
    "Identity for vehicle";
} identity content-security-control {
  description
    "Base identity for content security control";
  reference
    "RFC 8329: Framework for Interface to
    Network Security Functions - Differences
    from ACL Data Models
    draft-ietf-i2nsf-capability-05: Information Model
    of NSFs Capabilities";
} identity antivirus {
  base content-security-control;
  description
    "Identity for antivirus";
} identity ips {
  base content-security-control;
  description
    "Identity for ips";
} identity ids {
  base content-security-control;
  description
    "Identity for ids";
} identity url-filtering {
  base content-security-control;
  description
    "Identity for url filtering";
} identity mail-filtering {
  base content-security-control;
```

[FIG. 17B]

```
   description
     "Identity for mail filtering";
} identity file-blocking {
  base content-security-control;
  description
    "Identity for file blocking";
} identity file-isolate {
  base content-security-control;
  description
    "Identity for file isolate";
} identity pkt-capture {
  base content-security-control;
  description
    "Identity for packet capture";
} identity application-control {
  base content-security-control;
  description
    "Identity for application control";
} identity voip-volte {
  base content-security-control;
  description
    "Identity for voip and volte";
} identity attack-mitigation-control {
  description
    "Base identity for attack mitigation control";
  reference
    "RFC 8329: Framework for Interface to
    Network Security Functions - Differences
    from ACL Data Models
    draft-ietf-i2nsf-capability-05: Information Model
    of NSFs Capabilities";
} identity syn-flood {
  base attack-mitigation-control;
  description
```

[FIG. 17C]

```
        "Identity for syn flood";
} identity udp-flood {
  base attack-mitigation-control;
  description
    "Identity for udp flood";
} identity icmp-flood {
  base attack-mitigation-control;
  description
    "Identity for icmp flood";
} identity ip-frag-flood {
  base attack-mitigation-control;
  description
    "Identity for ip frag flood";
} identity ipv6-related {
  base attack-mitigation-control;
  description
    "Identity for ipv6 related";
} identity http-and-https-flood {
  base attack-mitigation-control;
  description
    "Identity for http and https flood";
} identity dns-flood {
  base attack-mitigation-control;
  description
    "Identity for dns flood";
} identity dns-amp-flood {
  base attack-mitigation-control;
  description
    "Identity for dns amp flood";
} identity ssl-ddos {
  base attack-mitigation-control;
  description
```

[FIG. 17D]

```
    "Identity for ssl ddos";
} identity ip-sweep {
  base attack-mitigation-control;
  description
    "Identity for ip sweep";
} identity port-scanning {
  base attack-mitigation-control;
  description
    "Identity for port scanning";
} identity ping-of-death {
  base attack-mitigation-control;
  description
    "Identity for ping of death";
} identity teardrop {
  base attack-mitigation-control;
  description
    "Identity for teardrop";
} identity oversized-icmp {
  base attack-mitigation-control;
  description
    "Identity for oversized icmp";
} identity tracert {
  base attack-mitigation-control;
  description
    "Identity for tracert";
} identity ingress-action {
  description
    "Base identity for action";
  reference
    "draft-ietf-i2nsf-capability-05: Information Model
     of NSFs Capabilities - Ingress Action";
} identity egress-action {
```

[FIG. 17E]

```
description
  "Base identity for egress action";
reference
  "draft-ietf-i2nsf-capability-05: Information Model
   of NSFs Capabilities - Egress action";
} identity default-action {
  description
    "Base identity for default action";
  reference
    "draft-ietf-i2nsf-capability-05: Information Model
     of NSFs Capabilities - Default action";
} identity pass {
  base ingress-action;
  base egress-action;
  base default-action;
  description
    "Identity for pass";
  reference
    "draft-ietf-i2nsf-capability-05: Information Model
     of NSFs Capabilities - Actions and
     default action";
} identity drop {
  base ingress-action;
  base egress-action;
  base default-action;
  description
    "Identity for drop";
  reference
    "draft-ietf-i2nsf-capability-05: Information Model
     of NSFs Capabilities - Actions and
     default action";
} identity reject {
  base ingress-action;
  base egress-action;
  base default-action;
  description
    "Identity for reject";
  reference
    "draft-ietf-i2nsf-capability-05: Information Model
     of NSFs Capabilities - Actions and
```

[FIG. 17F]

```
    default action";
} identity alert {
  base ingress-action;
  base egress-action;
  base default-action;
  description
    "Identity for alert";
  reference
    "draft-ietf-i2nsf-capability-05: Information Model
     of NSFs Capabilities - Actions and
     default action";
} identity mirror {
  base ingress-action;
  base egress-action;
  base default-action;
  description
    "Identity for mirror";
  reference
    "draft-ietf-i2nsf-capability-05: Information Model
     of NSFs Capabilities - Actions and
     default action";
} identity log-action {
  description
    "Base identity for log action";
} identity rule-log {
  base log-action;
  description
    "Identity for rule log";
} identity session-log {
  base log-action;
  description
    "Identity for session log";
} identity invoke-signaling {
  base egress-action;
  description
    "Identity for invoke signaling";
```

[FIG. 17G]

```
} identity tunnel-encapsulation {
  base egress-action;
  description
    "Identity for tunnel encapsulation";
} identity forwarding {
  base egress-action;
  description
    "Identity for forwarding";
} identity redirection {
  base egress-action;
  description
    "Identity for redirection";

} identity resolution-strategy {
  description
    "Base identity for resolution strategy";
  reference
    "draft-ietf-i2nsf-capability-05: Information Model
     of NSFs Capabilities - Resolution Strategy";
} identity fmr {
  base resolution-strategy;
  description
    "Identity for First Matching Rule (FMR)";
  reference
    "draft-ietf-i2nsf-capability-05: Information Model
     of NSFs Capabilities - Resolution Strategy";
} identity lmr {
  base resolution-strategy;
  description
    "Identity for Last Matching Rule (LMR)";
  reference
    "draft-ietf-i2nsf-capability-05: Information Model
     of NSFs Capabilities - Resolution Strategy";
} identity pmr {
```

[FIG. 17H]

```
  base resolution-strategy;
  description
    "Identity for Prioritized Matching Rule (PMR)";
  reference
    "draft-ietf-i2nsf-capability-05: Information Model
     of NSFs Capabilities - Resolution Strategy";
} identity pmre {
  base resolution-strategy;
  description
    "Identity for Prioritized Matching Rule
     with Errors (PMRE)";
  reference
    "draft-ietf-i2nsf-capability-05: Information Model
     of NSFs Capabilities - Resolution Strategy";
} identity pmrn {
  base resolution-strategy;
  description
    "Identity for Prioritized Matching Rule
     with No Errors (PMRN)";
  reference
    "draft-ietf-i2nsf-capability-05: Information Model
     of NSFs Capabilities - Resolution Strategy";
} identity i2nsf-ipsec {
  description
    "Internet Key Exchnage for NSFs
     in the I2NSF framework";
  reference
    "draft-ietf-i2nsf-sdn-ipsec-flow-protection-04
     - i2nsf-ipsec";
} identity ike {
  base i2nsf-ipsec;
  description
    "IKE case: IPsec with IKE in the NSF";
  reference
      "draft-ietf-i2nsf-sdn-ipsec-flow-protection-04
       - ike";
} identity ikeless {
  base i2nsf-ipsec;
```

[FIG. 17I]

```
      description
        "IKEless case: IPsec without IKEv2 in the NSF";
      reference
         "draft-ietf-i2nsf-sdn-ipsec-flow-protection-04
         - ikeless";
  }
  /*
   * Typedefs
   */ typedef day-type {
      type enumeration {
        enum sunday {
             description
               "Sunday for periodic day";
        }
        enum monday {
             description
               "Monday for periodic day";
        }
        enum tuesday {
             description
               "Tuesday for periodic day";
        }
        enum wednesday {
             description
               "Wednesday for periodic day";
        }
        enum thursday {
             description
               "Thursday for periodic day";
        }
        enum friday {
             description
               "Friday for periodic day";
        }
        enum saturday {
             description
               "Saturday for periodic day";
        }
      }
      description
        "This can be used for the rules to be applied
        according to periodic day";
  }
```

[FIG. 17J]

```
typedef month-type {
    type enumeration {
        enum january {
            description
                "January for periodic month";
        }
        enum february {
            description
                "February for periodic month";
        }
        enum march {
            description
                "March for periodic month";
        }
        enum april {
            description
                "April for periodic month";
        }
        enum may {
            description
                "May for periodic month";
        }
        enum june {
            description
                "June for periodic month";
        }
        enum july {
            description
                "July for periodic month";
        }
        enum august {
            description
                "August for periodic month";
        }
        enum september {
            description
                "September for periodic month";
        }
        enum october {
            description
                "October for periodic month";
        }
        enum november {
            description
                "November for periodic month";
        }
        enum december {
            description
```

[FIG. 17K]

```
          "December for periodic month";
      }
    }
    description
      "This can be used for the rules to be applied
      according to periodic month";
}

/*
 * Groupings
 */ grouping ipv4 {
  list ipv4-address {
    key "ipv4";
    description
      "The list of IPv4 addresses.";

leaf ipv4 {
      type inet:ipv4-address;
      description
        "The value of IPv4 address.";
    }
    choice subnet {
      description
        "The subnet can be specified as a prefix length or
        netmask.";
      leaf prefix-length {
        type uint8 {
          range "0..32";
        }
        description
          "The length of the subnet prefix.";
      }
      leaf netmask {
        type yang:dotted-quad;
        description
          "The subnet specified as a netmask.";
      }
    }
  }
  description
    "Grouping for an IPv4 address";

reference
    "RFC 791: Internet Protocol - IPv4 address
    RFC 8344: A YANG Data Model for IP Management";
}
```

[FIG. 17L]

```
grouping ipv6 {
  list ipv6-address {
    key "ipv6";
    description
      "The list of IPv6 addresses.";

leaf ipv6 {
      type inet:ipv6-address;
      description
        "The value of IPv6 address.";
    } leaf prefix-length {
      type uint8 {
        range "0..128";
      }
      description
        "The length of the subnet prefix.";
    }
  }
  description
    "Grouping for an IPv6 address";

reference
    "RFC 8200: Internet Protocol, Version 6 (IPv6)
     Specification - IPv6 address
     RFC 8344: A YANG Data Model for IP Management";
} grouping pkt-sec-ipv4 {
  choice match-type {
    description
      "There are two types of security policy IPv4 address
      matching - exact match and range match.";
    case exact-match {
      uses ipv4;
      description
        "Exact match for an IPv4 address.";
    }
    case range-match {
      list range-ipv4-address {
        key "start-ipv4-address end-ipv4-address";
        leaf start-ipv4-address {
          type inet:ipv4-address;
          description
            "Starting IPv4 address for a range match.";
        }
```

[FIG. 17M]

```
      leaf end-ipv4-address {
        type inet:ipv4-address;
        description
          "Ending IPv4 address for a range match.";
      }
      description
        "Range match for an IPv4 address.";
    }
  }
}
description
  "Grouping for an IPv4 address.";

reference
  "RFC 791: Internet Protocol - IPv4 address";
} grouping pkt-sec-ipv6 {
  choice match-type {
    description
      "There are two types of security policy IPv6 address
      matching - exact match and range match.";
    case exact-match {
      uses ipv6;
      description
        "Exact match for an IPv6 address.";
    }
    case range-match {
      list range-ipv6-address {
        key "start-ipv6-address end-ipv6-address";
        leaf start-ipv6-address {
          type inet:ipv6-address;
          description
            "Starting IPv6 address for a range match.";
        } leaf end-ipv6-address {
          type inet:ipv6-address;
          description
            "Ending IPv6 address for a range match.";
        }
        description
          "Range match for an IPv6 address.";
      }
    }
  }
  description
    "Grouping for IPv6 address.";
```

[FIG. 17N]

```
   reference
     "RFC 8200: Internet Protocol, Version 6 (IPv6)
      Specification - IPv6 address";
 } grouping pkt-sec-port-number {
   choice match-type {
     description
       "There are two types of security policy TCP/UDP port
        matching - exact match and range match.";
     case exact-match {
       leaf-list port-num {
         type inet:port-number;
         description
           "Exact match for a port number.";
       }
     }
     case range-match {
       list range-port-num {
         key "start-port-num end-port-num";
         leaf start-port-num {
           type inet:port-number;
           description
             "Starting port number for a range match.";
         }
         leaf end-port-num {
           type inet:port-number;
           description
             "Ending port number for a range match.";
         }
         description
           "Range match for a port number.";
       }
     }
   }
   description
     "Grouping for port number.";

reference
     "RFC 793: Transmission Control Protocol - Port number
      RFC 768: User Datagram Protocol - Port Number";
 }

/*
  * Data nodes
  */ container i2nsf-security-policy {
```

[FIG. 17O]

```
description
  "Container for security policy
   including a set of security rules according to certain logic,
   i.e., their similarity or mutual relations, etc. The network
   security policy can be applied to both the unidirectional
   and bidirectional traffic across the NSF.
   The I2NSF security policies use the Event-Condition-Action
   (ECA) policy model ";

reference
  "RFC 8329: Framework for Interface to Network Security
   Functions - I2NSF Flow Security Policy Structure
   draft-ietf-i2nsf-capability-05: Information Model
   of NSFs Capabilities - Design Principles and ECA Policy Model
   Overview";

list system-policy {
  key "system-policy-name";
  description
    "The system-policy represents there could be multiple system
     policies in one NSF, and each system policy is used by
     one virtual instance of the NSF/device.";

leaf system-policy-name {
    type string;
    description
      "The name of the policy.
       This must be unique.";
  } leaf priority-usage {
    type identityref {
      base priority-usage-type;
    }
    default priority-by-order;
    description
      "Priority usage type for security policy rule:
       priority by order and priority by number";
  } leaf resolution-strategy {
    type identityref {
      base resolution-strategy;
    }
    default fmr;
    description
```

[FIG. 17P]

```
    "The resolution strategies that can be used to
    specify how to resolve conflicts that occur between
    actions of the same or different policy rules that
    are matched and contained in this particular NSF";

reference
    "draft-ietf-i2nsf-capability-05: Information Model
     of NSFs Capabilities - Resolution strategy";
} leaf default-action {
  type identityref {
    base default-action;
  }
  default alert;
  description
    "This default action can be used to specify a predefined
    action when no other alternative action was matched
    by the currently executing I2NSF Policy Rule. An analogy
    is the use of a default statement in a C switch statement.";

reference
    "draft-ietf-i2nsf-capability-05: Information Model
     of NSFs Capabilities - Default action";
} list rules {
  key "rule-name";
  description
    "This is a rule for network security functions.";

leaf rule-name {
    type string;
    description
      "The name of the rule.";
  } leaf rule-description {
    type string;
    description
      "This description gives more information about
       rules.";
  } leaf rule-priority {
    type uint8 {
      range "1..255";
```

[FIG. 17Q]

```
  }
  description
    "The priority keyword comes with a mandatory
    numeric value which can range from 1 till 255.";
} leaf rule-enable {
  type boolean;
  description
    "True is enable.
    False is not enable.";
} leaf session-aging-time {
  type uint16;
  description
    "This is session aging time.";
} container long-connection {
  description
    "This is long-connection";

leaf enable {
    type boolean;
    description
      "True is enable.
      False is not enbale.";
  } leaf duration {
    type uint16;
    description
      "This is the duration of the long-connection.";
  }
} container time-intervals {
  description
    "Time zone when the rules are applied";
  container absolute-time-interval {
    description
      "Rule execution according to the absolute time.
      The absolute time interval means the exact time to
      start or end.";

container start-time {
      uses "key-chain:lifetime";
```

[FIG. 17R]

```
      description
        "Start time when the rules are applied";
      reference
        "RFC 8177: YANG Data Model for Key Chains
                - lifetime";
    }
    container end-time {
      uses "key-chain:lifetime";
      description
        "End time when the rules are applied";
      reference
        "RFC 8177: YANG Data Model for Key Chains
                - lifetime";
    }
  } container periodic-time-interval {
    description
      "Rule execution according to the periodic time.
      The periodic time interval means the repeated time
                such as a day, week, or month.";

container day {
      description
        "Rule execution according to day.";
      leaf every-day {
        type boolean;
        default true;
        description
          "Rule execution every day";
      } leaf-list specific-day {
        when "../every-day = 'false'";
        type day-type;
        description
         "Rule execution according
          to specific day";
      }
    } container month {
      description
        "Rule execution according to month.";
      leaf every-month {
        type boolean;
        default true;
```

[FIG. 17S]

```
      description
        "Rule execution every day";
    } leaf-list specific-month {
      when "../every-month = 'false'";
      type month-type;
      description
        "Rule execution according
         to month day";
    }
   }
  }
 }
} container event-clause-container {
  description
    "An event is defined as any important
     occurrence in time of a change in the system being
     managed, and/or in the environment of the system being
     managed. When used in the context of policy rules for
     a flow-based NSF, it is used to determine whether the
     Condition clause of the Policy Rule can be evaluated
     or not. Examples of an I2NSF event include time and
     user actions (e.g., logon, logoff, and actions that
     violate any ACL.).";

reference
    "RFC 8329: Framework for Interface to Network Security
     Functions - I2NSF Flow Security Policy Structure
     draft-ietf-i2nsf-capability-05: Information Model
     of NSFs Capabilities - Design Principles and ECA
     Policy Model Overview
     draft-ietf-i2nsf-nsf-monitoring-data-model-02: I2NSF
                NSF Monitoring YANG Data Model - Alarms, Events, Logs,
                and Counters";

leaf event-clause-description {
    type string;
    description
      "Description for an event clause";
  } container event-clauses {
    description
      "System Event Clause - either a system event or
       system alarm";
    reference
```

[FIG. 17T]

```
        "RFC 8329: Framework for Interface to Network Security
        Functions - I2NSF Flow Security Policy Structure
        draft-ietf-i2nsf-capability-05: Information Model
        of NSFs Capabilities - Design Principles and ECA Policy
        Model Overview
        draft-ietf-i2nsf-nsf-monitoring-data-model-02: I2NSF
                    NSF Monitoring YANG Data Model - Alarms, Events,
Logs,
                    and Counters";

leaf-list system-event {
        type identityref {
          base system-event;
        }
        description
          "The security policy rule according to
           system events.";
      } leaf-list system-alarm {
        type identityref {
          base system-alarm;
        }
        description
          "The security policy rule according to
           system alarms.";
      }
    }
  } container condition-clause-container {
    description
      "A condition is defined as a set
       of attributes, features, and/or values that are to be
       compared with a set of known attributes, features,
       and/or values in order to determine whether or not the
       set of Actions in that (imperative) I2NSF Policy Rule
       can be executed or not. Examples of I2NSF Conditions
       include matching attributes of a packet or flow, and
       comparing the internal state of an NSF to a desired
       state.";
    reference
      "RFC 8329: Framework for Interface to Network Security
       Functions - I2NSF Flow Security Policy Structure
       draft-ietf-i2nsf-capability-05: Information Model
       of NSFs Capabilities - Design Principles and ECA Policy
       Model Overview";

leaf condition-clause-description {
```

[FIG. 17U]

```
    type string;
    description
      "Description for a condition clause.";
} container packet-security-ipv4-condition {
  description
    "The purpose of this container is to represent IPv4
    packet header information to determine if the set
    of policy actions in this ECA policy rule should be
    executed or not.";
  reference
    "RFC 791: Internet Protocol";

leaf ipv4-description {
    type string;
    description
      "ipv4 condition texual description.";
  } container pkt-sec-ipv4-header-length {
    choice match-type {
      description
        "Security policy IPv4 Header length match -
        exact match and range match.";
      case exact-match {
        leaf-list ipv4-header-length {
          type uint8 {
            range "5..15";
          }
          description
            "Exact match for an IPv4 header length.";
        }
      }
      case range-match {
        list range-ipv4-header-length {
          key "start-ipv4-header-length
              end-ipv4-header-length";
          leaf start-ipv4-header-length {
            type uint8 {
              range "5..15";
            }
            description
              "Starting IPv4 header length for a range match.";
          } leaf end-ipv4-header-length {
            type uint8 {
```

[FIG. 17V]

```
          range "5..15";
        }
        description
          "Ending IPv4 header length for a range match.";
      }
      description
        "Range match for an IPv4 header length.";
    }
  }
}
description
  "The security policy rule according to
   IPv4 header length.";
reference
  "RFC 791: Internet Protocol - Header length";
} leaf-list pkt-sec-ipv4-tos {
  type identityref {
    base type-of-service;
  }
  description
    "The security policy rule according to
     IPv4 type of service.";
  reference
    "RFC 1394: Internet Protocol - Type of service";
} container pkt-sec-ipv4-total-length {
  choice match-type {
    description
      "Security policy IPv4 total length matching
       - exact match and range match.";
    case exact-match {
      leaf-list ipv4-total-length {
        type uint16;
        description
          "Exact match for an IPv4 total length.";
      }
    }
    case range-match {
      list range-ipv4-total-length {
        key "start-ipv4-total-length end-ipv4-total-length";
        leaf start-ipv4-total-length {
          type uint16;
          description
            "Starting IPv4 total length for a range match.";
        }
```

[FIG. 17W]

```
      leaf end-ipv4-total-length {
        type uint16;
        description
          "Ending IPv4 total length for a range match.";
      }
      description
        "Range match for an IPv4 total length.";
    }
  }
}
description
  "The security policy rule according to
   IPv4 total length.";
reference
  "RFC 791: Internet Protocol - Total length";
} leaf-list pkt-sec-ipv4-id {
  type uint16;
  description
    "The security policy rule according to
     IPv4 identification.";
  reference
    "RFC 791: Internet Protocol - Identification";
} leaf-list pkt-sec-ipv4-fragment-flags {
  type identityref {
    base fragmentation-flags-type;
  }
  description
    "The security policy rule according to
     IPv4 fragment flags.";
  reference
    "RFC 791: Internet Protocol - Fragment flags";
} container pkt-sec-ipv4-fragment-offset {
  choice match-type {
    description
      "There are two types to configure a security
       policy for IPv4 fragment offset, such as exact match
       and range match.";
    case exact-match {
      leaf-list ipv4-fragment-offset {
        type uint16 {
          range "0..16383";
        }
```

[FIG. 17X]

```
        description
          "Exact match for an IPv4 fragment offset.";
      }
    }
    case range-match {
      list range-ipv4-fragment-offset {
        key "start-ipv4-fragment-offset
            end-ipv4-fragment-offset";
        leaf start-ipv4-fragment-offset {
          type uint16 {
            range "0..16383";
          }
          description
            "Starting IPv4 fragment offset for a range match.";
        }
        leaf end-ipv4-fragment-offset {
          type uint16 {
            range "0..16383";
          }
          description
            "Ending IPv4 fragment offset for a range match.";
        }
        description
          "Range match for an IPv4 fragment offset.";
      }
    }
  }
  description
    "The security policy rule according to
    IPv4 fragment offset.";
  reference
    "RFC 791: Internet Protocol - Fragment offset";
}
container pkt-sec-ipv4-ttl {
  choice match-type {
    description
      "There are two types to configure a security
      policy for IPv4 TTL, such as exact match
      and range match.";
    case exact-match {
      leaf-list ipv4-ttl {
        type uint8;
        description
          "Exact match for an IPv4 TTL.";
      }
    }
    case range-match {
```

[FIG. 17Y]

```
    list range-ipv4-ttl {
      key "start-ipv4-ttl end-ipv4-ttl";
      leaf start-ipv4-ttl {
        type uint8;
        description
          "Starting IPv4 TTL for a range match.";
      }
      leaf end-ipv4-ttl {
        type uint8;
        description
          "Ending IPv4 TTL for a range match.";
      }
      description
        "Range match for an IPv4 TTL.";
    }
  }
}
description
  "The security policy rule according to
   IPv4 time-to-live (TTL).";
reference
  "RFC 791: Internet Protocol - Time to live";
} leaf-list pkt-sec-ipv4-protocol {
  type identityref {
    base protocol;
  }
  description
    "The security policy rule according to
     IPv4 protocol.";
  reference
    "RFC 791: Internet Protocol - Protocol";
} container pkt-sec-ipv4-src {
  uses pkt-sec-ipv4;
  description
    "The security policy rule according to
     IPv4 source address.";
  reference
    "RFC 791: Internet Protocol - IPv4 Address";
} container pkt-sec-ipv4-dest {
  uses pkt-sec-ipv4;
  description
```

[FIG. 17Z]

```
      "The security policy rule according to
      IPv4 destination address.";
    reference
      "RFC 791: Internet Protocol - IPv4 Address";
  } leaf-list pkt-sec-ipv4-ipopts {
    type identityref {
      base ipopts;
    }
    description
      "The security policy rule according to
      IPv4 options.";
    reference
      "RFC 791: Internet Protocol - Options";
  } leaf pkt-sec-ipv4-same-ip {
    type boolean;
    description
      "Match on packets with the same IPv4 source
      and IPv4 destination address.";
  } leaf-list pkt-sec-ipv4-geo-ip {
    type string;
    description
      "The geo-ip keyword enables you to match on
      the source, destination or source and destination
      IP addresses of network traffic and to see to
      which country it belongs. To do this, Suricata
      uses GeoIP API with MaxMind database format.";
  }
} container packet-security-ipv6-condition {
  description
    "The purpose of this container is to represent
    IPv6 packet header information to determine
    if the set of policy actions in this ECA policy
    rule should be executed or not.";
  reference
    "RFC 8200: Internet Protocol, Version 6 (IPv6)
    Specification";

leaf ipv6-description {
    type string;
    description
```

[FIG. 18A]

```
    "This is description for ipv6 condition.";
} leaf-list pkt-sec-ipv6-traffic-class {
  type identityref {
    base traffic-class;
  }
  description
    "The security policy rule according to
     IPv6 traffic class.";
  reference
    "RFC 8200: Internet Protocol, Version 6 (IPv6)
     Specification - Traffic class";
} container pkt-sec-ipv6-flow-label {
  choice match-type {
    description
      "There are two types to configure a security
       policy for IPv6 flow label, such as exact match
       and range match.";
    case exact-match {
      leaf-list ipv6-flow-label {
        type uint32 {
          range "0..1048575";
        }
        description
          "Exact match for an IPv6 flow label.";
      }
    }
    case range-match {
      list range-ipv6-flow-label {
        key "start-ipv6-flow-label end-ipv6-flow-label";
        leaf start-ipv6-flow-label {
          type uint32 {
            range "0..1048575";
          }
          description
            "Starting IPv6 flow label for a range match.";
        }
        leaf end-ipv6-flow-label {
          type uint32 {
            range "0..1048575";
          }
          description
            "Ending IPv6 flow label for a range match.";
        }
```

[FIG. 18B]

```
        description
          "Range match for an IPv6 flow label.";
      }
    }
  }
  description
    "The security policy rule according to
     IPv6 flow label.";
  reference
    "RFC 8200: Internet Protocol, Version 6 (IPv6)
     Specification - Flow label";
} container pkt-sec-ipv6-payload-length {
  choice match-type {
    description
      "There are two types to configure a security
       policy for IPv6 payload length, such as
       exact match and range match.";
    case exact-match {
      leaf-list ipv6-payload-length {
        type uint16;
        description
          "Exact match for an IPv6 payload length.";
      }
    }
    case range-match {
      list range-ipv6-payload-length {
        key "start-ipv6-payload-length
            end-ipv6-payload-length";
        leaf start-ipv6-payload-length {
          type uint16;
          description
            "Starting IPv6 payload length for a range match.";
        }
        leaf end-ipv6-payload-length {
          type uint16;
          description
            "Ending IPv6 payload length for a range match.";
        }
        description
          "Range match for an IPv6 payload length.";
      }
    }
  }
  description
    "The security policy rule according to
     IPv6 payload length.";
```

[FIG. 18C]

```
    reference
      "RFC 8200: Internet Protocol, Version 6 (IPv6)
      Specification - Payload length";
} leaf-list pkt-sec-ipv6-next-header {
  type identityref {
    base next-header;
  }
  description
    "The security policy rule according to
    IPv6 next header.";
  reference
    "RFC 8200: Internet Protocol, Version 6 (IPv6)
    Specification - Next header";
} container pkt-sec-ipv6-hop-limit {
  choice match-type {
    description
      "There are two types to configure a security
      policy for IPv6 hop limit, such as exact match
      and range match.";
    case exact-match {
      leaf-list ipv6-hop-limit {
        type uint8;
        description
          "Exact match for an IPv6 hop limit.";
      }
    }
    case range-match {
      list range-ipv6-hop-limit {
        key "start-ipv6-hop-limit end-ipv6-hop-limit";
        leaf start-ipv6-hop-limit {
          type uint8;
          description
            "Start IPv6 hop limit for a range match.";
        }
        leaf end-ipv6-hop-limit {
          type uint8;
          description
            "End IPv6 hop limit for a range match.";
        }
        description
          "Range match for an IPv6 hop limit.";
      }
    }
  }
}
```

[FIG. 18D]

```
  description
    "The security policy rule according to
    IPv6 hop limit.";
  reference
    "RFC 8200: Internet Protocol, Version 6 (IPv6)
    Specification - Hop limit";
} container pkt-sec-ipv6-src {
  uses pkt-sec-ipv6;
  description
    "The security policy rule according to
    IPv6 source address.";
  reference
    "RFC 8200: Internet Protocol, Version 6 (IPv6)
    Specification - IPv6 address";
} container pkt-sec-ipv6-dest {
  uses pkt-sec-ipv6;
  description
    "The security policy rule according to
    IPv6 destination address.";
  reference
    "RFC 8200: Internet Protocol, Version 6 (IPv6)
    Specification - IPv6 address";
}

} container packet-security-tcp-condition {
  description
    "The purpose of this container is to represent
    TCP packet header information to determine
    if the set of policy actions in this ECA policy
    rule should be executed or not.";
  reference
    "RFC 793: Transmission Control Protocol";

leaf tcp-description {
    type string;
    description
      "This is description for tcp condition.";
  } container pkt-sec-tcp-src-port-num {
    uses pkt-sec-port-number;
    description
```

[FIG. 18E]

```
    "The security policy rule according to
    tcp source port number.";
  reference
    "RFC 793: Transmission Control Protocol
    - Port number";
} container pkt-sec-tcp-dest-port-num {
  uses pkt-sec-port-number;
  description
    "The security policy rule according to
    tcp destination port number.";
  reference
    "RFC 793: Transmission Control Protocol
    - Port number";
} container pkt-sec-tcp-seq-num {
  choice match-type {
    description
      "There are two types to configure a security
      policy for tcp sequence number,
      such as exact match and range match.";
    case exact-match {
      leaf-list tcp-seq-num {
        type uint32;
        description
          "Exact match for an tcp sequence number.";
      }
    }
    case range-match {
      list range-tcp-seq-num {
        key "start-tcp-seq-num end-tcp-seq-num";
        leaf start-tcp-seq-num {
          type uint32;
          description
            "Start tcp sequence number for a range match.";
        }
        leaf end-tcp-seq-num {
          type uint32;
          description
            "End tcp sequence number for a range match.";
        }
        description
          "Range match for a tcp sequence number.";
      }
    }
```

[FIG. 18F]

```
    }
    description
      "The security policy rule according to
      tcp sequence number.";
    reference
      "RFC 793: Transmission Control Protocol
      - Sequence number";
} container pkt-sec-tcp-ack-num {
  choice match-type {
    description
      "There are two types to configure a security
      policy for tcp acknowledgement number,
      such as exact match and range match.";
    case exact-match {
      leaf-list tcp-ack-num {
        type uint32;
        description
          "Exact match for an tcp acknowledgement number.";
      }
    }
    case range-match {
      list range-tcp-ack-num {
        key "start-tcp-ack-num end-tcp-ack-num";
        leaf start-tcp-ack-num {
          type uint32;
          description
            "Start tcp acknowledgement number
            for a range match.";
        }
        leaf end-tcp-ack-num {
          type uint32;
          description
            "End tcp acknowledgement number
            for a range match.";
        }
        description
          "Range match for a tcp acknowledgement number.";
      }
    }
  }
  description
    "The security policy rule according to
    tcp acknowledgement number.";
  reference
    "RFC 793: Transmission Control Protocol
    - Acknowledgement number";
```

[FIG. 18G]

```
} container pkt-sec-tcp-window-size {
  choice match-type {
    description
      "There are two types to configure a security
      policy for tcp window size,
      such as exact match and range match.";
    case exact-match {
      leaf-list tcp-window-size {
        type uint16;
        description
          "Exact match for an tcp window size.";
      }
    }
    case range-match {
      list range-tcp-window-size {
        key "start-tcp-window-size end-tcp-window-size";
        leaf start-tcp-window-size {
          type uint16;
          description
            "Start tcp window size for a range match.";
        }
        leaf end-tcp-window-size {
          type uint16;
          description
            "End tcp window size for a range match.";
        }
        description
          "Range match for a tcp window size.";
      }
    }
  }
  description
    "The security policy rule according to
    tcp window size.";
  reference
    "RFC 793: Transmission Control Protocol
    - Window size";
} leaf-list pkt-sec-tcp-flags {
  type identityref {
    base tcp-flags;
  }
  description
    "The security policy rule according to
```

[FIG. 18H]

```
      tcp flags.";
    reference
      "RFC 793: Transmission Control Protocol
       - Flags";
  }
} container packet-security-udp-condition {
  description
    "The purpose of this container is to represent
    UDP packet header information to determine
    if the set of policy actions in this ECA policy
    rule should be executed or not.";
  reference
    "RFC 793: Transmission Control Protocol";

leaf udp-description {
    type string;
    description
     "This is description for udp condition.";
  } container pkt-sec-udp-src-port-num {
    uses pkt-sec-port-number;
    description
      "The security policy rule according to
       udp source port number.";
    reference
      "RFC 793: Transmission Control Protocol
       - Port number";
  } container pkt-sec-udp-dest-port-num {
    uses pkt-sec-port-number;
    description
      "The security policy rule according to
       udp destination port number.";
    reference
      "RFC 768: User Datagram Protocol
       - Total Length";
  } container pkt-sec-udp-total-length {
    choice match-type {
      description
        "There are two types to configure a security
         policy for udp sequence number,
```

[FIG. 181]

```
        such as exact match and range match.";
      case exact-match {
        leaf-list udp-total-length {
          type uint32;
          description
            "Exact match for an udp-total-length.";
        }
      }
      case range-match {
        list range-udp-total-length {
          key "start-udp-total-length end-udp-total-length";
          leaf start-udp-total-length {
            type uint32;
            description
              "Start udp total length for a range match.";
          }
          leaf end-udp-total-length {
            type uint32;
            description
              "End udp total length for a range match.";
          }
          description
            "Range match for a udp total length.";
        }
      }
    }
    description
      "The security policy rule according to
       udp total length.";
    reference
      "RFC 768: User Datagram Protocol
       - Total Length";
  }
} container packet-security-icmp-condition {
  description
    "The purpose of this container is to represent
     ICMP packet header information to determine
     if the set of policy actions in this ECA policy
     rule should be executed or not.";
  reference
    "RFC  792: Internet Control Message Protocol
     RFC 8335: PROBE: A Utility for Probing Interfaces";

leaf icmp-description {
    type string;
```

[FIG. 18J]

```
   description
     "This is description for icmp condition.";
 } leaf-list pkt-sec-icmp-type-and-code {
   type identityref {
     base icmp-type;
   }
   description
     "The security policy rule according to
      ICMP parameters.";
   reference
     "RFC  792: Internet Control Message Protocol
      RFC 8335: PROBE: A Utility for Probing Interfaces";
 }
} container packet-security-url-category-condition {
  description
    "Condition for url category";
  leaf url-category-description {
    type string;
    description
      "This is description for url category condition.
       Vendors can write instructions for context condition
       that vendor made";
  } leaf-list pre-defined-category {
    type string;
    description
      "This is pre-defined-category.";
  }
  leaf-list user-defined-category {
    type string;
    description
      "This user-defined-category.";
  }
} container packet-security-voice-condition {
  description
    "For the VoIP/VoLTE security system, a VoIP/
     VoLTE security system can monitor each
     VoIP/VoLTE flow and manage VoIP/VoLTE
     security rules controlled by a centralized
     server for VoIP/VoLTE security service
     (called VoIP IPS). The VoIP/VoLTE security
```

[FIG. 18K]

```
    system controls each switch for the
    VoIP/VoLTE call flow management by
    manipulating the rules that can be added,
    deleted, or modified dynamically.";
  reference
    "RFC 3261: SIP: Session Initiation Protocol";

leaf voice-description {
    type string;
    description
      "This is description for voice condition.";
  } leaf-list pkt-sec-src-voice-id {
    type string;
    description
      "The security policy rule according to
       a source voice ID for VoIP and VoLTE.";
  } leaf-list pkt-sec-dest-voice-id {
    type string;
    description
      "The security policy rule according to
       a destination voice ID for VoIP and VoLTE.";
  } leaf-list pkt-sec-user-agent {
    type string;
    description
      "The security policy rule according to
       an user agent for VoIP and VoLTE.";
  }
} container packet-security-ddos-condition {
  description
    "Condition for DDoS attack.";

leaf ddos-description {
    type string;
    description
      "This is description for ddos condition.";
  } leaf pkt-sec-alert-rate {
    type uint32;
    description
```

[FIG. 18L]

```
      "The alert rate of flood detect for
       same packets.";
   }
} container packet-security-payload-condition {
   description
     "Condition for packet payload";
   leaf packet-payload-description {
     type string;
     description
      "This is description for payload condition.
       Vendors can write instructions for payload condition
       that vendor made";
   }
   leaf-list pkt-payload-content {
     type string;
     description
       "The content keyword is very important in
        signatures. Between the quotation marks you
        can write on what you would like the
        signature to match.";
   }
} container context-condition {
   description
     "Condition for context";
   leaf context-description {
     type string;
     description
       "This is description for context condition.
        Vendors can write instructions for context condition
        that vendor made";
   } container application-condition {
     description
       "Condition for application";
     leaf application-description {
       type string;
       description
        "This is description for application condition.";
     }
     leaf-list application-object {
       type string;
       description
         "This is application object.";
```

[FIG. 18M]

```
    }
    leaf-list application-group {
      type string;
      description
        "This is application group.";
    }
    leaf-list application-label {
      type string;
      description
        "This is application label.";
    }
    container category {
      description
        "This is application category";
      list application-category {
        key "name application-subcategory";
        description
          "This is application category list";
        leaf name {
          type string;
          description
            "This is name for application category.";
        }
        leaf application-subcategory {
          type string;
          description
            "This is application subcategory.";
        }
      }
    }
  } container target-condition {
    description
      "Condition for target";
    leaf target-description {
      type string;
      description
        "This is description for target condition.
        Vendors can write instructions for target condition
        that vendor made";
    } container device-sec-context-cond {
      description
        "The device attribute that can identify a device,
        including the device type (i.e., router, switch,
        pc, ios, or android) and the device's owner as
```

[FIG. 18N]

```
      well.";

leaf-list target-device {
      type identityref {
        base target-device;
      }
      description
        "Leaf list for target devices";
    }
  }
} container users-condition {
  description
    "Condition for users";
  leaf users-description {
    type string;
    description
      "This is description for user condition.
       Vendors can write instructions for user condition
       that vendor made";
  }
  container user{
    description
      "The user (or user group) information with which
       network flow is associated: The user has many
       attributes such as name, id, password, type,
       authentication mode and so on. Name/id is often
       used in the security policy to identify the user.
       Besides, NSF is aware of the IP address of the
       user provided by a unified user management system
       via network. Based on name-address association,
       NSF is able to enforce the security functions
       over the given user (or user group)";

choice user-name {
      description
        "The name of the user.";

case tenant {
        description
          "Tenant information.";

leaf tenant {
          type uint8;
          description
            "User's tenant information.";
        }
```

[FIG. 180]

```
    } case vn-id {
      description
        "VN-ID information.";

leaf vn-id {
        type uint8;
        description
          "User's VN-ID information.";
      }
    }
  }
} container group {
  description
    "The user (or user group) information with which
    network flow is associated: The user has many
    attributes such as name, id, password, type,
    authentication mode and so on. Name/id is often
    used in the security policy to identify the user.
    Besides, NSF is aware of the IP address of the
    user provided by a unified user management system
    via network. Based on name-address association,
    NSF is able to enforce the security functions
    over the given user (or user group)";

choice group-name {
    description
      "The name of the user.";

case tenant {
      description
        "Tenant information.";

leaf tenant {
        type uint8;
        description
          "User's tenant information.";
      }
    } case vn-id {
      description
        "VN-ID information.";

leaf vn-id {
```

[FIG. 18P]

```
            type uint8;
            description
              "User's VN-ID information.";
          }
        }
      }
    } leaf security-group {
      type string;
      description
        "security-group.";
    }
  } container gen-context-condition {
    description
      "Condition for generic context";
    leaf gen-context-description {
      type string;
      description
        "This is description for generic context condition.
        Vendors can write instructions for generic context
        condition that vendor made";
    } container geographic-location {
      description
        "The location where network traffic is associated
        with. The region can be the geographic location
        such as country, province, and city,
        as well as the logical network location such as
        IP address, network section, and network domain.";

leaf-list src-geographic-location {
        type uint32;
        description
          "This is mapped to ip address. We can acquire
          source region through ip address stored in the
          database.";
      }
      leaf-list dest-geographic-location {
        type uint32;
        description
          "This is mapped to ip address. We can acquire
          destination region through ip address stored
          in the database.";
      }
```

[FIG. 18Q]

```
      }
     }
    }
} container action-clause-container {
  description
    "An action is used to control and monitor aspects of
     flow-based NSFs when the event and condition clauses
     are satisfied. NSFs provide security functions by
     executing various Actions. Examples of I2NSF Actions
     include providing intrusion detection and/or protection,
     web and flow filtering, and deep packet inspection
     for packets and flows.";
  reference
    "RFC 8329: Framework for Interface to Network Security
     Functions - I2NSF Flow Security Policy Structure
     draft-ietf-i2nsf-capability-05: Information Model
     of NSFs Capabilities - Design Principles and ECA Policy
     Model Overview";

leaf action-clause-description {
    type string;
    description
      "Description for an action clause.";
  } container packet-action {
    description
      "Action for packets";
    reference
      "RFC 8329: Framework for Interface to Network Security
       Functions - I2NSF Flow Security Policy Structure
       draft-ietf-i2nsf-capability-05: Information Model
       of NSFs Capabilities - Design Principles and ECA
       Policy Model Overview";

leaf ingress-action {
      type identityref {
        base ingress-action;
      }
      description
        "Action: pass, drop, reject, alert, and mirror.";
    } leaf egress-action {
```

[FIG. 18R]

```
    type identityref {
      base egress-action;
    }
    description
      "Egress action: pass, drop, reject, alert, mirror,
      invoke-signaling, tunnel-encapsulation,
      forwarding, and redirection.";
  } leaf log-action {
    type identityref {
      base log-action;
    }
    description
      "Log action: rule log and session log";
  }

} container advanced-action {
  description
    "If the packet need be additionally inspected,
    the packet are passed to advanced network
    security functions according to the profile.";
  reference
    "RFC 8329: Framework for Interface to Network Security
    Functions - Differences from ACL Data Models";

leaf-list content-security-control {
      type identityref {
        base content-security-control;
      }
      description
        "The Profile is divided into content security
        control and attack-mitigation-control.
        Content security control: antivirus, ips, ids,
        url filtering, mail filtering, file blocking,
        file isolate, packet capture, application control,
        voip and volte.";
  } leaf-list attack-mitigation-control {
      type identityref {
        base attack-mitigation-control;
      }
      description
        "The Profile is divided into content security
        control and attack-mitigation-control.
```

[FIG. 18S]

```
                Attack mitigation control: syn flood, udp flood,
                icmp flood, ip frag flood, ipv6 related, http flood,
                https flood, dns flood, dns amp flood, ssl ddos,
                ip sweep, port scanning, ping of death, teardrop,
                oversized icmp, tracert.";
          }
        }
      }
    }
    container rule-group {
      description
        "This is rule group";

list groups {
        key "group-name";
        description
          "This is a group for rules";

leaf group-name {
          type string;
          description
            "This is a group for rules";
        } container rule-range {
          description
            "This is a rule range.";

leaf start-rule {
            type string;
            description
              "This is a start rule";
          }
          leaf end-rule {
            type string;
            description
              "This is a end rule";
          }
        }
        leaf enable {
          type boolean;
          description
            "This is enable
             False is not enable.";
        }
        leaf description {
          type string;
          description
```

[FIG. 18T]

```
            "This is a desription for rule-group";
          }
        }
      }
    }
  } leaf i2nsf-ipsec {
    type identityref {
      base i2nsf-ipsec;
    }
    description
      "Internet Key Exchnage for NSFs
       in the I2NSF framework";

reference
      "draft-ietf-i2nsf-sdn-ipsec-flow-protection-04
       - i2nsf-ipsec";
  }
}

<CODE ENDS>
```

[FIG. 19A]

```
<i2nsf-security-policy
xmlns="urn:ietf:params:xml:ns:yang:ietf-i2nsf-policy-rule-for-nsf">
<system-policy>
 <system-policy-name>sns_access</system-policy-name>
 <rules>
  <rule-name>block_sns_access_during_operation_time</rule-name>
  <time-intervals>
   <absolute-time-interval>
    <start-date-time>2019-08-01T09:00:00Z</start-date-time>
    <end-date-time>2019-12-31T18:00:00Z</end-date-time>
   </absolute-time-interval>
  </time-intervals>
  <condition-clause-container>
   <packet-security-ipv4-condition>
    <pkt-sec-ipv4-src>
     <range-ipv4-address>
      <start-ipv4-address>221.159.112.1</start-ipv4-address>
      <end-ipv4-address>221.159.112.90</end-ipv4-address>
     </range-ipv4-address>
    </pkt-sec-ipv4-src>
   </packet-security-ipv4-condition>
  </condition-clause-container>
  <action-clause-container>
   <advanced-action>
    <content-security-control>url-filtering</content-security-control>
   </advanced-action>
  </action-clause-container>
 </rules>
</system-policy>
</i2nsf-security-policy>
```

[FIG. 19B]

```
<i2nsf-security-policy
xmlns="urn:ietf:params:xml:ns:yang:ietf-i2nsf-policy-rule-for-nsf">
<system-policy>
 <system-policy-name>sns_access</system-policy-name>
 <rules>
  <rule-name>block_sns_access_during_operation_time</rule-name>
  <condition-clause-container>
   <packet-security-url-category-condition>
    <user-defined-category>facebook</user-defined-category>
    <user-defined-category>instagram</user-defined-category>
   </packet-security-url-category-condition>
  </condition-clause-container>
  <action-clause-container>
   <packet-action>
    <egress-action>drop</egress-action>
   </packet-action>
  </action-clause-container>
 </rules>
</system-policy>
</i2nsf-security-policy>
```

[FIG. 19C]

```
<i2nsf-security-policy
xmlns="urn:ietf:params:xml:ns:yang:ietf-i2nsf-policy-rule-for-nsf">
<system-policy>
 <system-policy-name>voip_volte_inspection</system-policy-name>
 <rules>
  <rule-name>block_malicious_voice_id</rule-name>
  <condition-clause-container>
   <packet-security-ipv4-condition>
    <pkt-sec-ipv4-dest>
     <range-ipv4-address>
      <start-ipv4-address>221.159.112.1</start-ipv4-address>
      <end-ipv4-address>221.159.112.90</end-ipv4-address>
     </range-ipv4-address>
    </pkt-sec-ipv4-dest>
   </packet-security-ipv4-condition>
   <packet-security-tcp-condition>
    <pkt-sec-tcp-dest-port-num>
     <port-num>5060</port-num>
     <port-num>5061</port-num>
    </pkt-sec-tcp-dest-port-num>
   </packet-security-tcp-condition>
  </condition-clause-container>
  <action-clause-container>
   <advanced-action>
    <content-security-control>voip-volte</content-security-control>
   </advanced-action>
  </action-clause-container>
 </rules>
</system-policy>
</i2nsf-security-policy>
```

[FIG. 19D]

```
<i2nsf-security-policy
xmlns="urn:ietf:params:xml:ns:yang:ietf-i2nsf-policy-rule-for-nsf">
<system-policy>
 <system-policy-name>voip_volte_inspection</system-policy-name>
 <rules>
  <rule-name>block_malicious_voice_id</rule-name>
  <condition-clause-container>
   <packet-security-voice-condition>
    <pkt-sec-src-voice-id>11111@voip.black.com</pkt-sec-src-voice-id>
    <pkt-sec-src-voice-id>22222@voip.black.com</pkt-sec-src-voice-id>
   </packet-security-voice-condition>
  </condition-clause-container>
  <action-clause-container>
   <packet-action>
    <ingress-action>drop</ingress-action>
   </packet-action>
  </action-clause-container>
 </rules>
</system-policy>
</i2nsf-security-policy>
```

[FIG. 19E]

```
<i2nsf-security-policy
xmlns="urn:ietf:params:xml:ns:yang:ietf-i2nsf-policy-rule-for-nsf">
<system-policy>
 <system-policy-name>flood_attack_mitigation</system-policy-name>
 <rules>
  <rule-name>mitigate_http_and_https_flood_attack</rule-name>
  <condition-clause-container>
   <packet-security-ipv4-condition>
    <pkt-sec-ipv4-dest>
     <ipv4-address>
      <ipv4>221.159.112.95</ipv4>
     </ipv4-address>
    </pkt-sec-ipv4-dest>
   </packet-security-ipv4-condition>
   <packet-security-tcp-condition>
    <pkt-sec-tcp-dest-port-num>
     <port-num>80</port-num>
     <port-num>443</port-num>
    </pkt-sec-tcp-dest-port-num>
   </packet-security-tcp-condition>
  </condition-clause-container>
  <action-clause-container>
   <advanced-action>
    <attack-mitigation-control>http-and-https-flood
    </attack-mitigation-control>
   </advanced-action>
  </action-clause-container>
 </rules>
</system-policy>
</i2nsf-security-policy>
```

[FIG. 19F]

```
<i2nsf-security-policy
xmlns="urn:ietf:params:xml:ns:yang:ietf-i2nsf-policy-rule-for-nsf">
<system-policy>
 <system-policy-name>flood_attack_mitigation</system-policy-name>
 <rules>
  <rule-name>mitigate_http_and_https_flood_attack</rule-name>
  <condition-clause-container>
   <packet-security-ddos-condition>
    <pkt-sec-alert-rate>100</pkt-sec-alert-rate>
   </packet-security-ddos-condition>
  </condition-clause-container>
  <action-clause-container>
   <packet-action>
    <ingress-action>drop</ingress-action>
   </packet-action>
  </action-clause-container>
 </rules>
</system-policy>
</i2nsf-security-policy>
```

[FIG. 20]

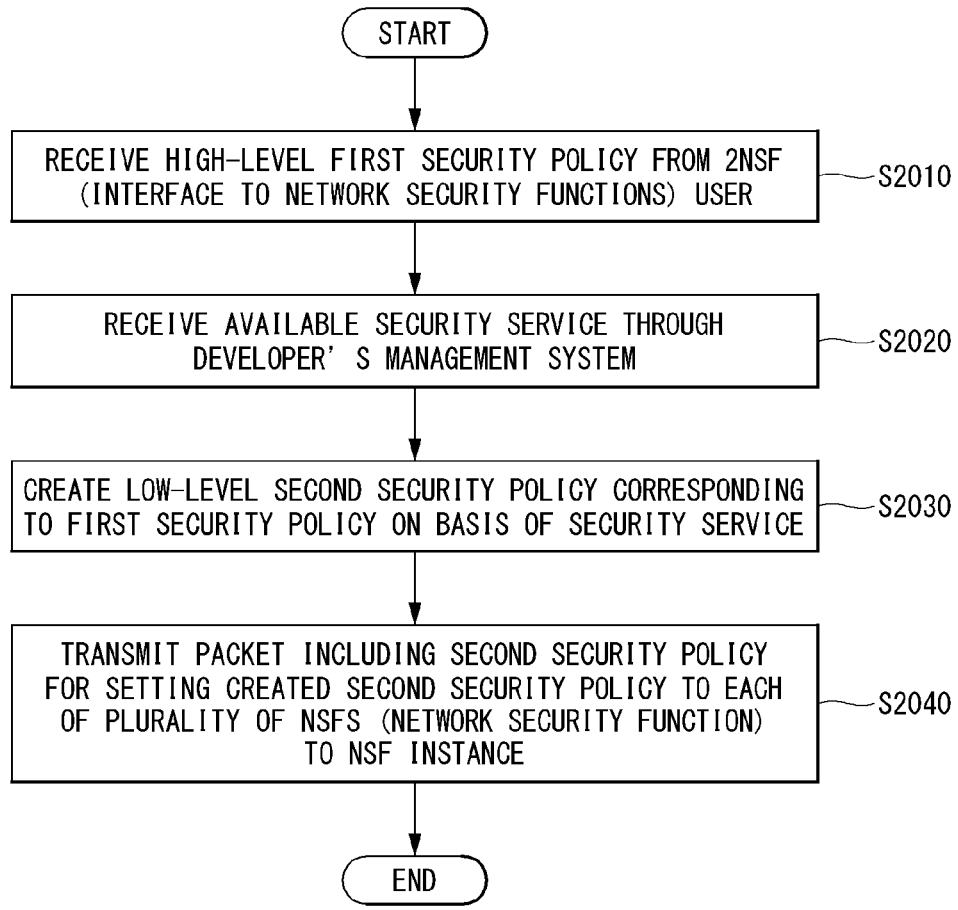

I2NSF NETWORK SECURITY FUNCTION FACING INTERFACE YANG DATA MODEL

CROSS-REFERENCE TO RELATED APPLICATION

This application claims the benefit of Korean Patent Application No. 10-2019-0069642 filed on Jun. 12, 2019, No. 10-2019-0090540 filed on Jul. 25, 2019, and No. 10-2019-0139817 filed on Nov. 4, 2019. The contents of this application are hereby incorporated by reference in its entirety.

BACKGROUND OF THE DISCLOSURE

Field of the Disclosure

The present disclosure relates to a data model and, more particularly, to define an information model for a network security function (NSF)-facing interface and a YANG data model for a security service in an I2NSF (Interface to Network Security Functions).

Related Art

When a network is connected to the whole world, it is possible to quickly access information regardless of geometrical distance. The internet is fundamentally composed of a large number of networks in which hierarchies of different levels are connected to each other.

The internet is operated in accordance with TCP/IP (transmission control protocol/internet protocol) published by IETF (Internet Engineering Task Force), and the TCP/IP can be found from RFC (Request For Comments) 703 and RFC 791 issued by IETF.

SUMMARY OF THE DISCLOSURE

The present disclosure provides a method of designing an information model for a network security function (NSF)-facing interface and a YANG data model for a security service in an I2NSF (Interface to Network Security Functions).

Further, the present disclosure proposes a method of designing a specific information model and a corresponding data model for three security capabilities (e.g., network security capabilities) such as network security control, contents security control, and attack mitigation control.

The technical subject to implement in the present disclosure are not limited to the technical problems described above and other technical subjects that are not stated herein will be clearly understood by those skilled in the art from the following specifications.

An aspect of the present disclosure provides a method of providing a security service by means of a network operator management system in a security management system, the method including: receiving a high-level first security policy from an I2NSF (Interface to Network Security Functions) user; receiving an available security service from a developer's management system; creating a low-level second security policy corresponding to the first security policy on the basis of the security service; and transmitting a packet including the second security policy for setting the created second security policy to each of a plurality of NSFs (Network Security Function) to an NSF instance, in which the network operator management system and the NSFs are respectively connected to an I2NSF NSF-facing interface, and the second security policy includes at least one or more of 1) blocking SNS access during business hours, 2) blocking a malicious VoIP (Voice over Internet Protocol) or a malicious VoLTE (Voice over LTE) packet, or 3) mitigating flood of http and https for a company web server.

Further, the second security policy may include an applied policy rule, and basic action information showing an action for a generic security function.

Further, the policy rule may include policy information and rule information, and the policy information and the rule information may include an event clause showing a change of a system, a condition clause showing an application condition of a policy rule, and an action clause showing a security function that is performed when the event clause and the condition clause are satisfied.

Further, on the basis of the fact that the second security policy is for blocking SNS access during business hours, the policy rule may further includes time information for enabling the policy rule to be applied only during the business hours and a source IP address for examining a transmission packet.

Further, on the basis of the time information and the source IP address, when a URL (Uniform Resource Locator) address of the transmission packet is a URL address of a specific SNS, transmission of the transmission packet may be blocked.

Further, on the basis of the fact that the second security policy is for blocking the malicious VoIP or the malicious VoLTE packet, the policy rule may further include 1) an IP address and 2) a port number to which the malicious VoIP or the malicious VoLTE packet are received.

Further, on the basis of the 1) IP address and the 2) port number, a packet matched with a voice ID of the malicious VoIP or the malicious VoLTE packet may be blocked.

Further, on the basis of the fact that the second security policy is for mitigating flood of http and https for the company web server, the policy rule may further include 1) IP address and 2) port number of the packet received to the company web server.

Further, on the basis of the 1) IP address and the 2) port number, when a reception ratio per hour in which a packet received to the company web server can be allowed is exceeded, a packet that may be received to the company web server is blocked.

Further, the policy rule may further include information about the range of an IP address for matching.

Another aspect of the present disclosure provides a security management system for providing a security service, the security management system including: an I2NSF (Interface to Network Security Functions) creating a high-level first security policy; a developer's management system providing a security service; a network operator management system receiving the first security policy from the I2NSF user, receiving the security service from the developer's management system, creating a low-level second security policy corresponding to the first security policy on the basis of the security service, and transmitting a packet including the second security policy for setting the created second security polity to each of a plurality of NSFs (Network Security Function), to an NSF instance; and a plurality of NSFs (Network Security Function) receiving the second security policy from the network operator management system, in which the network operator management system and the NSFs are respectively connected to an I2NSF NSF-facing interface, and the second security policy includes at least one or more of 1) blocking SNS access during business hours, 2) blocking a malicious VoIP (Voice over Internet Protocol) or a malicious VoLTE (Voice over LTE) packet, or 3) mitigating flood of http and https for a company web server.

The effects of the present disclosure are not limited to the effects described above and other effects can be clearly understood by those skilled in the art from the following description.

BRIEF DESCRIPTION OF THE DRAWINGS

Accompanying drawings included as a part of the detailed description for helping understand the present disclosure provide embodiments of the present disclosure and are provided to describe technical features of the present disclosure with the detailed description.

FIG. 1 shows an I2NSF (Interface to Network Security Functions) system according to an embodiment of the present disclosure.

FIG. 2 exemplifies an architecture of the I2NSF system according to an embodiment of the present disclosure.

FIG. 3 shows an example of an entire I2NSF information model design to which the present disclosure can be applied.

FIG. 4 shows an example of a network security information low-level model overview to which the present disclosure can be applied.

FIG. 5 shows an example of extension of a network security information low-level model to which the present disclosure can be applied.

FIG. 6 shows an example of extension a network security information low-level model event class to which the present disclosure can be applied.

FIG. 7 shows an example of extension a network security information sub-model condition class to which the present disclosure can be applied.

FIG. 8 shows an example of extension of a network security information sub-model action to which the present disclosure can be applied.

FIG. 9 shows an example of a high-level model of an I2NSF security function to which the present disclosure can be applied.

FIG. 10 shows an example of extension of a network security function information model to which the present disclosure can be applied.

FIG. 11 shows an example of extension of an attack mitigation function information model to which the present disclosure can be applied.

FIG. 12 exemplifies a data model architecture for network security policy recognition according to an embodiment of the present disclosure.

FIG. 13 exemplifies a data model architecture for an event rule according to an embodiment of the present disclosure.

FIGS. 14A to 14G show examples of a data model architecture for a condition rule according to an embodiment of the present disclosure.

FIG. 15A exemplifies a data model architecture for an action rule according to an embodiment of the present disclosure.

FIG. 15B is an example of an I2NSF IPsec(IP Security) to which the present disclosure can be applied.

FIGS. 16A to 18T exemplify a YANG data module of an I2NSF NSF-Facing-Interface according to an embodiment of the present disclosure.

FIGS. 19A to 19F exemplify XML (Extensible Markup Language) setting of a low-level security policy rules according to an embodiment of the present disclosure.

FIG. 20 is an embodiment to which the present disclosure can be applied.

DESCRIPTION OF EXEMPLARY EMBODIMENTS

Hereinafter, preferred embodiments of the present disclosure will be described in detail with reference to the accompanying drawings. The detailed description that will be provided with the accompanying drawings is provided to explain exemplary embodiments of the present disclosure and is not intended to unique embodiments that can implement the present disclosure. The following detailed description includes details to help complete understand the present disclosure. However, those skilled in the art know that the present disclosure can be implemented even without the details.

In some cases, well-known structures and devices may be omitted or the important capability of each structure and device may be shown in a block diagram type to avoid making the concept of the present disclosure unclear.

Specific terms that are used in the following description are provided to help understand the present disclosure, and use of these specific terms may be changed in other ways without departing from the technical spirit of the present disclosure.

Recently, a fundamental standard interface for an NFV-based security function is developed by an NFV-based security function working group. This is a portion of the international internal standard organization called an IETF (Internet Engineering Task Force).

The object of the I2NSF is for defining a standardized interface for a heterogeneous NSF(s) (network security function) provided by several security solution vendors.

In an I2NSF architecture, without considering management of an NSF(s) in detail (management of NSF requires enforcement of a security policy), a user can define a protection policy for protecting network resources in a network system. Further, an interface standardized to an NSF(s) from several vendors can simplify setting and managing of tasks for a heterogeneous NSF(s).

FIG. 1 shows an I2NSF (Interface to Network Security Functions) system according to an embodiment of the present disclosure.

Referring to FIG. 1, an I2NSF system includes an I2NSF user, a network operator management system, a developer's management system, and/or at least one NSF (Network Security Function).

The I2NSF user communicates with the network operator management system through an I2NSF consumer-facing interface. The network operator management system communicates with an NSF(s) through an I2NSF NSF-facing interface. The developer's management system communicates with the network operator management system through an I2NSF registration interface. Hereafter, each component of an I2NSF system (I2NSF component) and each interface (I2NSF interface) are described.

I2NSF User

An I2NSF user is an I2NSF component that requests information from another I2NSF component (e.g., a network operator management system) and/or uses a service (e.g., a network security service) provided by another I2NSF component (e.g., a developer's management system). For example, the I2NSF user may be an overlay network management system, an enterprise network manager system, another network domain manager, etc.

The object that performs the functions designated to the I2NSF user component may be referred to as an I2NSF consumer. As an example of the I2NSF consumer, a video-conference network manager that needs to dynamically give a notice to an underlay network to allow, rate-limit, or reject flow on the basis of a specific field of a packet for a time span, enterprise network administrators and management systems that needs to request a vendor network to enforce a specific I2NSF policy for specific flow, and an IoT management system that transmits a request to an underlay network to block flow coinciding with a set of a specific condition may be included.

The I2NSF user can create and distribute a high-level security policy. In detail, the I2NSF user needs to use a network security service to protect a network traffic from various malicious attacks. In order to request this security service, the I2NSF user can create a high-level security policy for a security service that it desires, and can inform the network operator management system of the high-level security polity.

Meanwhile, in the process of preparing the high-level security polity, the I2NSF user has to consider the type of an NSF(s) required to implement a security service or a security policy rule configuration for each NSF(s).

Further, the I2NSF user can be notified of a security event(s) in underlying an NSF(s) by the network operator management system. By analyzing the security event(s), the I2NSF user can recognize new attacks and can update (or create) a high-level security policy for dealing with the new attacks. As described above, the I2NSF user can define, manage, and monitor a security policy.

Network Operator Management System

The network operator management system is a component that performs collection, distribution, and point for providing security, monitoring, and other actions. For example, the network operator management system may be a security controller. The network operator management system may be managed by a network security manager and may be referred to as an I2NSF management system.

One of the important functions of the network operator management system (or security controller) is to translate a high-level security policy (or policy rule) from the I2NSF user into a low-level security policy rule for a specific NSF(s). The network operator management system (or security controller) may receive a high-level security policy from the I2NSF user and determine the type of an NSF(s) required to enforce a policy requested first by the I2NSF user. Further, the network operator management system (security controller) may create a low-level security policy for each requested NSF(s) As a result, the network operator management system (or security controller) may set the created low-level security policy to each NSF(s).

Further, the network operator management system (or security controller) may monitor an NSF(s) that is being in driven in a system, and may maintain various items of information (e.g., network access information and a workload state) about each NSF(s). Further, the network operator management system (or security controller) may dynamically manage the pool of an NSF instance through dynamic life-cycle management of the NSF instance with the assistance of the developer's management system.

NSF

The NSF is a logical entity or a software component that provides a security-related service. For example, the NSF may receive a low-level security policy, and may sense and block or attenuate a malicious network traffic on the basis of the low-level security policy. Accordingly, integrity and confidentiality of a network communication stream can be secured.

Developer's Management System

The developer's management system is an I2NSF component that sends information to another I2NSF component (e.g., the I2NSF user or the network operator management system) and/or provide a service (e.g., a network security service). The developer's management system may be referred to as a vendor's management system. An object that performs a function designated to the developer's management system may be referred to as an I2NSF producer.

The developer's management system may be managed by a third-party security vendor that provides an NSF(s) to the network operator management system. Several developer's management systems of various security vendors may exist.

I2NSF Consumer-Facing Interface (Briefly, Consumer-Facing Interface (CFI)

The CFI is an interface to an I2NSF system of a user, positioned between the I2NSF user and the network operator management system. By being designed in this way, only an abstract view of an NSF(s) is provided to a user with the details of an underlying NSF(s) hidden.

The CFI may be used to enable different users of an I2NSF system to define, manage, and monitor a security policy for specific flow in a management domain. A high-level security policy (policy rule) created by the I2NSF user may be transmitted to the network operator management system through the CFI I2NSF NSF-Facing Interface (Briefly, NSF-Facing Interface (NFI)

The NFI is an interface positioned between the network operator management system (or security controller) and an NSF(s).

The NFI may be used to designate and monitor a flow-based security policy enforced by one or more NSFs. For example, the I2NSF system may use a flow-based NSF. In this case, the flow-based NSF is an NSF that examines network from in accordance with a set of policies to reinforce the security characteristic. Flow-based security by the flow-based NSF means that packets are examined in the received order and there is no correction for the packets in accordance with an examination process. The interface for the flow-based NSF may be classified as follows:

NSF Operational and Administrative Interface: An interface group used by the I2NSF management system to program the operation state of an NSF; this interface group also includes a management control capability. The I2NSF policy rule is one method of changing the interface group in a consistent manner. Since an application and an I2NSF component need to dynamically control the actions of traffics that they transmit and receive, most of I2NSF efforts are concentrated on the interface group.

Monitoring Interface: An interface group used by the I2NSF management system to obtain monitoring information of one or more selected NSFs; each interface of this interface group may be a query- or report-based interface. The difference between the two is that the query-based interface is used by the I2NSF management system to obtain information, but the report-based interface is used by an NSF to provide information. The capability of the interface group may also be defined by another protocol such as LOG[RFC 5424] and DOTS (Distributed Denial-of-Service Open Threat Signaling) [RFC 8782]. The I2NSF management system may take one or more actions on the basis of reception of information. This should be designated by a policy rule. The interface group does not change the operation state of an NSF.

As described above, the NFI may be developed using a flow-based paradigm. The common trait of the flow-based NSF is to process a packet on the basis of the contents (e.g., header/payload) and/or context (e.g., a session state and an authentication state) of a received packet. This trait is one of requirements for defining the action of the I2NSF system.

Meanwhile, the I2NSF system does not need to use all abilities of a given NSF and does not need to use all available NSFs. Accordingly, this abstraction enables an NSF feature to be handled in a building block by an NSF system. Therefore, a developer may freely use a security capability defined by an individual NSF for a vendor and a technology.

I2NSF Registration Interface (Briefly, Registration Interface (RI))

The RI is an interface positioned between the network operator management system and the developer's management system. NSFs provided by different vendors may have different capabilities. Accordingly, in order to automate a process that uses various types of security capabilities provided by different vendors, the vendors need to have an exclusive interface for determining the capabilities of their NSFs. These exclusive interfaces may be referred to as I2NSF registration interface (RI).

The capability of an NSF may be configured in advance or may be dynamically searched through an I2NSF registration interface. If a new capability that is exposed to a consumer is added to an NSF, in order that interested management and control entity can know that, a new capability needs to be registered on an I2NSF registry through the I2NSF registration interface.

FIG. 2 exemplifies an architecture of the I2NSF system according to an embodiment of the present disclosure. The I2NSF system of FIG. 2 shows in more detail the configuration of an I2NSF user and a network operator management system in comparison to the I2NSF system of FIG. 1. In FIG. 2, description overlapping the detailed description of FIG. 1 is omitted.

Referring to FIG. 2, an I2NSF system includes an I2NSF user, a security management system, and an NSF instance hierarchy. An I2NSF user hierarchy includes an application logic, a policy updater, and an event collector as components. A security management system hierarchy includes a security controller and a developer's management system. The security controller of the security management system hierarchy includes a security policy manager and an NSF capability manager as components.

The I2NSF user hierarchy communicates with the security management system hierarchy through a consumer-facing interface. For example, the policy updater and the event collector of the I2NSF user hierarchy communicates with the security controller of the security management system hierarchy through a consumer-facing interface. Further, the security management system hierarchy communicates with an NSF instance hierarchy through an NSF-facing interface. For example, the security controller of the security management system hierarchy communicates with an NSF instance(s) of the NSF instance hierarchy through the NSF-facing interface. Further, the developer's management system of the security management system hierarchy communicates with the security controller of the security management system hierarchy through a registration interface.

The I2NSF user hierarchy, the security controller component of the security management system hierarchy, the developer's management system component of the security management system hierarchy, and the NSF instance hierarchy of FIG. 2 respectively correspond to the I2NSF user hierarchy, the network operator management system component, the developer's management system component, and the NSF component of FIG. 1. Further, the consumer-facing interface, the NSF-facing interface, and the registration interface of FIG. 2 correspond to the consumer-facing interface, the NSF-facing interface, and the registration interface of FIG. 1. Hereafter, newly defined components included in each hierarchy are described.

I2NSF User

As described above, an I2NSF user hierarchy includes the following three components: an application logic, a policy updater, and an event collector. The function and action of each component are as follows.

The application logic is a component that creates a high-level security policy. To this end, the application logic receives an event for updating (or creating a high-level policy from the event collector and updates (or creates) the high-level policy on the basis of the collected event. Thereafter, the high-level policy is sent to the policy updater to be distributed to the security controller. In order to update (or create) the high-level policy, the event collector receives events sent by the security collector and sends them to the application logic. On the basis of this feedback, the application logic may update (or create) the high-level security policy.

In FIG. 2, the application logic, the policy updater, and the event collector are shown as individual configurations, but the present disclosure is not limited thereto. In other words, each of them is a logic component and may be implemented as one or two components in the I2NSF system.

Security Management System

As described above, the security controller of the security management system hierarchy includes two components such as a security policy manager and an NSF capability manager.

The security policy manager may receives a high-level policy from the policy updater through the CFI and may map the policy to a low-level policy. The low-level policy is related to a given NSF capability registered in an NSF capability manager. Further, the security policy manager may transmit the policy to an NSF(s) through the NFI.

The NSF capability manager may designate the capability of an NSF registered by the developer's management system and share the capability with the security policy manager to create a low-level policy related to a given NSF capability. Every time a new NSF is registered, the NSF capability manager may request the developer's management system to register the capability of the NSF in a management table of the NSF capability manager through the registration interface. The developer's management system correspond to another part of the security management system fro registering the capability of a new NSF to the NSF capability manager.

In FIG. 2, the security policy manager and the NSF capability manager are shown as individual configurations, but the present disclosure is not limited thereto. In other words, each of them is a logic component and may be implemented as one component in the I2NSF system.

NSF Instances

As shown in FIG. 2, the NSF instance hierarchy includes NSFs. In this case, all the NSFs are positioned in the NSF instance hierarchy. Meanwhile, a high-level policy is mapped to a low-level policy and then the security policy manager transmits the policy to the NSF(s) through the NFI.

In this case, the NSF may sense and block or attenuate a malicious network traffic on the basis of the received low-level security policy.

For quick development of a virtualization system, a high-class security capability is required in various scenarios (e.g., the network device of an enterprise network, the user equipment of a mobile network, a device of the internet, or a resident access user).

NSFs produced by several security companies may provide various security capabilities to customers. That is, regardless of whether NSF are implemented by a physical or virtual capability, several NSF may provide a security service for a given network traffic by being combined with each other.

A security capability means a capability related to security of a series of networks that can be used for enforcing a security policy. The security capability is independent from an actually implemented security control mechanism and a set of capabilities that can be provided by NSFs is registered in all NSFs.

The security capability is a market leader providing a method that can define customized security protection by clearly explaining the security capability provided by a specific NSF. Further, the company supplying the security capability may be explained in a neutral manner through the security capability.

That is, it is not required to state a specific product and a feature may be considered for each capability when designing a network.

As described above, as the I2NSF interface that can be used for providing a security policy, two types may exist as follows.

An interface and a security controller between an I2NSF user and an application program (Consumer-Facing Interface): Service-directional interface providing NSF data and a communication channel between a service user and a network operator management system (or security controller).

The I2NSF Consumer-Facing Interface enables security information to be used for exchange between various applications (e.g., OpenStack or various BSS/OSS components) and a security controller. The design target of the Consumer-Facing Interface is to implement and separate specs of a security service.

An interface (e.g., a firewall, anti-invasion or anti-virus) and a security controller between NSFs (NSF-Facing interface): The NSF-Facing Interface is used to separate a security management system from an NSF set and several implements and is independent in the manner in which an NSF is implemented (e.g., a virtual machine or actual appliances).

Hereafter, an object-directional information model about network security, contents security, and an attach attenuation capability is described with related I2NSF policy objects.

In the present disclosure, terms used in an information module may be defined as follows.

AAA: Access control, Authorization, Authentication
ACL: Access Control List
(D)DoD: (Distributed) Denial of Service (attack)
ECA: Event-Condition-Action
FMR: First Matching Rule (resolution strategy)
FW: Firewall
GNSF: Generic Network Security Function
HTTP: HyperText Transfer Protocol
I2NSF: Interface to Network Security Functions
IPS: Intrusion Prevention System
LMR: Last Matching Rule (resolution strategy)
MIME: Multipurpose Internet Mail Extensions
NAT: Network Address Translation
NSF: Network Security Function
RPC: Remote Procedure Call
SMA: String Matching Algorithm
URL: Uniform Resource Locator
VPN: Virtual Private Network Information Model Design The start point of designing of a capability information model is to classify the types of security capabilities. For example, it is to classify the types of security types such as "IPS", "antivirus", and "VPN concentration apparatus".

Alternatively, a "packet filter" may be classified into a storage device that can allow for or reject packet transmission in accordance with various conditions (e.g., transmission and reception IP addresses, transmission and reception ports, and an IP protocol type field).

However, other devices such as a state-based firewall or an application program layer filter require more information. These devices filter a packet or communication, but are different in the state that categorizes and maintains packets and communications.

Analog consideration points may be considered in channel protection protocols.

The channel protection protocols may protect a packet through a symmetric algorithm that can be negotiated into an asymmetric password, may operate in different layers, and may support different algorithms and protocols.

For safe protection, perfection, selective secrecy, anti-reply protection, and peer authentication should be applied to these protocols.

Capability Information Model Overview

A capability information model defines a security capability model providing a base for automatic management of an NSF. The capability information module includes allowing a security controller to appropriately recognize and manage an NSF and appropriately declare such that an NSF can use capabilities in a correct way.

Some basic rules for security and a system that has to manage the basic rules are as follows.

Independence: Each security capability should be capability that has minimum overlap or dependence to another capability. Accordingly, the security capabilities can be freely used and combined. It is more important that a change to one capability does not influence another capability.

This follows Single Responsibility Principle [Martin] [OODSRP].

Abstraction: Each capability should be defined in an vendor-independent manner and should provide a standardized capability that is connected with a well-known interface and can describe and report a processing result. Accordingly, mutual operability with multiple vendors can be improved.

Automation: A system should be able to automatically search, automatically negotiate, and automatically update a security capability (i.e., without intervention of a user). This automation capability is particularly useful for managing several NSFs.

It is necessary to add a smart service (e.g., analysis, refinement, capability inference, and optimization) to a selected security system. This capability is supported in main design patterns such as Observer Pattern [OODOP], Mediator Pattern [OODMP], and Message Exchange Patterns [Hohpe].

Extendibility: A management system should have a scale up/down or scale in/out capability. Accordingly, due to this extendibility, it is possible to satisfy various performance requirements derived from a variable network traffic or service request. Further, a security capability that is influenced by extendibility may help to determine whether to call out a scaling only when supporting a report statistics to a security controller.

Abstraction having a standard interface and a vender neutral capability set may be defined in accordance with the basic rules. This provides definition such that a capability model enabling a necessary NSF set to be used within a give time and security provided by a used NSF set is not ambiguous.

The security controller selects an NSF required to satisfy corresponding requirements by comparing requirements of a user and an application program with a currently available capability set.

Further, when an unknown threat (e.g., zero-day exploits and unknown malware) is reported by an NSF, a new capability may be created and/or the existing capability may be updated (e.g., by updating its signature and algorithm). As a result, the existing NSF is reinforced (and/or a new NSF is created) to cope with a new threat.

The new capability may be transmitted and stored in a central repository or may be individually stored in a local repository of a vendor. In both cases, a standard interface enables an update process to be easily performed.

ECA Policy Model Overview

An "Event-Condition-Action" (ECA) policy model is used as a base for design of an I2NSF policy rule. IN this case, terms related to the I2NSF policy may be defined as follows (see ([I-D.draft-ietf-i2nsf-terminology]).

Event: An event occurs at an important point when a system that is managed is changed or in time in the environment of a system that is managed. An event may be used to determine whether it is possible to evaluate a condition clause of the I2NSF when being used in a context of the I2NSF policy rule. As an example of an I2NSF event, there may be a time and a user action (e.g., logon, logoff, and an action violating ACL).

Condition: A condition is defined as a set of a property, a capability, and/or a value to be compared with a set of a known property, feature, and/or value, and may execute or may not execute the (imperative)I2NSF policy rule. In an example of the I2NSF, coinciding property of a packet or flow and comparison of the internal state of an NSF with a desired state may be included.

Action: An action is used to control and monitor the side of a flow-based NSF when an event and a condition clause are satisfied. An NSF provides a security capability by executing various actions. In an example of an I2NSF work, intrusion detection and/or protection, web and flow filtering, and providing deep packet examination for a packet and flow may be included.

The I2NSF policy rule is composed of three Boolean clauses of an event clause, a condition clause, and an action clause.

The Boolean clause means a logical statement that is evaluated as TURE or FALSE and may be composed of one or more terminologies.

When there are two or more terminologies, the Boolean clause connects the terminologies using logical connectives (i.e., ANA, OR, and NOT). The logical connectives may have the meanings in the following Table 1.

TABLE 1

IF <event-clause> is TRUE
    IF <condition-clause> is TRUE
        THEN execute <action-clause>
    END-IF
END-IF Technically, a "policy rule" may actually function as a container aggregating not only metadata, but also the "event", "action" and "condition" described above.

The ECA policy model described above is very general, may be easily extended, and may avoid a latent limitation that may limit a generic security capability implementation.

Relationship with External Information Model

FIG. 3 shows an example of an entire I2NSF information model design to which the present disclosure can be applied.

An I2NSF NSF-Facing Interface selects and manages an NSF using the capability of the NSF, which is performed using the following approach.

1) Each NSF registers the capability in a management system when it "participates", so it may use the capability in a management system.

2) A security controller selects a capability set required to satisfy requirements of a security service in all available NSFs that are managed 3) The security controller coincides a capability selected using a capability information model with an NSF independent from a vendor.

4) The security controller manages an NSF by taking the information and creating or using one or more data models of a capability information model.

5) Controlling and monitoring may be started.

This approach may be assumed as being used by an external information model defining concepts such as an ECA policy rule and the components (e.g., an event, a condition, and a measure object). Accordingly, it is possible to classify the I2NSF policy rule into a low class from the external information model.

In the present disclosure, the data model shows a concept of an interest in an environment in a way of depending on a storage of data, a data definition language, a query language, an implementation language, and a protocol.

Further, the information model shows an interest concept about an environment in a way that is independent from a data storage, a data definition language, a query language, an implementation language, and a protocol.

A capability may be defined as a class (e.g., a set of objects showing a common characteristic and a behavior set) (see I-D.draft-ietf-supa-generic-policy-info-model).

Each capability may be composed of one or more model elements (e.g., a property, a method, and a relationship) that are discriminated from all other objects. The capability is generally a kind of metadata (i.e., information explaining and/or prescribing the behavior of an object).

Accordingly, each capability may be used for the external information model to define metadata. Accordingly, capabilities may be classified into a low class from an external metadata model.

The capability sub-model is used to advertise, create, select, and manage a specific security capability set that is independent from the type of a device including the NSF and a vendor.

That is, a user of the NSF-Facing Interface does not consider whether an NSF is virtualized or hosted, what is the NSF vendor, and an entity set that an NSF communicates with (e.g., a firewall or an IPS).

Instead, the user considers only a capability set such as packet filtering or deep packet examination that an NSF has.

Design of the entire ISNSF information module is shown in FIG. 3.

All the external models shown in FIG. 3 may be based on a SUPA information model (see I-D.draft-ietf-supa-generic-policy-info-model). The class of capability sub-model inherits a set of metadata aggregation AggregatesMetadata from an external metadata information model.

The external ECA information model shown in FIG. 3 provides a minimum glass set showing a generic ECA policy rule and a class set showing an event, a condition, and an action that may be aggregated by the generic ECA policy rule.

Accordingly, an I2NSF may not only reuse this generic model for another purpose, but also create a new low class or add a property and a relationship to express an I2NSF-related concept.

In the present disclosure, it is assumed that the external ECA information model has a capability of collecting metadata. Capabilities may be classified into a low class from an appropriate class in the external metadata information model.

This enables an ECA object to add metadata to an appropriate ECA object using the metadata and existing aggregation.

Hereafter, each part of the information model is described.

I2NSF Capability Information Model: Theory of Operation

A capability is used to show an NSF function that may be generally called. Since a capability is an object, it may be used in clauses explaining an event, a condition, and/or an action in an I2NSF ECA policy rule.

The I2NSF capability information model concretes a pre-defined metadata model. Application of the I2NSF capability may be performed by correcting a pre-defined ECA policy rule information model that defines a method of using, managing, or operating a capability set. In this approach, the I2NSF policy rule may function as a container composed of three clauses of an event clause, a condition clause, and a work clause.

When an I2NSF policy engine receives a series of events, the events are matched to events of an active ECA policy rule. When the events are matched, evaluation of a condition clause of matching I2NSF policy rule. When the condition clause is evaluated and is matched, a series of actions in the matching I2NSF policy rules may be performed.

Initial NSFs Capability Categories

Hereafter, three general functions of network security, contents security, and attack mitigation are described. The number and the function type of categories in a specific category described in the present disclosure may be both extended.

Network Security Capabilities

Network security is a category for explaining a method of examining and processing a network traffic using a pre-defined security policy.

An examination part may be a packet processing engine that examines a packet passing through a network directly or in view of flow related with the packet. In view of packing processing, a packet header that can be implemented and/or the depth of a payload, various flows and context state that can be maintained, an action that can be applied to a packet or flow may be changed in accordance with implementation.

Content Security Capabilities

Contents security is another category of a security function that is applied to an application program layer. For example, it is possible to recognize various necessary security functions by using a contents security function by analyzing traffic contents transmitted from an application program layer.

Defense against intrusion, virus search, malicious URL or junk mail filtering, illegal web access block, or malicious data search prevention may be included therein.

In general, there is an inherent characteristic set in each threat type of contents security and an inherent method set should used and processed for a corresponding type of contents. Accordingly, this function is characterized by a security function for each inherent content.

Attack Mitigation Capabilities

An attach mitigation capability is used to detect and mitigate various types of network attacks. At present, general network attacks may be defined as follows.

DDoS Attack'

Network Layer DDoS s Attack: SYN flood, UDP flood, ICMP flood, IP fragment flood, IPv6 routing header attack, and IPv6 duplicate address detection attacks may be exemplified.

Application Program layer DDoS attack: For example, there are HTTP flood, https flood, cache detour HTTP floods, WordPress XML RPC floods, and ssl DDoS.

Single Packet Attack:

Scanning and Spinning Attack" IP sweep, port scanning, etc.

Wrong Packet Attack: Ping of Death, Teardrop, etc.

Special Packet Attack: Outsize ICMP, Tracert, IP time stamp option packet, etc.

Each type of network attack has inherent network action and packet/flow characteristics. Accordingly, there is a special security function giving a notice to a capability set for detection and mitigation in each type of attack. Implementation and a management attack mitigation control function in this range may be very similar to a contents security control range.

Information Sub-Model for Network Security Capabilities

The object of a capability information sub-model is to define the concept of a capability and enable capabilities to be aggregated in an appropriate object. Hereafter, a sub-model with a network security, contents security, and attack mitigation function is described.

Information Sub-Model for Network Security

FIG. 4 shows an example of a network security information sub-model summary to which the present disclosure can be applied.

The object of a network security information sub-model is to define a method of defining a network traffic and to determine whether to apply one or more network security function to a traffic.

In FIG. 4, an ECA policy rule is defined in the external ECA information model together with event, condition, and action objects. The network security sub-model may extend these all objects to define extension for a security-related ECA policy rule, and (generic) event, condition, and action objects.

The I2NSF policy rule is a special type of policy rule of an event condition action (ECA) type. It may be composed of a policy rule, components of the policy rule (e.g., an event, a condition, a work and resolution policy, basic work, and some extenders such as external data), and selectively metadata, and may be applied to both of unidirectional and bidirectional traffics through an NSF.

Network Security Policy Rule Extensions

FIG. 5 shows an example of extension of a network security information sub-model to which the present disclosure can be applied.

FIG. 5 shows an example of a more detailed design of an ECA policy rule sub-class included in the network security information sub-model. This shows a method in which more detailed network security policies is transferred and extended in a SecurityECAPolicyRule class.

According to the following pattern of class design, it is possible to create a new kind o specific network security policy.

SecurityECAPolicyRule is positioned at the uppermost portion of an I2NSF ECA policy rule layer. This rule is transferred from a (external) generic ECA policy rule and shows specification of such a generic ECA policy rule for adding a security-related ECA policy rule.

The SecurityECAPolicyRule includes all properties, methods, and relationships defined in a super class and adds an additional concept required for network security.

Six SecurityECAPolicyRule sub-classes show six types of Network Security ECA

Policy Rules by extending the SecurityECAPolicyRule class. The (external) generic ECAPolicyRule class may define not only explanation and other required information, but basic information in the type of property such as an inherent object ID.

Network Security Policy Rule Operation

A network security policy is composed of one or more ECA policy rules composed of the information models described above. In a simple case in which event and condition clauses are not changed, work of one policy rule may call out additional network security work from another policy rule. The network security policy examines a traffic and performs basic processing as follows.

1. An NSF evaluates an event clause of given SecurityECAPolicyRule (which may be general or specific for security as shown in FIG. 3). The entire or a portion of evaluation to be described below may be performed using a security event object.

When an event clause is evaluated as TRUE, the condition clause of SecurityECAPolicyRule is evaluated. If not so, execution of SecurityECAPolicyRule may be stopped and the next SecurityECAPolicyRule may be evaluated.

2) Thereafter, a condition clause may be evaluated. The entire or a portion of evaluation to be described below may be performed using a security requirement object. When a condition clause is evaluated as TRUE, it is defined as "coinciding" with SecurityECAPolicyRule If not so, execution of SecurityECAPolicyRule may be stopped and the next SecurityECAPolicyRule may be evaluated.

3) A series of work to be executed is searched and a resolution strategy is used to define the execution order. Selective external data use related to SecurityECAPolicyRule may be included in the process in Step 3.

4) Execution may take one of the following three types.

a. When one or more behavior is selected, an NSF may perform a behavior defined by a resolution strategy. For example, the resolution strategy may allow only a single action (e.g., FMR or LMR) to be executed or may allow all actions to be executed (selectively or in specific order).

An a case different from this case, the NSF function should clearly determine an execution method.

The entire or a portion of execution to be described below may be performed using a security action object. When a basic action is permission or a mirror, an NSF first performs a corresponding function and then checks whether a specific security function is referred to in a rule. If it is "Yes", it moves to Step 5. When it is No, a traffic is allowed.

b. When there is no selected action and there is a basic action, the basic action may be performed. If not so, no work is performed.

c. If not so, a traffic may be rejected.

5. When another security function (e.g., a condition and/or an action suggested by a virus vaccine or an IPS profile NSF) is referred to in an action set of SecurityECAPolicyRule, an NSF may be configured to use the referred security function (e.g., check condition or behavior execution).

Thereafter, execution may be ended.

Network Security Event Sub-Model

FIG. 6 shows an example of extension a network security information sub-model event class to which the present disclosure can be applied.

FIG. 6 shows an example of a design of an event sub-class included in a network security information sub-model.

Four event classes of FIG. 6 show important events in network security by extending a (external) generic event class. It may be assumed that the (external) generic event class defines basic event information of a property form such as an inherent event ID, and a date and a time when explanation and an event have occurred.

Network Security Condition Sub-Model

FIG. 7 shows an example of extension a network security information low-model condition class to which the present disclosure can be applied.

FIG. 7 shows a more detailed design of a condition sub-class included in a network security information sub-model.

Six condition classes shown in FIG. 7 show conditions related to network security by extending a (external) generic condition class. The (external) generic condition class is abstract, so it is assumed that data model optimization may be defined.

It is assumed that the generic condition class defines basic condition information in the form of property such as a mechanism connecting an inherent object ID, explanation, and 0 or more metadata objects.

Network Security Action Sub-Model

FIG. 8 shows an example of extension of a network security information sub-model action to which the present disclosure can be applied.

FIG. 8 shows a more detailed design of a measure sub-class included in a network security information sub-model. Four action classes of FIG. 8 show work performing a network security control function by extending a (external) generic action class.

Three action classes of FIG. 8 show work related to network security by extending a (external) generic action class. The (external) generic condition class is abstract, so data model optimization may be defined.

It is assumed that the generic action class defines basic action information in the form of property such as a mechanism adding an inherent object ID, explanation, and 0 or more metadata objects.

Information Model for I2NSF Capabilities

FIG. 9 shows an example of a high-level model of an I2NSF security function to which the present disclosure can be applied.

As shown in FIG. 9, an I2NSF function model is composed of many functions showing various contents security and attack mitigation functions. Each function is protected from a thread of a specific type in an application program layer.

FIG. 9 shows a generic I2NSF security function class called SecurityCapability. Accordingly, it is possible to add a common property, a relationship, and an action to the class without influencing the design of the external metadata information model. All I2NSF security functions are sub-classed in SecuritCapability class.

Information Model for Content Security Capabilities

FIG. 10 shows an example of extension of a network security function information model to which the present disclosure can be applied.

FIG. 10 shows exemplary types of contents security GNSF (Generic Network Security Function).

As shown in FIG. 10, contents security may be composed of various inherent security functions. Each of such capabilities may protect contents from a specific type of threat in an application program layer.

Contents security, as shown in FIG. 10, may be a GNSF (Generic Network Security Function).

Information Model for Attack Mitigation Capabilities

FIG. 11 shows an example of extension of an attack mitigation function information model to which the present disclosure can be applied.

As shown in FIG. 11, attach mitigation may be composed of several GNSFs. Each may protect contents from a specific type of network attack. Acknowledge mitigation security is a GNSF type summarizing a well-defined security function.

Structure and Object of I2NSF Security Policy

1. I2NSF Security Policy Rule

An I2NSF security policy rule shows a policy rule about a general network security function. An object of the policy rule may be defined as policy information and rule information. ECA policy rules such as Event Clause Objects, Condition Clause Objects, Action Clause Objects, Resolution Strategy, and Default Action may be included therein.

2. Event Clause

An event, as described above, may occur when a system that is managed is changed and/or at an important point in time in the environment of the system that is managed.

Event clause objects may be used to determine whether it is possible to estimate a condition clause of the I2NSF when being used in a context of the I2NSF policy rule. The target of an event clause may be defined as a user security event, a device security event, a system security event, and a time security event. The target of an event article may be extended in accordance with a specific vendor event function.

3. Condition Clause

A condition, as described above, is defined as a set of a property, a function, and/or a value to be compared with a set of a known property, feature, and/or value, and may execute or may not execute the (imperative)I2NSF policy rule.

Such an object may be defined as a packet security condition, a packet payload security condition, a target security condition, a user security condition, a context condition, and a generic context condition.

The target of an action article may be extended in accordance with a specific vendor condition function.

4. Action Clause

An action is used to control and monitor the side of a flow-based NSF when event and condition clauses are satisfied. An NSF provides a security function by executing various actions. The object of an action clause may be defined as an input action, a transmission action, and an application profile action, and the object of the action clause may be extended in accordance with a specific vendor measure function.

Data Model Architecture

Hereafter, a data model proposed in the present disclosure is described.

The followings are considered in the architecture of a data model proposed in the present disclosure.

Consideration of ECA policy model by event, condition, action clause aggregation Consideration of capability logarithm Consideration of NSF function category (e.g., network security, contents security, and attack mitigation function)

Definition for a network security event class, a network security condition class, and a network security work class.

FIG. 12 exemplifies a data model architecture for network security policy recognition according to an embodiment of the present disclosure.

A data model for recognizing a network security policy may be configured in the architecture shown in FIG. 12.

The data model for recognizing a network security policy may be composed of a security policy, an event clause container, a condition clause container, and an action clause container.

A data field of the security policy includes a policy name, rules, a resolution strategy, and a fixing action and rule group.

The resolution strategy is used to determine a method of a collision generated between actions of the same or different policy rules coinciding with a specific NSF and included therein. The resolution strategy may be defined as an FMR (First Matching Rule), an LMR (Last Matching Rule), a PMRE (Priority Matching Rule), and a PMRN (Priority Matching Rule. The resolution strategy may be extended in accordance with the work function of a specific vendor. The resolution strategy capability is described in detail below [draf-ietf-i2nsf-capability].

When there is no rule coinciding with a packet, a default action may be used to execute the I2NSF policy rule. The default action may be defined as passing, deleting, rejection, warning, and a mirror. the default action may be extended in accordance with the work function of a specific vendor. The default action is described in detail in [[draf-ietf-i2nsf-capability].

A rule group may include a name for recognizing rules, and description, priority, enable, session-aging-time, long-connection, time-intervals, event-clause-container, condition-clause-container, and action-clause-container for explaining the rules.

The long-connection may include 'enable' and 'during' to be able to set a duration time to which a rule can be applied.

Further, the action-clause-container may include absolute-time-interval and periodic-time-interval such that a periodical time can be set other than the absolute time of an applied rule.

The absolute-time-interval may include start-time? and end-time? for setting a start time and an end time to setting a time at which a rule is applied or a time at which a rule is ended.

The periodic-time-interval may include day and month for setting a periodic time at which a rule is applied.

The rule-group is composed of groups in which rules may be grouped and managed, and a data filed for each group includes group-name, rule-range, enable, description.

The event-clause-container, condition-clause-container, and action-clause-container may be used for a policy rule to aggregate "event", "action", and "operation".

FIG. 13 exemplifies a YANG data model architecture for an event clause according to an embodiment of the present disclosure.

An event, as described above, means an event that occurs when a system that is managed is changed and/or at an important point in time in the environment of the system that is managed.

The objects for an event clause shown in FIG. 13 may be defined as a user security event, a device security event, a system security event, and a time security event. These objects may be extended in accordance with a specific vendor event function and may be added with an additional event object for a more generic network security function.

FIGS. 14A to 14G show examples of a data model architecture for a condition rule according to an embodiment of the present disclosure.

A condition rule, as described above, is defined as a set of a property, a function, and/or a value to be compared with a set of a known property, feature, and/or value, and may execute or may not execute the (imperative) I2NSF policy rule.

An object for the condition rule may include a packet security ipv4 condition, a packet security ipv6 condition, a packet security tcp condition, a packet security udp condition, a packet security icmp condition, a packet security url-category condition, a packet security voice condition, a packet security ddos condition, a packet security payload condition, and a context condition.

The condition rule of the context may be defined as an ACL number condition, an application condition, a target condition, a user condition, and geometry condition.

An object for the condition rule may be extended in accordance with a specific vendor condition function and a condition object for a more generic network security function may be added.

Further, as shown in FIGS. 14A to 14G, a data model architecture for the condition rule may set a rule related to an address and a port number.

In FIG. 14F, in order to manage the state of an application to which a rule can be applied, a data filed of application-condition includes application-description?, application-object*, application-group*, application-label*, and category.

Further, whether to apply the rules may be set in accordance with a URL (Uniform Resource Locator), and to this end, the data field of the url-category-condition includes pre-defined-category*, and user-defined-category*.

FIG. 15A exemplifies a data model architecture for an action rule according to an embodiment of the present disclosure.

An action rule is used to control and monitor the side of a flow-based NSF when an event and a conditional are satisfied.

An object of the action rule may be defined as an ingress action for a packet operation, an egress action or a log action for a packet action, and a high-class action for additional examination. The action rule may be extended in accordance with a specific vendor measure function.

The architecture of a data model for the condition rule and the action rule shown in FIGS. 14A to 15A uses a container architecture, so multiple conditions may be applied.

FIG. 15B is an example of an I2NSF IPsec (IP Security) to which the present disclosure can be applied. Referring to FIG. 15B, the I2NSF IPsec may be used to define a method required for managing an IPsec parameter to create IPsec security associations between two NSFs through an IKE (Internet Key Exchange)v2 or a security controller. In the I2NSF IPsec, two cases of an IKE case (i.e., IPsec through an IKE) and an IKE-less case (i.e., IPsec through not an IKE, but a security controller) are considered.

FIGS. 16A to 18T exemplify a YANG data module of an I2NSF NSF-Facing-Interface according to an embodiment of the present disclosure.

Referring to FIGS. 16A to 18T, a YANG data model for a security policy rule of network security functions may be set.

Hereafter, an information model for NSF monitoring is described.

An interface NSF provided by an NSF (e.g., FW, IPS, Anti-DDOS, or Anti-Virus function) to a management entity (e.g., NMS, security controller) to configure a security function, and monitoring the NSF is referred to as "I2NSF NSF-Facing Interface" (see ID.ietf-i2nsf-terminology).

A monitoring part means that important information about an NSF is obtained. When alarm, event, record, counter are performed at appropriate time in an conclusive manner, NSF monitoring plays an important role in the entire security framework. Monitoring information created by the NSF may be early indication of a latent symptom of a malicious activity, an abnormal activity, or a service rejection attack.

NSF monitoring data may be used in the following situations.

As described above, monitoring plays an important role in the entire security framework. When an NSF is monitored, very important information is provided to a security controller in maintaining a prescribed security state. In addition, there are other reasons that an NSF can be monitored, as follows.

A security manager may configure a policy that is triggered in a specific event occurring in an NSF or a network. The security controller monitors a designated event, and configures an additional security function in accordance with the policy when an event occurs.

An event caused by an NSF as the result of security policy violation may be used to detect a suspicious activity by an SIEM (Security Information and Event Management).

It is possible to improve a security state by constructing high-class analysis such as an action and estimation using an event and an activity log of an NSF The security controller may use an event of an NSF to achieve high availability. Correction measures such as failed NSF restart, NSF horizontal extension, etc.

The event and the activity log of an NSF may help debugging of an operation problem and a basic reason analysis.

The activity history of an NSF may be used to make record data for operation and business reasons.

Classification of NSF Monitoring Data

In order to maintain a strong security state, an NSF security policy should be configured and an NSF should be continuously monitored by consuming observable information. Accordingly, the security manager may timely evaluate whether what happens in a network.

It is impossible to block all internal and external threats on the basis of a static security state. In order to achieve this target, there is a need for a very dynamic posture having uniform visibility. In the present disclosure, it may be possible to determine a series of information elements (an the range) that may be obtained from an NSF and may be used as monitoring information.

Basically, this type of monitoring information may be used for supporting continuous visibility for various levels of details and may be consumed by a corresponding function.

Hereafter, a basic information model for all monitoring data is described.

Basic Information Model for All Monitoring Data
message_version: showing version of data format and being two-digit decimal number starting from 01.
message_type: event, warning, alarm, log, counter, etc.
time_stamp: showing time when message is created.
vendor_name: name of NSF vendor
NSF_name: name (or IP) of NSF creating message.
Module_name: name outputting message.
Severity: showing level of log A total of 8 levels (from 0 to 7) exist, and the smaller the number, the higher the severe degree.

Extended Information Model for Monitoring Data
An extension information model is used only for structuralized data such as an alarm. Data not structuralized are designated only as a basic information model.

System Alarm
Memory Alarm
The following information should be included in a memory alarm.
event_name: 'MEM_USAGE_ALARM'
module_name: showing NSF module being in charge of creating alarm.
usage: designating the amount of used memory.
threshold: threshold triggering alarm.
severe degree: danger level (e.g., danger level, high, middle, low)
message: outputting message such as 'memory used over a threshold".

CPU Alarm
The following information may be included in a CPU alarm.
event_name: 'CPU_USAGE_ALARM'
usage: designating the amount of used CPU.
threshold: threshold triggering event
severe degree: danger level (e.g., danger level, high, middle, low)
message: outputting message such as 'CPU used over a threshold'.

Disk Alarm
The following information may be included in a disk alarm.
event_name: 'DISK_USAGE_ALARM'
usage: designating the amount of used disk space.
threshold: threshold triggering event
severe degree: danger level (e.g., danger level, high, middle, low)
message: outputting a message such as 'Disk used over a threshold'.

Hardware Alarm
The following information may be included in a hardware alarm.
event_name: 'HW_FAILURE_ALARM'
component_name: showing a HW component creating this alarm
threshold value: threshold value triggering alarm.
severe degree: danger level (e.g., danger level, high, middle, low)
message: outputting message such as 'hardware component broken or performance deteriorated'.

Interface Alarm
The following information may be included in an interface alarm.
event_name: 'IFNET_STATE_ALARM'
interface_Name: interface name
interface_state: 'UP', 'DOWN', 'CONGESTED'
threshold: threshold triggering event
severe degree: danger level (e.g., danger level, high, middle, low)
message: outputting 'current interface state'.

System Events
Access Violation
The following information may be included in an event.
event_name: 'ACCESS_DENIED'
user: user name
group: group to which user pertains
login_ip_address: login IP address of user
authentication_mode: user authentication mode. For example, local authentication, a third party server authentication, authentication exemption, SSO authentication
message: outputting a message such as 'access denied'.

Configuration Change
The following information may be included in an event.
event_name: 'CONFIG_CHANGE'
user: user name
group: group to which user pertains
login_ip_address: login IP address of user
authentication_mode: user authentication mode. For example, local authentication, a third party server authentication, authentication exemption, SSO authentication
message: outputting a message such as 'configuration changed'.

System Log
Access Log
Access log may recognize security vulnerability by recording and analyzing login and logout of a manager, and device operation. The following information may be included in an operation report
manager: manager operating in a device
login_ip_address: IP address that manager uses for login
login_mode: designating manager login mode (e.g., a root, a user).
operation_type: operation type performed by manager (e.g., login, logout, configuration)
result: instruction execution result
content: work performed by manager after login Resource Utilization Logs
A report that is being executed records the execution state of a device system, which is useful for device monitoring. The execution report may include the following information.
system_status: current execution status of system
CPU_usage: designating CPU use amount.
memory_usage: designating memory use amount.
disk_usage: designating disk use amount.
disk_left: designating available disk space.
session_number: designating total simultaneous session number
process_number: designating total system process number.
in_traffic_rate: total inbound traffic speed (pps)
out_traffic_rate: total outbound traffic speed (pps)
in_traffic_speed: total inbound traffic speed (bps)
out_traffic_speed: total outbound traffic speed (bps)

User Activity Logs
A user activity log provides a online history of a user (login time, online/lockout duration, and login IP address) and visibility about the work that a user performs. The user activity report is useful for recognize an exception in user login and network access activity.
group: group to which a user pertains
login_ip_address: login IP address of user authentication_mode: user authentication mode. For example, local authentication, a third party server authentication, authentication exemption, SSO authentication access_mode: user access mode. For example, PPP, SVN, LOCAL online_duration: online duration lockout_duration: lockout duration type: user activity. Succeeded user login, failed login attempt, user logout, succeeded user password change, failed user password change, user lock, user unlock, unknown reason: user work failed System Counter Interface Counters The interface counter provides a traffic coming into and going out of an NSF and visibility for bandwidth use.

interface_name network interface name configured in NSF in_total_traffic_pkts: entire inbound packets out_total_traffic_pkts: total outbound packets in_total_traffic_bytes: total inbound bytes out_total_traffic_bytes: total outbound bytes in_drop_traffic_pkts: total inbound drop packets out_drop_traffic_pkts: total outbound drop packets in_drop_traffic_bytes: total inbound drop bytes out_drop_traffic_bytes: total inbound deletion bytes in_traffic_ave_rate: inbound traffic average fee (pps)

in_traffic_peak_rate: inbound traffic peak speed (pps)

in_traffic_ave_speed: inbound traffic average speed (bps)

in_traffic_peak_speed: inbound traffic highest speed (bps)

out_traffic_ave_rate: outbound traffic average fee (pps)

out_traffic_peak_rate: outbound traffic peak speed (pps)

out_traffic_ave_speed: outbound traffic average speed (bps)

out_traffic_peak_speed: outbound traffic highest speed (bps)

NSF Events

The DDoS event may include the following information.

event_name: 'SEC_EVENT_DDoS' sub_attack_type: Syn flood, ACK flood, SYN-ACK flood, FIN/RST flood, TCP connection flood, UDP flood, Icmp flood, HTTPS flood, HTTP flood, DNS query flood, DNS reply flood, SIP flood, etc.

dst_ip: IP address of victim that is being attacked dst_port: port number aiming traffic start_time: time stamp showing attach start time end_time: time stamp showing attack end time. This filed may be empty if attacks are continuously generated when an alarm is transmitted.

attack_rate: PPS of attack traffic attack_speed: bps of attack traffic rule_id: ID of triggered rule.

rule_name name of triggered rule profile: security profile with coinciding traffic.

Session Table Event

The following information may be included in a session table event.

event_name: 'SESSION_USAGE_HIGH' current: simultaneous session number max: maximum session number that session table can support threshold: threshold triggering event message: outputting message such as 'session table number over a threshold'.

Virus Event

The following information may be included in a virus event.

event_Name: 'SEC_EVENT_VIRUS' virus_type: virus type (e.g., Trojan horse, worm, macro) virus type, virus name dst_ip: target IP address of packet with virus found src_ip: source IP address of packet with virus found src_port: source port of packet with virus found dst_port: target port of packet with virus found src_zone: source security area of packet with virus found dst_zone: target security area of packet with virus found file_type: type of file with hidden virus file_name: name of file with hidden virus virus_info: brief introduction of virus raw_info: information explaining packet triggering event rule_id: ID of triggered rule.

rule_name name of triggered rule profile: security profile with coinciding traffic.

Intrusion Event

The following information should be included in an Intrusion Event.

event_name: event name: 'SEC_EVENT_Intrusion' sub_attack_type: attach type, e.g., cruel power, buffer overflow src_ip: source IP address of packet dst_ip: destination IP address of packet src_port: source port number of packet dst_port: destination port number of packet src_zone: source security area of packet dst_zone: target security area of packet protocol: used transmission layer protocol, e.g., TCP, UDP app: employed application layer protocol (e.g., HTTP, FTP)

rule_id: ID of triggered rule.

rule_name name of triggered rule profile: security profile with coinciding traffic.

intrusion_info: brief explanation of intrusion raw_info: information explaining packet triggering event Botnet Event The following information may be included in a botnet event.

event_name: event name: 'SEC_EVENT_Botnet' botnet_name: name of detected botnet src_ip: source IP address of packet dst_ip: destination IP address of packet src_port: source port number of packet dst_port: destination port number of packet src_zone: source security area of packet dst_zone: target security area of packet protocol: used transmission layer protocol, e.g., TCP, UDP app: employed application layer protocol (e.g., HTTP, FTP)

role: role of communication party in botnet

1. Packet from zombie host to attacker
2. Packet going to zombie host from attacker
3. Packet going to zombie host from IRC/WEB
4. Packet transmitted from zombie host to IRC/WEB server
5. Packet transmitted from attacker to IRC/WEB
6. Packet going to attacker from IRC/WEB
7. Packet from zombie host to victim botnet_info: brief explanation of Botnet rule_id: ID of triggered rule.

rule_name name of triggered rule profile: security profile with coinciding traffic.

raw_info: information explaining packet triggering event

Web Attack Event

The following information may be included in a web attack event.

event_name: event name: 'SEC_EVENT_WebAttack'
    sub_attack_type: detailed web attach type (e.g., sql injection, command injection, XSS, CSRF)
    src_ip: source IP address of packet
    dst_ip: destination IP address of packet
    src_port: source port number of packet
    dst_port: destination port number of packet
    src_zone: source security area of packet
    dst_zone: target security area of packet
    req_method: method of requirement. For example, 'PUT' or 'GET' in HTTP
    req_url: requested URL
    url_category: coinciding URL category
    filtering_type: blacklist, allowed list, user definition, predefined malicious category, unknown URL filtering type
    rule_id: ID of triggered rule.
    rule_name name of triggered rule
    profile: security profile with coinciding traffic.

NSF Logs

DDoS Logs

Other than the field of a DDoS alarm, the following information may be included in DDoS log.

attacker type: DDoS
    attack_ave_rate: average pps of attack traffic in recorded time
    attack_ave_speed: average bps of attack traffic in recorded time
    attack_pkt_num: attack times in recorded time
    attack_src_ip: source IP address of attack traffic. When there are a lot of IP addresses, a specific number of resources are selected in accordance with another rule.
    action: work against DDoS attack (e.g., allowing, warning, blocking, discarding, declaring, blocked IP, block service).

Virus Logs

Other than the field of a virus alarm, the following information may be included in virus logs, attack type: virus
    protocol: transmission layer protocol
    app name of application program layer protocol
    times: virus detection time
    action; action handling a virus (e.g., warning, blocking)
    os: OS influenced by a virus (e.g., all, android, ios, unix, windows).

Intrusion Logs

Other than the field of an intrusion alarm, the following information may be included in intrusion logs, attack type: intrusion
    time: intrusion time generated at recorded time.
    os: OS influencing intrusion (e.g., all, android, ios, unix, windows).
    action: actions handling intrusion, e.g., allowing, warning, blocking, discarding, declaring, blocked IP, blocking service
    attack_rate: pps NUM of attack traffic
    attack_speed: bps of NUM attack traffic Botnet Logs Other than the field of a botnet alarm, the following information may be included in botnet logs, attack_type: botnet
    botnet_pkt_num: number of packets transmitted to or received from detected botnet
    action: actions handling detected target, e.g., allowing, warning, blocking, discarding, declaring, blocked IP, blocking service, others
    os: all OSs that are attack targets, e.g., android, ios, unix, windows, etc.

DPI Logs

DPI logs may provide statistic about uploaded and downloaded files and data and transmitted and received emails, warn a website of a history, and block them.

type: DPI work type. e.g., file blocking, data filtering, application operation control
    file_name: file name
    file_type: file type
    src_zone: traffic source security area
    dst_zone: target security area of traffic
    src_region: traffic source area
    dst_region: target area of traffic
    src_ip: source IP address of traffic
    src_user: user creating traffic
    dst_ip: target IP address of traffic
    src_port: traffic source port
    dst_port: target port of traffic
    protocol: protocol type of traffic
    app name of application program layer protocol
    policy_id: security policy ID with coinciding traffic
    policy_name: security policy name with coinciding traffic
    action: work defined in rule of blocking file with coinciding traffic, data filter rule, or application program operation control rule.

Vulnerability Search Logs

Damaged host and related vulnerability information should recorded in vulnerable point search logs. The following information should be included in a report victim_ip: IP address of sacrificed host with vulnerability
    vulnerable point ID: vulnerable point ID
    vulnerability_level: vulnerable point level. e.g., high, low, low
    operating system: operation system of target host
    service: service vulnerable to victim host
    protocol: protocol type. e.g., TCP, UDP
    port: port number
    vulnerability_info: information about vulnerable point
    fix_suggestion: fix suggestion for vulnerable point 8.6.7. Web Attack Logs Other than the field of a web attack alarm, the following information should be included in a web attach report.

attack_type: web attach
    rsp_code: response code
    req_clientapp: client application program
    req_cookies: cookie
    req_host: domain name of requesting host
    raw_info: information explaining packet triggering event NSF Counter Firewall Counters A firewall counter provides visibility about a traffic signature, bandwidth use, and how configured security and a bandwidth policy were used.

src_zone: traffic source security area
    dst_zone: target security area of traffic
    src_region: traffic source area
    dst_region: target area of traffic
    src_ip: source IP address of traffic
    src_user: user creating traffic
    dst_ip: target IP address of traffic
    src_port: traffic source port
    dst_port: target port of traffic
    protocol: protocol type of traffic app name of application program layer protocol
policy_id: security policy ID with coinciding traffic
policy_name: security policy name with coinciding traffic
in_interface: inbound interface of traffic
out_interface: outbound interface of traffic
total_traffic: total traffic amount
in_traffic_ave_rate: inbound traffic average fee (pps)
in_traffic_peak_rate: inbound traffic peak speed (pps)
in_traffic_ave_speed: inbound traffic average speed (bps)
in_traffic_peak_speed: inbound traffic highest speed (bps)
out_traffic_ave_rate: outbound traffic average fee (pps)
out_traffic_peak_rate: outbound traffic peak speed (pps)
out_traffic_ave_speed: outbound traffic average speed (bps)

Policy Hit Counters

A policy hit counter records a security policy with a coinciding traffic and hit numbers. It is possible to check whether policy configuration is correct.

src_zone: traffic source security area
dst_zone: target security area of traffic
src_region: traffic source area
dst_region: target area of traffic
src_ip: source IP address of traffic
src_user: user creating traffic
dst_ip: target IP address of traffic
src_port: traffic source port
dst_port: target port of traffic
protocol: protocol type of traffic
app name of application program layer protocol
policy_id: security policy ID with coinciding traffic
policy_name: security policy name with coinciding traffic
hit_times: number of times of security policy coinciding with designated traffic FIGS. 19A to 19F exemplify XML (Extensible Markup Language) setting of a low-level security policy rules according to an embodiment of the present disclosure.

Referring to FIGS. 19A to 19F, as security requirements, an NSF may include a generic firewall, a time-based firewall, a URL filter, a VoIP/VoLTE filter, and a flood mitigation function of http and https.

As an example of a security rule, the following security requirements may be included.

Blocking of SNS access coming to company during business hours, (ii) Blocking of malicious VoIP/VoLTE packet, (iii) flood mitigation of http and https.

Security Requirement 1: Block SNS Access During Business Hours

FIGS. 19A and 19B exemplify a time-based firewall for blocking SNS access during business hours and configuration XML of a web filter.

Since a security requirement cannot be satisfied by one NSF, two NSFs (i.e., a time-based firewall and a web filter) may be used.

The time-based firewall may follow the followings.
1) The name of a system policy is sns_access.
2) The name of a rule is block_sns_access_stiming_operation_time.
3) A rule may be operated in business hours (e.g., from 9 am to 6 pm).
4) This rule may examine a source IPv4 address (i.e., 221.159.112.1-221.159.112.90) to examine transmission packets of employees.
5) When a transmission packet is matched to the above rule, the time-based firewall cannot examine the contents of the packet for SNS URL, so packets may be transmitted to a web filter for additional examination.

The web filter may follow the followings.
1. The name of a system policy is sns_access.
2. The name of a rule is block_facebook_and_instagram.
3. This rule may block an access packet for Facebook or Instagram by examining URL addresses.
4. When the transmission packet is matched with the rules, the packet is blocked.

Security Requirement 2: Block Malicious VoIP/VoLTE Packets Coming to a Company

FIGS. 19C and 19D exemplify a configuration for blocking a malicious VoIP/VoLTE packet coming to a company.

Since a security requirement cannot be satisfied by one NSF, two NSFs (i.e., a general firewall and a VoIP/VoLTE filter) may be used.

The general firewall may follow the followings.
1) The name of a system policy is voip_volte_inspection.
2) The name of a rule is block_malicious_voip_volte_packets.
3) This rule may examine a start IPv4 address (i.e., 221.12.12.1-221.12.12.10.90) to examine packets of coming to a company.
4) This rule may examine a port number (i.e., 5060 and 5061) to examine a VoIP/VoLTE.
5) When a coming packet coincides with the above rule, a general firewall cannot examine the contents of a VoIP/VoLTE packet, so a packet may be sent to a VoIP/VoLTE filter for additional examination.

The VoIP/VoLTE Filter may follow the followings.
1. The name of a system policy is malicious_voice_id.
2. The name of a rule is block_malicious_voice_id.
3. This rule may block a malicious VoIP/VoLTE packet (i.e., 11111@voip.black.com and 21222@voip.black.com) by examining the voice ID of a VoIP/VoLTE packet.
4. When the coming packet is matched with the above rule, the packet may be blocked.

Security Requirement 3: Mitigate HTTP and HTTPS Flood Attacks on a Company Web Server FIGS. 19E and 19F exemplify a configuration for mitigating a malicious http and https flood attacks with a company web server to which the present disclosure can be applied.

Since a security requirement cannot be satisfied by one NSF, two NSFs (i.e., a general firewall and a http and https flood attack mitigation) may be used.

The general firewall may follow the followings.
1) The name of a system policy is flood_attack_mitigation.
2) The name of a rule is mitigate_http_and_https_flood_attack.
3) This rule may examine a start IPv4 address (i.e., 221.159.112.95) to examine an access packet coming to a company web server.
4) This rule may examine a port number (i.e., 80 and 443) to examine a http and https packets.
5) When the coming packet is matched with the above rule, the general firewall cannot control the amount of http and https packets, so the packet may be transmitted to http and https flood attack mitigation for additional examination.

HTTP and HTTPS Flood Attack Mitigation may follow the followings.
1. The name of a system policy is http_and_https_flood_attack_mitigation.
2. The name of a rule is 100_per_second.
3. This rule may control http and https packets corresponding to the amount of coming packets.

4. When the coming packet is matched with the above rule, the packet may be blocked.

The information model, data model, and YANG data model described with reference to FIGS. 1 to 19F may be selectively combined in use.

FIG. 20 is an embodiment to which the present disclosure can be applied.

Referring to FIG. 20, a network operator management system receives a high-level first security policy from an I2NSF (Interface to Network Security Functions) user (S2010).

The network operator management system receives an available security service from a developer's management system (S2020).

The network operator management system creates a low-level second security policy corresponding to the first security policy on the basis of the security service (S2030). For example, the second security policy may include an applied policy rule, and basic action information showing an action for a generic security function. Further, the policy information and the rule information may include an event clause showing a change of a system, a condition clause showing an application condition of a policy rule, and an action clause showing a security function that is performed when the event clause and the condition clause are satisfied. Further, the policy rule may further include information about the range of an IP address for matching.

The network operator management system transmits a packet including the second security policy for setting the created second security policy to each of a plurality of NSFs (Network Security Function) to an NSF instance (S2040). In more detail, the network operator management system and the NSFs are respectively connected to an I2NSF NSF-facing interface and the second security policy may include at least one or more of 1) blocking SNS access during business hours, 2) blocking a malicious VoIP (Voice over Internet Protocol) or a malicious VoLTE (Voice over LTE) packet, or 3) mitigating flood of http and https for a company web server.

For example, when the second security policy is for blocking SNS access during business hours, the policy rule may further include time information for enabling the policy rule to be applied only during the business hours and a source IP address for examining a transmission packet. When a transmission packet is matched to the time information and the source IP address and when the URL (Uniform Resource Locator) address of the transmission packet is the URL address of a specific SNS, transmission of the transmission packet may be blocked.

Further, when the second security policy is for blocking the malicious VoIP or the malicious VoLTE packet, the policy rule may further include 1) an IP address and 2) a port number to which the malicious VoIP or the malicious VoLTE packet are received. When the packets received to the 1) IP address and 2) port number are matched, reception of a packet matched with the voice ID of the malicious VoIP or the malicious VoLTE packet may be blocked.

Further, when the second security policy is for mitigating flood of http and https for the company web server, the policy rule may further include 1) IP address and 2) port number of the packet received to the company web server. When the packets received to the 1) IP address and 2) port number are matched and when a reception ratio per hour in which a packet received to the company web server can be allowed is exceeded, the packet that is received to the company web server may be blocked.

The embodiments described above are predetermined combinations of the components and the features of the present disclosure. Each component or feature, unless specifically stated, should be considered as being selective. Each component or feature may be implemented in a type in which they are not combined with other components or features. Further, embodiments of the present disclosure may be configured by combining some components and/or features. The order of the actions described in embodiments of the present disclosure may be changed. Some components or features of any embodiment may be included in another embodiment and may be replaced with corresponding configurations and features of another embodiment. Unless specifically referred in claims, it is apparent that an embodiment may be configured by combining claims or new claims may be included through amendment after application.

Embodiments of the present disclosure may be implemented by various measures, such as hardware, firmware, software, or combinations thereof. When hardware is used, an embodiment of the present disclosure may be implemented by one or more of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a processor, a controller, a micro controller, and a micro processor.

In the case of an implementation by firmware or software, the embodiments described in the present disclosure may be implemented in the form of a module, a procedure, or a function for performing the capabilities or actions described above. The software code may be stored in a memory and driven by the processor. The memory may be located inside or outside the processor, and may exchange data with the processor by various well-known means.

It is apparent to those skilled in the art that the present disclosure can be embodied in other specific types within a range not departing from the necessary characteristics of the present disclosure. Accordingly, the detailed description should not be construed as being limited in all respects and should be construed as an example. The scope of the present disclosure should be determined by reasonable analysis of the claims and all changes within an equivalent range of the present disclosure is included in the scope of the present disclosure.

INDUSTRIAL APPLICABILITY

The present disclosure may be applied to various security management systems.

What is claimed is:

1. A method of providing a security service by means of a network operator management system in a security management system, the method comprising:
receiving a high-level first security policy from an I2NSF (Interface to Network Security Functions) user;
receiving an available security service from a developer's management system;
creating a low-level second security policy corresponding to the first security policy on the basis of the security service; and
transmitting a packet including the second security policy for setting the created second security policy to each of a plurality of NSFs (Network Security Function) to an NSF instance,
wherein the network operator management system and the NSFs are respectively connected to an I2NSF NSF-facing interface, and wherein the second security policy includes at least one or more of 1) blocking SNS access during business hours, 2) blocking a malicious VoIP (Voice over Internet Protocol) or a malicious VoCN (Voice over Cellular Network) packet, or 3) mitigating flood of http and https for a company web server.

2. The method of claim 1, wherein the second security policy includes an applied policy rule, and default action information showing an action for a generic security function.

3. The method of claim 2, wherein the policy rule includes policy information and rule information, and
the rule information includes an event clause showing a change of a system, a condition clause showing an application condition of a policy rule, and an action clause showing a security function that is performed when the event clause and the condition clause are satisfied.

4. The method of claim 3, wherein, on the basis of the fact that the second security policy is for blocking SNS access during business hours, the policy rule further includes time information for enabling the policy rule to be applied only during the business hours and a source IP address for examining a transmission packet.

5. The method of claim 4, wherein, on the basis of the time information and the source IP address, when a URL (Uniform Resource Locator) of the transmission packet is a URL of a specific SNS, transmission of the transmission packet is dropped.

6. The method of claim 3, wherein, on the basis of the fact that the second security policy is for blocking the malicious VoIP or the malicious VoCN packet, the policy rule further includes 1) an IP address and 2) a port number to which the malicious VoIP or the malicious VoCN packet are received.

7. The method of claim 6, wherein, on the basis of the 1) IP address and the 2) port number, a packet matched with a voice ID of the malicious VoIP or the malicious VoCN packet is dropped.

8. The method of claim 3, wherein, on the basis of the fact that the second security policy is for mitigating flood of http and https for the company web server, the policy rule further includes 1) IP address and 2) port number of a packet received to the company web server.

9. The method of claim 8, wherein, on the basis of the 1) IP address and the 2) port number, when a reception ratio per second in which a packet received to the company web server can be allowed is exceeded, a packet that is received to the company web server is dropped.

10. The method of claim 3, wherein the condition clause further includes information about a range of an IP address for matching.

11. A security management system for providing a security service, the security management system comprising:
an I2NSF (Interface to Network Security Functions) creating a high-level first security policy;
a developer's management system providing a security service;
a network operator management system receiving the first security policy from the I2NSF user, receiving the security service from the developer's management system, creating a low-level second security policy corresponding to the first security policy on the basis of the security service, and transmitting a packet including the second security policy for setting the created second security polity to each of a plurality of NSFs (Network Security Function), to an NSF instance; and
a plurality of NSFs (Network Security Function) receiving the second security policy from the security management system,
wherein the network operator management system and the NSFs are respectively connected to an I2NSF NSF-facing interface, and
wherein the second security policy includes at least one or more of 1) blocking SNS access during business hours, 2) blocking a malicious VoIP (Voice over Internet Protocol) or a malicious VoCN (Voice over Cellular Network)) packet, or 3) mitigating flood of http and https for a company web server.

12. The security management system of claim 11, wherein the second security policy includes an applied policy rule, and default action information showing an action for a generic security function.

13. The security management system of claim 12, wherein the policy rule includes policy information and rule information, and
the rule information includes an event clause showing a change of a system, a condition clause showing an application condition of a policy rule, and an action clause showing a security function that is performed when the event clause and the condition clause are satisfied.

14. The security management system of claim 13, wherein on the basis of the fact that the second security policy is for blocking SNS access during business hours, the policy rule further includes time information for enabling the policy rule to be applied only during the business hours and a source IP address for examining a transmission packet.

15. The security management system of claim 14, wherein on the basis of the time information and the source IP address, when a URL (Uniform Resource Locator) of the transmission packet is a URL of a specific SNS, transmission of the transmission packet is dropped.

16. The security management system of claim 13, wherein on the basis of the fact that the second security policy is for blocking the malicious VoIP or the malicious VoCN packet, the policy rule further includes 1) an IP address and 2) a port number to which the malicious VoIP or the malicious VoCN packet are received.

17. The security management system of claim 16, wherein, on the basis of the 1) IP address and the 2) port number, a packet matched with a voice ID of the malicious VoIP or the malicious VoCN packet is dropped.

18. The security management system of claim 13, wherein, on the basis of the fact that the second security policy is for mitigating flood of http and https for the company web server, the policy rule further includes 1) IP address and 2) port number of a packet received to the company web server.

19. The security management system of claim 18, wherein, on the basis of the 1) IP address and the 2) port number, when a reception ratio per second in which a packet received to the company web server can be allowed is exceeded, a packet that is received to the company web server is dropped.

20. The security management system of claim 13, wherein the condition clause further includes information about a range of an IP address for matching.

* * * * *